(12) United States Patent
Pavlacka et al.

(10) Patent No.: US 9,886,832 B2
(45) Date of Patent: Feb. 6, 2018

(54) WARNING SYSTEM DEVICES

(71) Applicant: Federal Signal Corporation, Oak Brook, IL (US)

(72) Inventors: Myron Pavlacka, Frankfort, IL (US); Paul Ferrara, Frankfort, IL (US)

(73) Assignee: Federal Signal Corporation, Oak Brook, IL (US)

( * ) Notice: Subject to any disclaimer, the term of this patent is extended or adjusted under 35 U.S.C. 154(b) by 1 day.

(21) Appl. No.: 15/074,488

(22) Filed: Mar. 18, 2016

(65) Prior Publication Data
US 2016/0275770 A1 Sep. 22, 2016

Related U.S. Application Data

(60) Provisional application No. 62/136,140, filed on Mar. 20, 2015.

(51) Int. Cl.
*G08B 21/00* (2006.01)
*G06F 1/16* (2006.01)
*G08B 5/36* (2006.01)

(52) U.S. Cl.
CPC ............. *G08B 21/00* (2013.01); *G06F 1/16* (2013.01); *G08B 5/36* (2013.01)

(58) Field of Classification Search
CPC ............. G08B 21/00; G08B 5/36; G06F 1/16
USPC ...................................................... 340/693.5
See application file for complete search history.

(56) References Cited

U.S. PATENT DOCUMENTS

| | | | | |
|---|---|---|---|---|
| 5,521,595 A | * | 5/1996 | Totten | B60Q 7/00 340/321 |
| 5,684,452 A | * | 11/1997 | Wang | B60Q 7/00 248/188.6 |
| 5,898,380 A | * | 4/1999 | Chi | F21V 15/04 340/321 |
| 5,963,126 A | * | 10/1999 | Karlin | B60Q 7/00 340/321 |

(Continued)

FOREIGN PATENT DOCUMENTS

| | | |
|---|---|---|
| DE | 198 54 666 A1 | 6/2000 |
| EP | 0 480 392 A2 | 4/1992 |

(Continued)

OTHER PUBLICATIONS

International Search Report and Written Opinion in PCT/US2016/023235 dated Jun. 17, 2016, 19 pages.

*Primary Examiner* — Omar Casillashernandez
(74) *Attorney, Agent, or Firm* — Merchant & Gould P.C.

(57) ABSTRACT

A warning system includes one or more modularized alarm subsystems and one or more modularized coupling devices for coupling the alarm subsystems in various manners. The alarm subsystem can include a signaling device and a modularized protection housing. The signaling device operates to provide an alarm in an event of a predetermined situation. The modularized protection housing is configured to mount the signaling device and a coupling device. The coupling device is configured to couple the modularized protection housing with another modularized protection housing therethrough. The modularized protection housing is configured to interchangeably mount different types of signaling devices. The coupling device is further configured to engage another coupling device.

7 Claims, 43 Drawing Sheets

(56) References Cited

U.S. PATENT DOCUMENTS

| | | | | |
|---|---|---|---|---|
| 6,384,735 B1* | 5/2002 | Rabou | ................... | G08B 5/36 340/321 |
| 7,626,509 B2* | 12/2009 | Dean | ................... | F21S 9/037 315/154 |
| 2008/0303659 A1* | 12/2008 | Weiss | ................... | G08B 5/36 340/540 |
| 2014/0104763 A1* | 4/2014 | Lee | ................... | F16M 11/00 361/679.01 |
| 2015/0276540 A1* | 10/2015 | Huseynov | ............. | G01M 3/007 73/1.06 |

FOREIGN PATENT DOCUMENTS

| | | |
|---|---|---|
| EP | 0 822 732 B1 | 2/2004 |
| GB | 2 344 200 A | 5/2000 |

\* cited by examiner

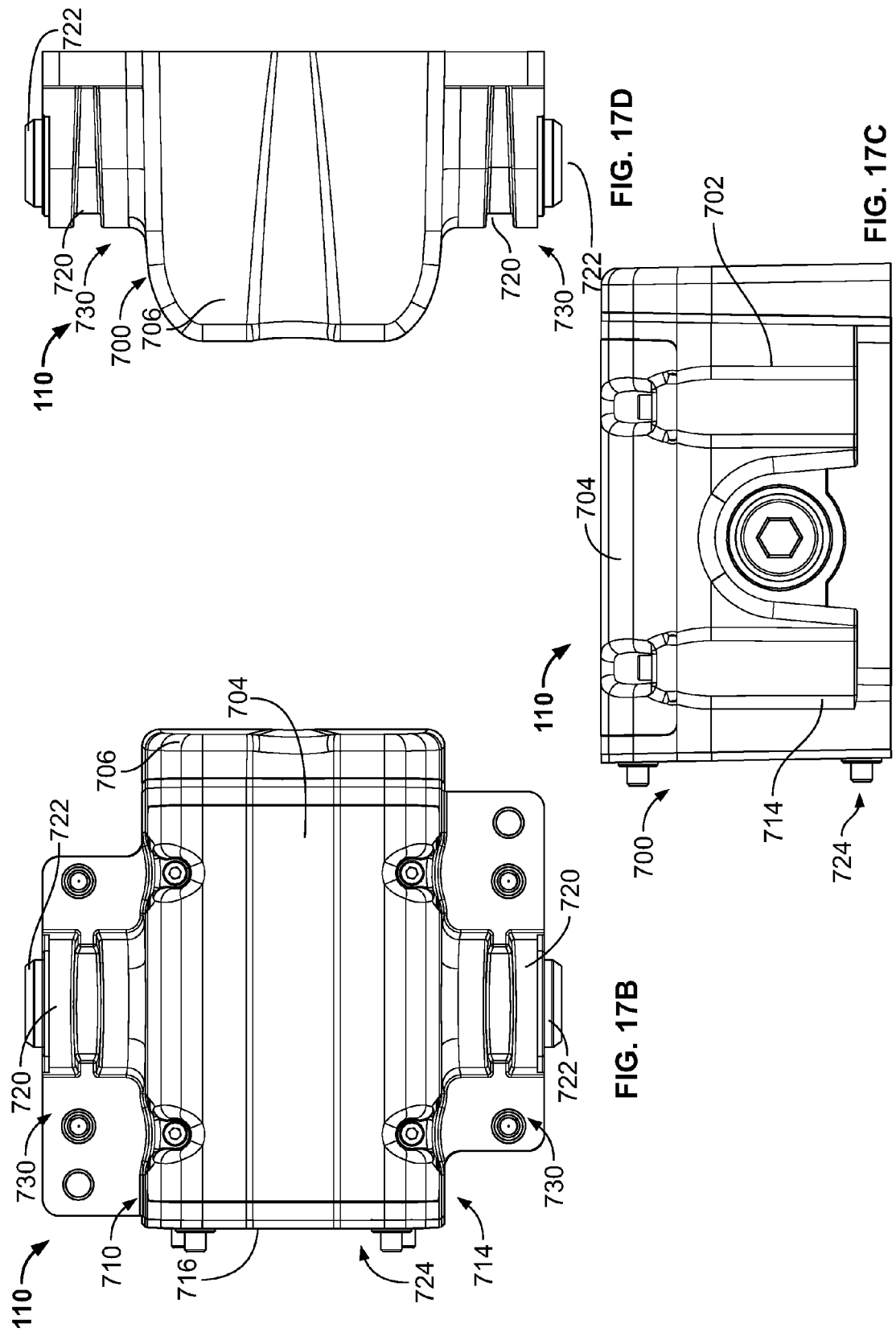

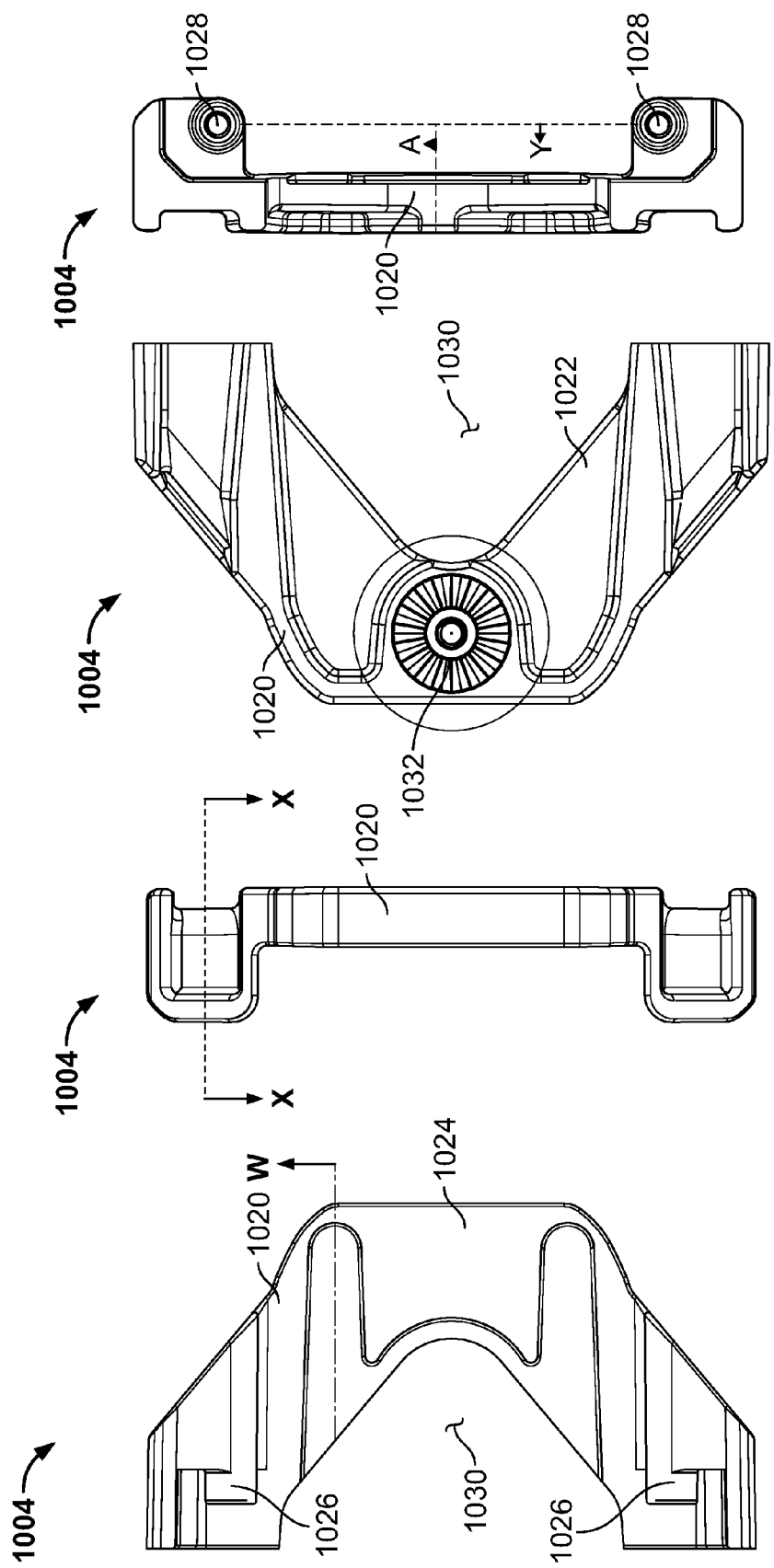

SECTION Y-Y

DETAIL V

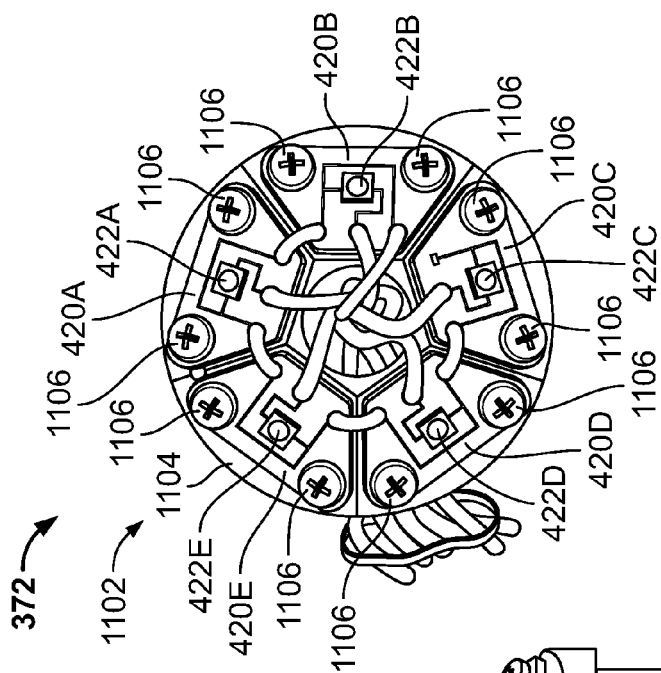
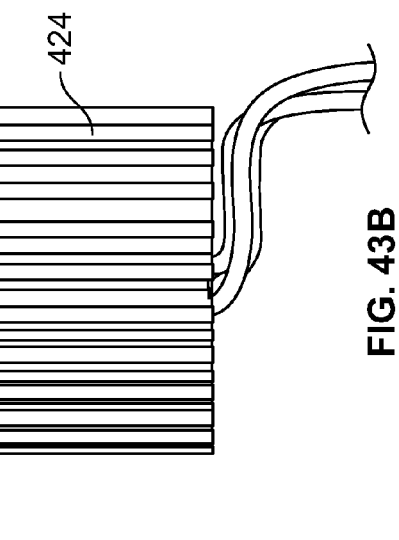
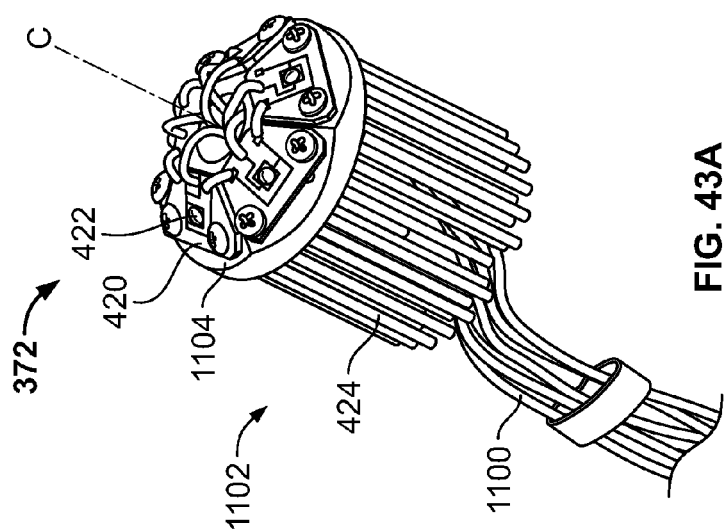
FIG. 43C
FIG. 43B
FIG. 43A

SECTION A-A

WARNING SYSTEM DEVICES

BACKGROUND

An alarm system is widely used as a safety precaution to a hazardous situation. An alarm system typically includes a lighting device and/or a sounding device that switches on automatically when a hazardous situation occurs.

An alarm system intended for use in a hazardous location is typically designed to ensure that it does not initiate an explosion resulting from, for example, arcing contacts, high surface temperature of equipment, or static charge buildup on the surface of the system. Hazardous locations can include concentrations of flammable gases, vapors, mists or dusts. For example, such gases, vapors, mists, and dusts can escape during the production, processing, transportation, and storage of flammable materials in various locations, facilities, and environments, such as the chemical and petrochemical industries, production sites of mineral oil and natural gas, mining fields, and many other sectors.

In certain cases, an alarm system includes multiple electrical components that are electrically connected one another. Cables and cable glands are typically used to connect multiple devices. However, such cables and cable glands are exposed to the hazardous environment and, therefore, can be a source of ignition of any gases, etc.

SUMMARY

In general terms, this disclosure is directed to a warning system with modularized subsystems. In one possible configuration and by non-limiting example, the warning system includes one or more modularized alarm subsystems and one or more modularized coupling devices for coupling the alarm subsystems in various manners. Various aspects are described in this disclosure, which include, but are not limited to, the following aspects.

One aspect is an alarm subsystem for a warning system. The alarm subsystem includes a signaling device for providing an alarm in an event of a predetermined situation; and a modularized protection housing configured to mount the signaling device and contain at least part of the signaling device, the modularized protection housing including a subsystem-side coupling mechanism configured to mount a coupling device, wherein the coupling device is configured to couple the modularized protection housing with another modularized protection housing therethrough. The modularized protection housing is configured to interchangeably mount different types of signaling devices. In certain embodiments, the modularized protection housing and associated constituent parts thereof may be made of a statically conductive thermoset resin.

Another aspect is a protection housing modularized for an alarm subsystem. The protection housing includes a cavity configured to contain at least part of a signaling device; a signaling device mounting mechanism configured to mount different signaling devices thereon; and a coupling mechanism configured to mount a coupling device, the coupling device configured to couple the protection housing with another protection housing therethrough.

Yet another aspect is a coupling device for a warning system. The coupling device includes a wiring chamber configured to electrically connect an alarm subsystem therewithin; a coupler-side coupling mechanism configured to mount the alarm subsystem; and a coupler interconnection mechanism configured to engage another coupling device by a clamping device, the clamping device configured to couple two coupling devices.

Yet another aspect is a warning system including at least one alarm subsystem, a coupling device, and a clamping device. Each of the at least one alarm subsystem includes a signaling device for providing an alert to a predetermined situation; and a protection housing configured to mount the signaling device and contain at least part of the signaling device. The protection housing includes a first coupling mechanism. The protection housing is configured to interchangeably mount different types of signaling devices. The coupling device is configured to mount the alarm subsystem. The coupling device includes a wiring chamber configured to electrically connect the signaling device therewithin; a second coupling mechanism configured to mount the first coupling mechanism; and a coupler interconnection mechanism configured to engage another coupling device. The clamping device is configured to couple two coupling devices by engaging the coupler interconnection mechanisms of the two coupling devices.

The above features and advantages and other features and advantages of the present teachings are readily apparent from the following detailed description for carrying out the present teachings when taken in connection with the accompanying drawings.

BRIEF DESCRIPTION OF THE DRAWINGS

FIG. 17B is a top view of the coupling device of FIG. 16.

FIG. 17C is a front view of the coupling device of FIG. 16.

FIG. 17D is another side view of the coupling device of FIG. 16.

FIG. 40A is a rear side view of the bracket base of FIG. 39A.

FIG. 40B is a top view of the bracket base of FIG. 39A.

FIG. 40C is a front view of the bracket base of FIG. 39A.

FIG. 40D is a bottom view of the bracket base of FIG. 39A.

FIG. 43A is a perspective view of an example LED light of FIG. 10.

FIG. 43B is a side view of the LED light of FIG. 43A.

FIG. 43C is a top view of the LED light of FIG. 43A.

DETAILED DESCRIPTION

Figure 1:
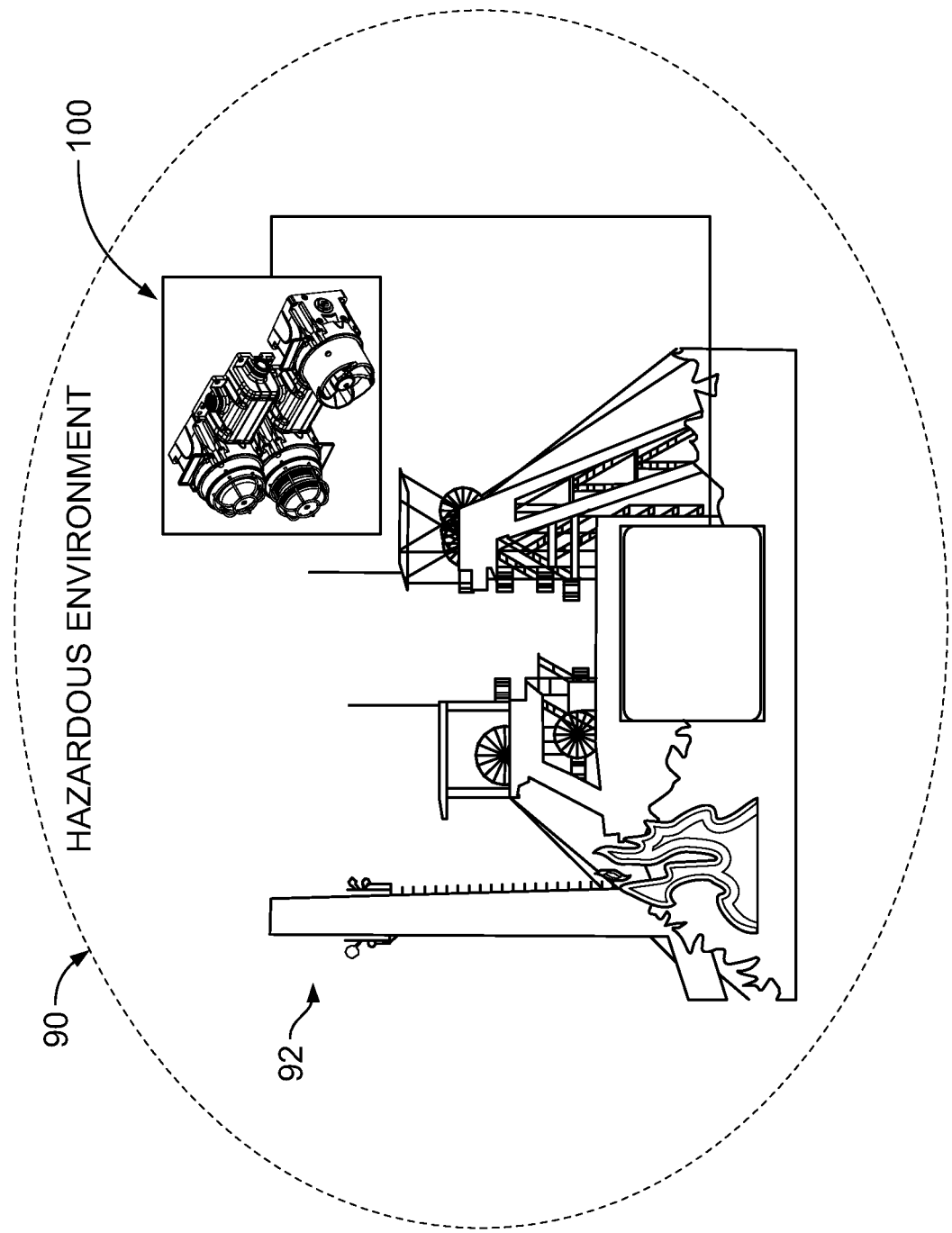
FIG. 1 illustrates a hazardous environment with an example warning system.

Various embodiments will be described in detail with reference to the drawings, wherein like reference numerals represent like parts and assemblies throughout the several views.

FIG. 1 illustrates a hazardous environment 90 with an example warning system 100. In some embodiments, the hazardous environment 90 can be a place in which a dangerous, explosive atmosphere is expected. For example, the hazardous environment 90 is an area where hazardous materials are concentrated and can escape during production, processing, transportation, storage, and other occasions. Examples of hazardous materials can include flammable gases, vapors, mists, dusts, or other dangerous or explosive materials. Hazardous materials can further include corrosive materials, ignitable materials, persistent materials, reactive materials, toxic materials, and combustible materials.

The hazardous environment 90 can result from operation of one or more plants 92 handling dangerous or hazardous materials. In some embodiments, the plants 92 can be referred to as physical plants, mechanical plants, or industrial plants, which are infrastructure necessary to support and maintain one or more facilities. Examples of the plants 92 include chemical plants, petrochemical plants, mineral oil or natural gas production sites, mining fields, and other sectors handling dangerous or hazardous materials. Other locations are possible.

Electrical equipment intended for use in the hazardous environment 90 is typically designed to be protected from explosion possibly resulting from the hazardous environment 90 (e.g., arcing contacts or high surface temperature of equipment). In many occasions, protective regulations, such as laws, specifications, and standards, have been developed to ensure the safety of electrical equipment used in the hazardous environment 90. Thus, electrical equipment should be made to meet such regulations.

One example of the protective regulations is promulgated by the International Electrotechnical Commission (IEC) regulations, which is responsible for international standardization in the field of electrical technology. Some of the IEC publications deal with explosion protection for electrical apparatus and installations. Standardized types of protection according to the IEC regulations include flameproof enclosure protection and increased safety protection.

The flameproof enclosure protection standard is typically designated EX-D, and requires that parts which can ignite a potentially explosive atmosphere be surrounded by an enclosure which withstands the pressure of an explosive mixture exploding inside the enclosure and prevents the propagation of the explosion to the atmosphere surrounding the enclosure. The flameproof enclosure protection standard may be applied to, for example, switchgear, control gear, indicating equipment, control systems, motors, transformers, heating equipment, and light fittings.

The increased safety protection standard is typically designated EX-E, and requires that additional measures be taken to increase the level of safety, thus preventing the possibility of unacceptably high temperatures and the creation of sparks or electric arcs within the enclosure or on exposed parts of electrical apparatus parts, where such ignition sources would not occur under normal operation. The increased safety protection standard may be applied to, for example, terminal and connection boxes, control boxes for installing EX-components, squirrel-cage motors, and light fittings.

The warning system 100 is a system deployed in the hazardous environment 90 to inform of a potential or imminent danger from the hazardous material therein. The warning system 100 is configured to enable people present at the hazardous environment 90 to prepare for the danger and act accordingly to mitigate or avoid it. An example of the warning system 100 is described and illustrated with reference to FIG. 2.

As described herein, the warning system 100 in accordance with the present disclosure includes one or more modularized alarm subsystems of either the same or different type and one or more modularized coupling devices for simply and quickly connecting the alarm subsystems in many different arrangements. In some embodiments, the alarm subsystems of the warning system 100 are designed to meet the EX-D standard, and the coupling devices of the warning system 100 are configured to meet the EX-E standard. The alarm subsystems of the warning system 100 are suitable for any type of device for signaling a predetermined situation (e.g., a lighting device or a sounding device).

The coupling devices of the warning system 100 can quickly and safely mount, and electrically interconnect, one or more alarm subsystems to provide a variety of arrangement or layout of the subsystems in the warning system 100. Using the modularized coupling devices improves efficiency in using space for installing the warning system 100. Further, with the modularized alarm subsystems and coupling devices, the warning system 100 can eliminate cables and cable glands that are used to connect multiple alarm subsystems and other electrical components that are directly exposed to the hazardous environment 90, thereby contributing to an explosion of the warning system 100.

Figure 2:
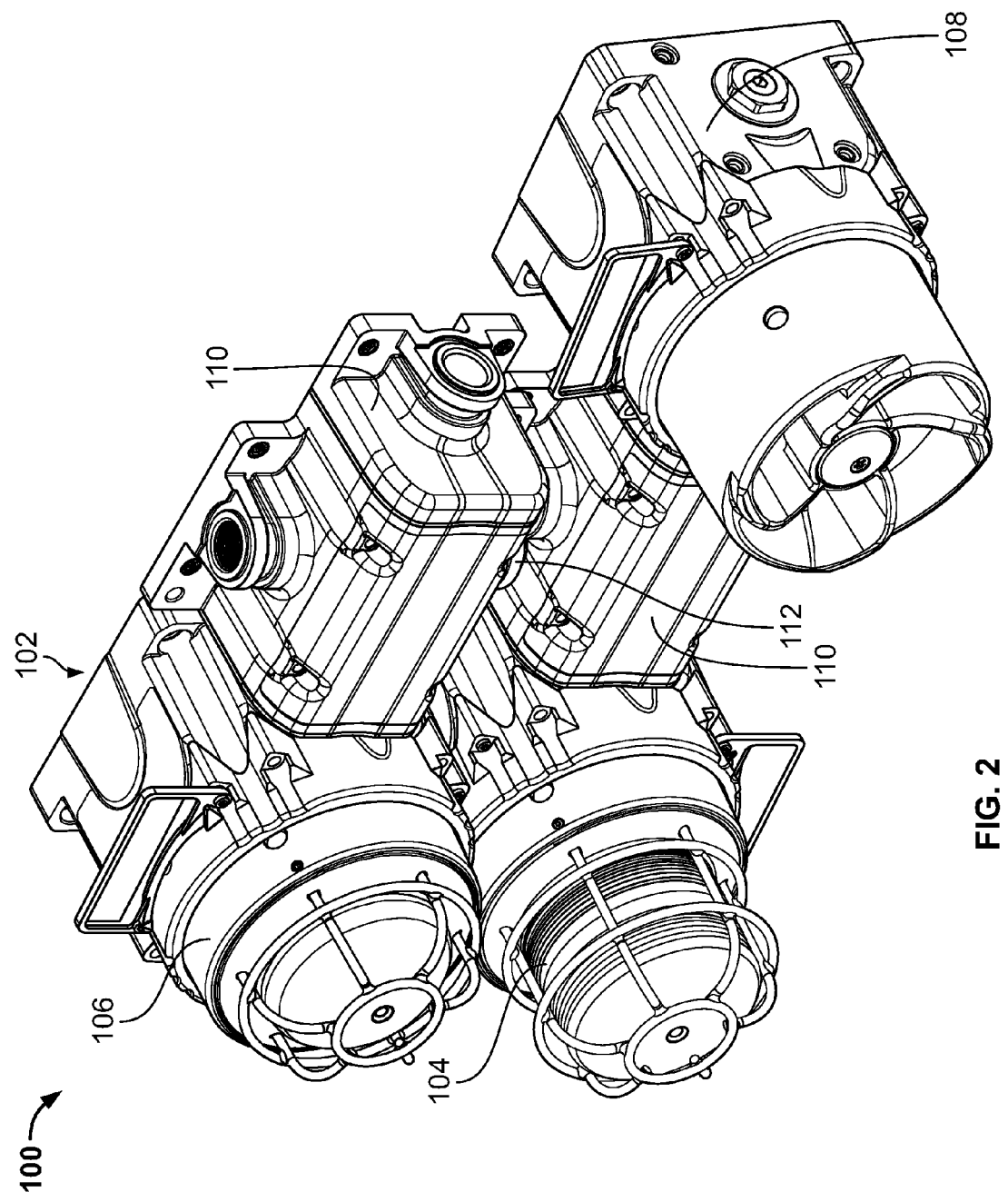
FIG. 2 is an example warning system.

FIG. 2 is an example warning system 100. In some embodiments, the warning system 100 includes one or more alarm subsystems 102, such as a first alarm subsystem 104, a second alarm subsystem 106, and a third alarm subsystem 108. The warning system 100 also includes one or more coupling device 110 and one or more clamping device 112.

The warning system 100 is configured to be installed at a predetermined location at the hazardous environment 90 and operates to alarm people at the hazardous environment 90 of danger resulting from various causes, such as fire, hazardous materials, and flammable gases. Some embodiments of the warning system 100 are configured to include one or more alarm subsystems 102 of different type. For example, the warning system 100 includes one or more alarm subsystems 102 that are selected from at least two of the first alarm subsystem (e.g., a fire alarm subsystem) 104, the second alarm subsystem (e.g., an evacuation alarm subsystem) 106, and the third alarm subsystem (e.g., a hazardous material alarm subsystem) 108.

In other embodiments, the warning system 100 can include one or more alarm subsystems 102 of the same type. For example, the warning system 100 can include one or more of alarm subsystems that are selected from one of the first alarm subsystem 104, the second alarm subsystem 106, and the third alarm subsystem 108. In the depicted example of FIG. 2, the warning system 100 includes one first alarm subsystem 104, one second alarm subsystem 106, and one third alarm subsystem 108.

The alarm subsystems 102 are configured to interchangeably mount signaling devices of different type so as to provide, for example, the first, second, and third alarm subsystems 104, 106, and 108. Further, the alarm subsystems 102 are modularized to be connected in various manners through one or more coupling devices 110, as exemplified in FIG. 25. In some embodiments, the alarm subsystems 102 are made to be protected against internal explosion. For example, the alarm subsystems 102 are designed to meet the flameproof enclosure protection standard (EX-D).

The first alarm subsystem 104 is an example of the alarm subsystem 102. In some embodiments, the first alarm subsystem 104 is configured as a fire alarm subsystem, and thus can be referred to herein as the fire alarm subsystem 104. The fire alarm subsystem 104 is a device for detecting presence of smoke or fire and alerting people through visual and/or audio appliance. The fire alarm subsystem 104 can be activated in various manners. For example, the fire alarm subsystem 104 can be operated using smoke detecting mechanism, heat detecting mechanism, water flow sensing mechanism, or other mechanisms suitable for detecting the presence of fire. In the depicted example, the fire alarm subsystem 104 is configured as a visual signaling device. An example of the fire alarm subsystem 104 is illustrated and described with reference to FIG. 3.

The second alarm subsystem 106 is an example of the alarm subsystem 102. In some embodiments, the second alarm subsystem 106 is configured as an evacuation alarm subsystem 106, and thus can be referred to herein as the evacuation alarm subsystem 106. The evacuation alarm subsystem 106 is a device for alarming people to evacuate the place at which they are present. Similarly to the fire alarm subsystem 104, the evacuation alarm subsystem 106 can include visual and/or audio appliance. In the depicted example, the evacuation alarm subsystem 106 is configured as a visual signaling device. An example of the evacuation alarm subsystem 106 is illustrated and described with reference to FIG. 7.

The third alarm subsystem 108 is an example of the alarm subsystem 102. In some embodiments, the third alarm subsystem 108 is configured as a hazardous material alarm subsystem, and thus can be referred to herein as the hazardous material alarm subsystem 108. The hazardous material alarm subsystem 108 is a device for detecting presence of hazardous material and providing visual and/or audio alert to people at the site. In the depicted example, the hazardous material alarm subsystem 108 is configured as an audio signaling device. An example of the hazardous material alarm subsystem 108 is illustrated and described with reference to FIG. 11.

Although the fire alarm subsystem 104, the evacuation alarm subsystem 106, and the hazardous material alarm subsystem 108 are primarily illustrated and described as examples of the alarm subsystem 102 in the present disclosure, the alarm subsystem 102 can include other types of subsystems configured to alarm various situations, such as dangerous, hazardous, explosive, and/or emergency occasions.

The coupling devices 110 are used to connect one or more alarm subsystems 102 in various manners. In some embodiments, the coupling device 110 is configured to physically interconnect adjacent alarm subsystems 102. The coupling device 110 can also provide a wiring chamber 732 (FIG. 18) through which one or more alarm subsystems 102 are wired without using external conduit, armored cables, and/or cable glands. An example of the coupling device 110 is illustrated and described with reference to FIG. 16.

In some embodiments, the coupling device 110 is designed to meet the increased safety protection standard (EX-E) to prevent creation of sparks or electric arcs therein.

The clamping device 112 is configured to couple two coupling devices 110. As described below, the clamping device 112 is configured to cooperate with a coupler interconnection mechanism 730 (FIG. 16) of one coupling device 110 and a coupler interconnection mechanism 730 of another coupling device 110. An example of the clamping device 112 is illustrated and described with reference to FIG. 21-24.

Referring to FIGS. 3-6, an example first alarm subsystem 104 is described and illustrated in more detail. As described above, the first alarm subsystem 104 is one embodiment of the alarm subsystem 102, and configured as a fire alarm subsystem. Thus, the first alarm subsystem 104 can also be referred to herein as the fire alarm subsystem 104. As described below, the first alarm subsystem 104 is configured as a visual signaling device.

Figure 3:
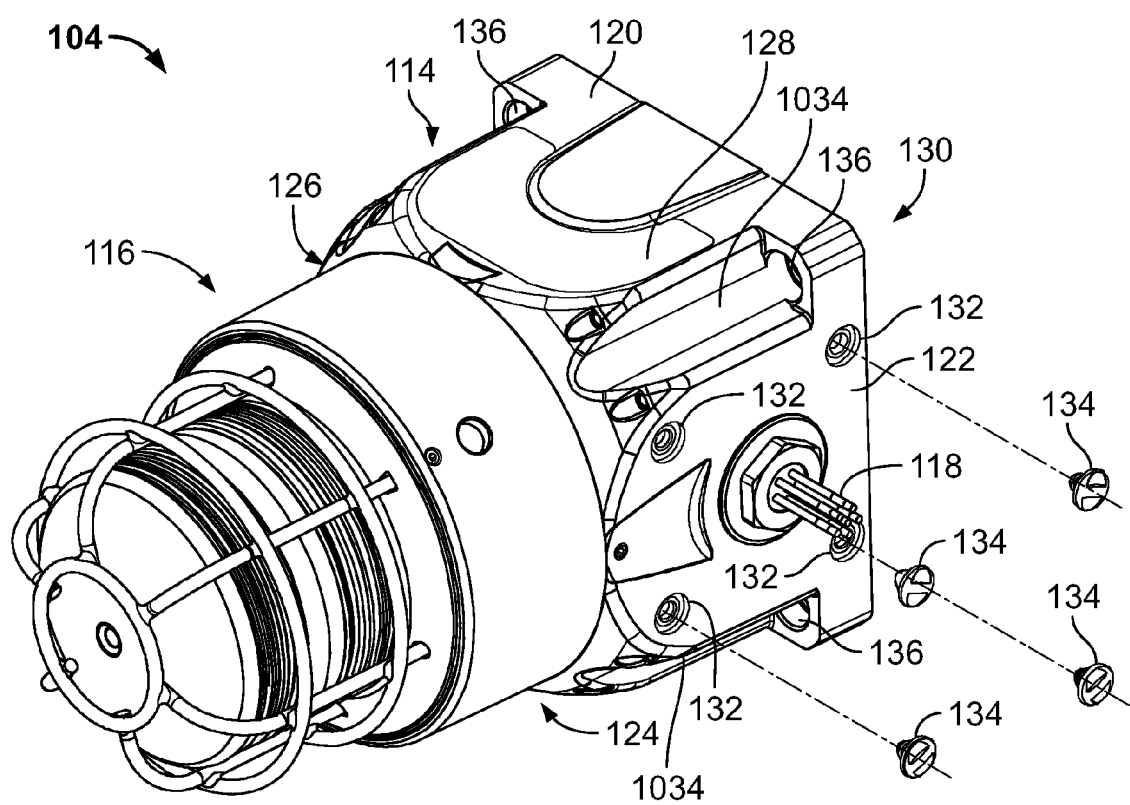
FIG. 3 is a perspective view of an example first alarm subsystem, which is configured as a strobe lighting alarm subsystem.
Figure 4B:
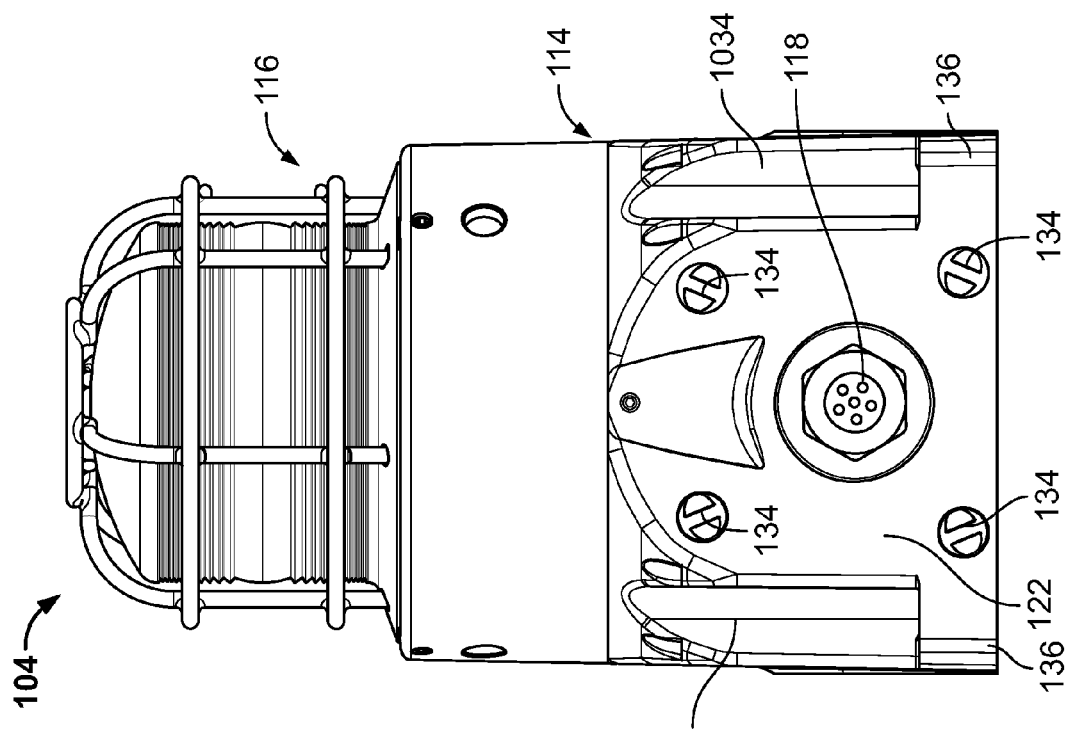
FIG. 4B is a side view of the first alarm subsystem of FIG. 3.
Figure 4A:
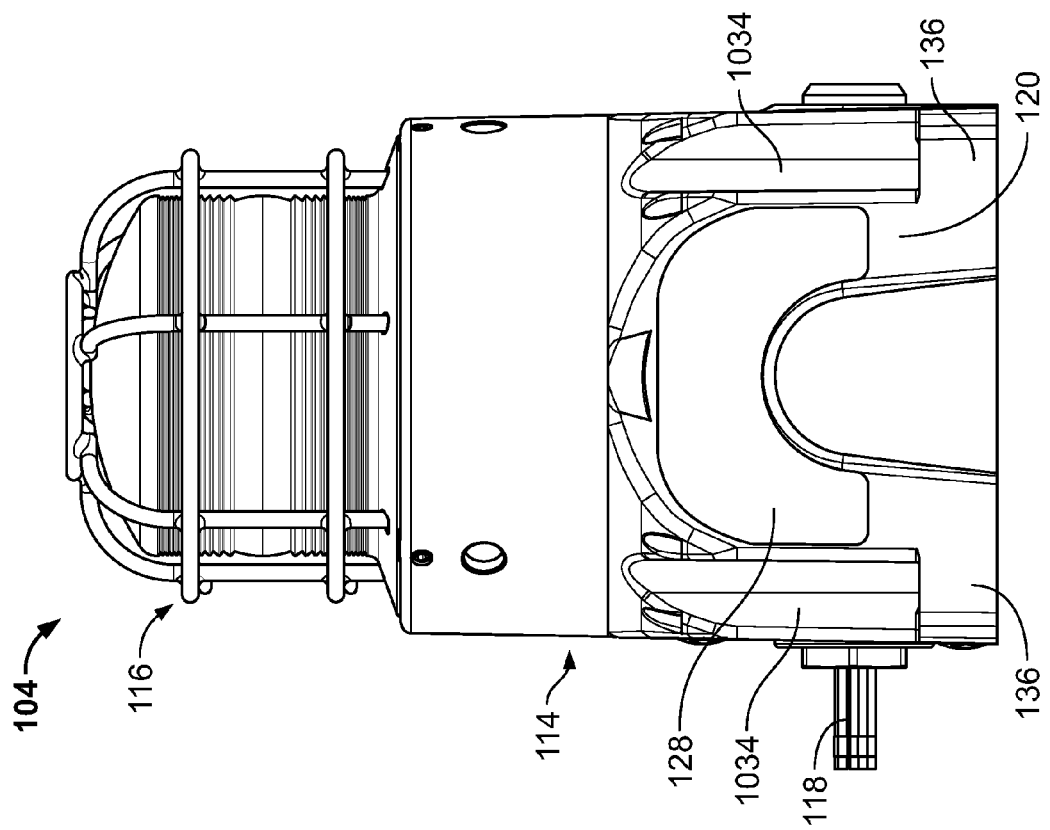
FIG. 4A is a front view of the first alarm subsystem of FIG. 3.

FIG. 3 is a perspective view of an example first alarm subsystem 104. FIG. 4A is a front view of the first alarm subsystem 104 of FIG. 3, and FIG. 4B is a side view of the first alarm subsystem 104 of FIG. 3. In some embodiment, the first alarm subsystem 104 includes a protection housing 114 and a first signaling device 116.

The protection housing 114 is an enclosure configured to receive and contain at least part of the first signaling device 116 and wiring components (e.g., wiring cables 118) associated with the first signaling device 116. As described herein, the protection housing 114 is modularized to interchangeably mount other signaling devices (e.g., a second signaling device 316 and a third signaling device 516).

In some embodiments, the protection housing 114 is made to contain an explosion therewithin. For example, the protection housing 114 is designed to meet the flameproof enclosure protection standard (EX-D), and thus can be referred to herein as an EX-D housing or chamber.

In some embodiments, the protection housing 114 is shaped as substantially a rectangular box having four side walls 120, 122, 124 and 126. As illustrated in FIGS. 3 and 4A, the protection housing 114 can include a label 128 attached on an outer surface of one of the four side walls 120, 122, 124 and 126 (e.g., a first side wall 120 in the depicted example). The label 128 is used to describe the information about the first alarm subsystem 104, such as model descriptions, specifications, relevant regulations, and other information associated with the first alarm subsystem 104.

Referring to FIGS. 3 and 4B, the protection housing 114 can include a coupling mechanism 130 for mounting the coupling device 110. In some embodiments, the coupling mechanism 130 includes a plurality of insert sockets 132 formed on one of the four side walls 120, 122, 124 and 126 of the protection housing 114. In the depicted example, four insert sockets 132 are formed in a second side wall 122 of the protection housing 114. In other embodiments, a different number of insert sockets 132 can be formed in the same or different side wall of the protection housing 114.

The insert sockets 132 are configured to receive fasteners 742 (FIG. 18) that engage a portion of the coupling device 110 as the fasteners 742 are inserted into the insert sockets 132, thereby joining the coupling device 110 to the protection housing 114. In some embodiments, the insert sockets 132 are internally threaded to receive the fasteners 742 (e.g., screws) that first engage the coupling device 110 before being screwed into the insert sockets 132 so that the coupling device 110 is threadedly fastened onto the protection housing 114. In other embodiments, the coupling mechanism 130 may utilize different types of fastening devices, such as bolts, brass fasteners, cable ties, clamps, clips, pins, latches, retaining rings, rivets, snap fasteners, staples, and other mechanical fasteners.

In some embodiments, the protection housing 114 includes a plurality of protection covers 134 configured to be inserted into the insert sockets 132. The protection covers 134 are configured to cover the insert sockets 132 when the protection housing 114 does not mount the coupling device 110 through the insert sockets 132. The protection covers 134 are used for cosmetic purposes, and/or for sealing the insert sockets 132, when the insert sockets 132 are not in use, so as to minimize corrosion of any metallic material within the insert sockets 132 (e.g., brass inserts placed within the insert sockets 132 for fastening purposes). Examples of the protection covers 134 include plugs made of thermoplastic elastomer. A portion of each plug can be compressively inserted to block insert sockets 132.

The protection housing 114 can also include a mounting portion 136 configured to mount the protection housing 114 onto a predetermined location. In some embodiments, the mounting portion 136 includes one or more openings through which one or more fasteners pass to install the protection housing 114 onto the predetermined location. For example, screws can be inserted through the openings of the mounting portion 136 and screwed into the predetermined location to affix the protection housing 114 thereto.

The first signaling device 116 operates to provide an alert to a predetermined situation in various manners. In this example, the first signaling device 116 is used to alert any presence, or imminent threat, of fire or smoke at a site where the alarm subsystem 104 is installed. In this disclosure, the first signaling device 116 is illustrated as a first light emission device.

In certain embodiments, at least part of the protection housing 114, at least part of the first signaling device 116, and other associated components of the first alarm subsystem 104 can be made of a statically conductive thermoset resin.

Figure 5:
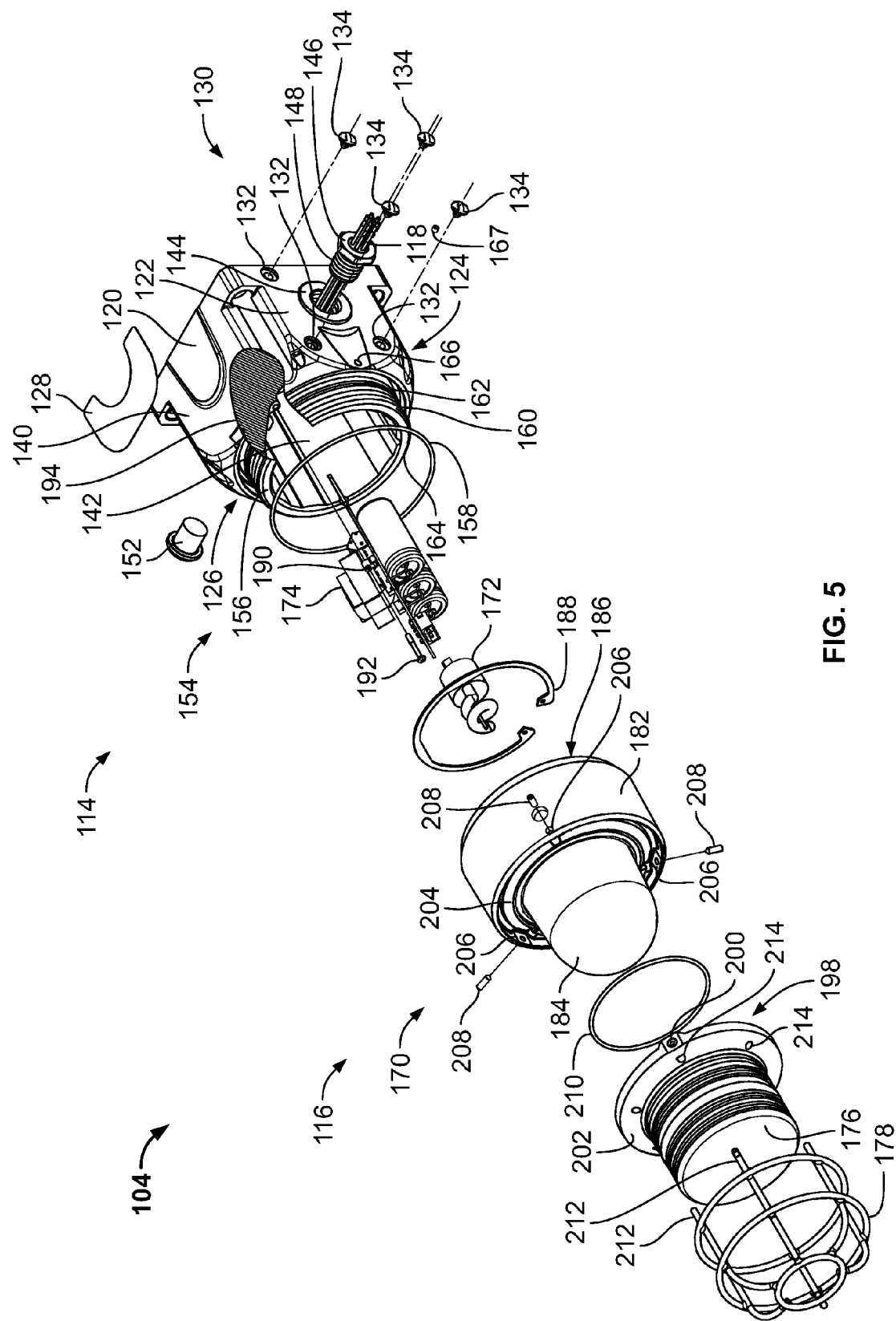
FIG. 5 is an exploded view of the first alarm subsystem of FIG. 3.
Figure 6:
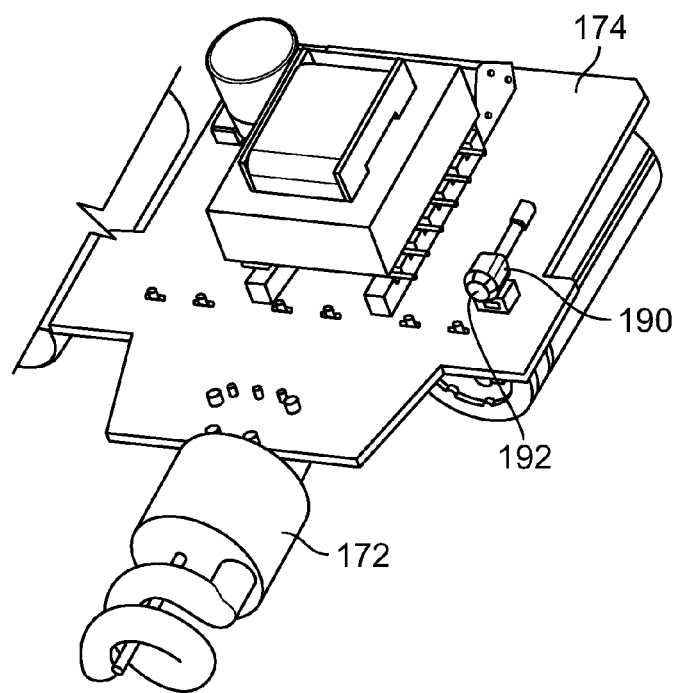
FIG. 6 is a schematic perspective view of an example electric connection between an electric strobe light and a strobe light circuit.

FIG. 5 is an exploded view of the first alarm subsystem 104 of FIG. 3, illustrating the protection housing 114 and the first signaling device 116 in more detail.

The protection housing 114 is an enclosure 140 defining a cavity 142 for receiving at least some components of the first signaling device 116. The protection housing 114 is open at a top of the enclosure 140 such that the components of the first signaling device 116 are inserted through the opening at the top of the enclosure 140. As described above, the enclosure 140 has four side walls 120, 122, 124 and 126.

The enclosure 140 can be designed to meet one or more safety protection standards, such as the flameproof enclosure protection standard (EX-D). In some embodiments, the enclosure 140 can have a thickness of 14.6 mm at the minimum.

The protection housing 114 can include a wiring conduit 144 through which one or more wiring cables 118 pass. In the depicted example, the wiring conduit 144 is formed in the second side wall 122. The wiring cables 118 are configured to electrically connect the first signaling device 116 to other electrical components outside the protection housing 114. The wiring cables 118 are electrically connected to the first signaling device 116 and run out of the enclosure 140 of the protection housing 114. As described below, the wiring cables 118 can be terminated on an electrical connector 770 within the coupling device 110 coupled to the first alarm subsystem 104.

The protection housing 114 can include a bushing 146 configured to engage the wiring conduit 144. In some embodiments, the bushing 146 is disposed between the protection housing 114 and the coupling device 110 adjacent to the protection housing 114 and operates as a barrier therebetween to prevent the explosion from transferring from the protection housing 114 to the coupling device 110. The bushing 146 eliminates the necessity of using a heavy duty cable gland that would otherwise be used to prevent the explosion transferring from the alarm subsystem 102. The bushing 146 is an insulated element configured to allow the wiring conduit 144 to pass safely through a wall (e.g., the second side wall 122) of the enclosure 140.

The bushing 146 is designed to provide a lining for the wiring conduit 144 through which the wiring cables 118 pass, providing insulation and mechanical protection for the wiring cables 118. In some embodiments, the bushing 146 is a line bushing having an externally threaded portion 148. The wiring conduit 144 has an internally threaded portion that corresponds with the externally-threaded portion 148 of the bushing 146 so that the bushing 146 is screwed into the wiring conduit 144. One example of the bushing 146 is a line bushing, such as part number LBSM20206/0.75FS, available from Quintex GmbH.

Although only one wiring conduit 144 and one bushing 146 are illustrated in FIG. 5, the protection housing 114 can include a plurality of wiring conduits 144 and bushings 146. For example, in addition to the wiring conduit 144 formed on the second side wall 122 of the enclosure 140, another wiring conduit can be formed on a fourth side wall 126. The enclosure 140 can have other wiring conduits formed on its side walls.

In some embodiments, the protection housing 114 further includes a conduit cover 152 configured to engage and block the wiring conduit 144. The conduit cover 152 is configured to be inserted into the wiring conduit 144 when the wiring conduit 144 is not in use. The conduit cover 152 is used to seal the wiring conduit 144 when the wiring conduit 144 does not engage the associated busing 146. In some embodiments, the conduit cover 152 is configured as a plug that enables the protection housing 114 to meet the flameproof enclosure protection standard (EX-D). The conduit cover 152 can be made of brass to satisfy the EX-D standard.

The protection housing 114 can include a signaling device mounting mechanism 154 configured to mount the first signaling device 116 onto the protection housing 114. The signaling device mounting mechanism 154 is configured to sealingly engage the first signaling device 116 such that the first alarm subsystem 104, which includes the protection housing 114 and the first signaling device 116, contains an explosion therein, thereby meeting one or more safety standards, such as EX-D. In some embodiments, the signaling device mounting mechanism 154 includes a mounting neck 156 and a sealing element 158. In other embodiments, the signaling device mounting mechanism 154 further include a pin support 166.

The mounting neck 156 extends from the top portion of the enclosure 140 to engage the first signaling device 116. In some embodiments, the mounting neck 156 is configured as a cylindrical wall and has a threaded portion 160 externally formed on the cylindrical wall. As described below, the threaded portion 160 of the mounting neck 156 is screwed with the first signaling device 116 (e.g., a cap portion 182 thereof) to mount the first signaling device 116 onto the protection housing 114.

The sealing element 158 is used to provide sealing between the protection housing 114 and the first signaling device 116 when they are assembled. In some embodiments, the sealing element 158 is disposed at a sealing groove 162 formed at a bottom of the mounting neck 156. In some embodiments, the sealing element 158 is a silicone O-ring. One example of the sealing element 158 has a hardness of 50-70 durometer.

The pin support 166 is a hole formed in the protection housing 114 to be in communication with the sealing groove 162. The pin support 166 is configured to receive a set screw 167 (e.g., a knurled set screw) such that the set screw 167 engages a portion of the cap portion 182 (e.g., a bottom lip 186 thereof) and locks the cap portion 182 (e.g., the bottom lip 186 thereof) in place to a housing relief via the pin support 166 when the cap portion 182 (e.g., the bottom lip 186 thereof) seats on the sealing groove 162.

Referring again to FIG. 5, the first signaling device 116 can include a device body 170, an electric light 172, a light circuit 174, a lens element 176, and a lens guard 178.

The device body 170 is configured to receive the electric light 172 and mounted onto the protection housing 114. In some embodiments, the device body 170 includes a cap portion 182 and a light cover portion 184.

The cap portion 182 has a hollow therein for receiving the electric light 172. In some embodiments, the hollow of the cap portion 182 can also receive at least a portion of the light circuit 174. The cap portion 182 is configured to engage the signaling device mounting mechanism 154 such that the device body 170 is mounted onto the protection housing 114. In some embodiments, the cap portion 182 is shaped as a cylindrical body having a threaded portion internally formed on an inner surface of the cylindrical body of the cap portion 182. The internally-threaded portion of the cap portion 182 corresponds with the externally-threaded portion 160 of the mounting neck 156. The cap portion 182 can be screwed onto the mounting neck 156 such that the internally-threaded portion of the cap portion 182 and the externally-threaded portion 160 of the mounting neck 156 are engaged to provide threaded fastening. This configuration is illustrated and described in more detail with regard to the third alarm subsystem 108 in FIG. 14.

In some embodiments, the cap portion 182 has a bottom lip 186 configured to be inserted into the sealing groove 162 and held by the set screw 167 (e.g., a knurled set screw) through the pin support 166.

As described above, the sealing element 158 (e.g., an O-ring) is disposed at the sealing groove 162 formed around the bottom of the mounting neck 156 and abuts the bottom lip 186 of the cap portion 182 when the device body 170 is mounted onto the protection housing 114. This configuration is illustrated and described in more detail with regard to the third alarm subsystem 108 in FIG. 14.

The light cover portion 184 extends from the cap portion 182 and is shaped as a dome for receiving at least a portion of the electric light 172 thereunder. The light cover portion 184 can operate as a cover of the electric light 172. Thus, the light cover portion 184 is dimensioned to substantially cover the electric light 172 thereunder. In some embodiments, the light cover portion 184 is made of glass material, such as borosilicate glass. In some embodiments, the light cover portion 184 has a thickness of about 6.35 mm at the minimum. In other embodiments, the light cover portion 184 may have various shapes and/or dimensions suitable for covering at least a portion of the electric light 172 thereunder. In some embodiments, the light cover portion 184 and the cap portion 182 are separately made and coupled together in various manners (e.g., using fasteners or adhesives). A cemented joint between the light cover portion 184 and the cap portion 182 can be filled with a sealing material (e.g., room temperature vulcanization (RTV) silicone) for providing adequate flame path sealing of at least 10 mm in length.

In some embodiments, a dome retaining ring 188 is disposed within the device body 170 between a bottom portion of the light cover portion 184 and a lip 164 of the mounting neck 156 when the device body 170 is mounted onto the protection housing 114. The dome retaining ring 188 can seat against the lip 164 of the mounting neck 156 and support the light cover portion 184 with respect to the cap portion 182 and/or the protection housing 114.

The electric light 172 operates to emit light to visually alarm a detected situation. As described herein, the first alarm subsystem 104 is used as a fire alarm subsystem, and thus the electric light 172 is used to provide a visual alarm on fire or smoke. The electric light 172 can be of various types. In some embodiments, the electric light 172 is a flashtube, such as a strobe light. In this example, therefore, the first alarm subsystem 104 can also be referred to herein as a strobe lighting alarm subsystem. A strobe light is a device used to produce regular flashes of light. One example of the electric light 172 is a xenon flash lamp with a maximum input energy of 21 Joules. In other embodiments, the electric light 172 can include other types of lighting elements.

The light circuit 174 is configured to connect the electric light 172 and operate the electric light 172 as necessary. In some embodiments, the light circuit 174 is configured as a printed circuit board (PCB). The light circuit 174 can include a mounting opening 190 through which a circuit mounting fastener (e.g., a screw) 192 passes. The circuit mounting fastener 192 engages a circuit mounting hole 194 formed in the enclosure 140 of the protection housing 114 so that the light circuit 174 is mounted into the enclosure 140 of the protection housing 114. An example electric connection between the electric light 172 and the light circuit 174 is further illustrated in FIG. 6.

The lens element 176 operates to improve visibility of light from the electric light 172. In some embodiments, the lens element 176 is shapes as a dome to cover or surround the light cover portion 184 of the device body 170. The lens element 176 is coupled to the device body 170 such that the lens element 176 is placed above the light cover portion 184 of the device body 170. An example of the lens element 176 is made of a transparent polycarbonate lens, such as Bayer Makrolon AL2647 and Sabic LS2. In other embodiments, the lens element 176 can have various shapes, other than a dome shape, suitable to be placed above the light cover portion 184.

The lens element 176 can further include a body coupling mechanism 198 configured to mount the device body 170. In some embodiments, the body coupling mechanism 198 is configured as one or more fastener sockets 200 formed on the lens element 176. For example, the lens element 176 has a flange portion 202, and the fastener sockets 200 are formed on a lateral perimeter of the flange portion 202. In the illustrated example, the lens element 176 has three fastener sockets 200 evenly spaced apart around the lateral perimeter of the flange portion 202 of the lens element 176. The flange portion 202 of the lens element 176 is configured to seat on a recessed portion 204 of the device body 170 as the lens element 176 is coupled to the device body 170.

The device body 170 includes one or more fastener holes 206 for engaging one or more fasteners 208. In some embodiments, the fastener holes 206 are formed around a lateral wall that defines the recessed portion 204 of the device body 170. In the illustrated example, the device body 170 includes three fastener holes 206 that are evenly spaced and correspond to the fastener sockets 200 when the lens element 176 is abutted with the device body 170. The fasteners 208 first pass through the fastener holes 206 and are inserted into the fastener sockets 200.

In some embodiments, the fastener sockets 200 are internally threaded and the fasteners 208 are knurled set screws such that the fasteners 208 are screwed into the fastener sockets 200 of the lens element 176 once the fasteners 208 have passed through the fastener holes 206 of the device body 170, thereby fastening the lens element 176 to the device body 170 in place. In other embodiments, the lens element 176 can be installed onto the device body 170 in different manners, such as bolts, rivets, welding, and adhesives.

In some embodiments, a lens sealing element 210 is disposed between the device body 170 and the lens element 176 to provide sealing therebetween. Examples of the lens sealing element 210 include a silicone O-ring. The lens sealing element 210 can be seated at the recessed portion 204 of the device body 170 to surround a bottom portion of the light cover portion 184 of the device body 170.

The lens guard 178 operates to protect the lens element 176. In some embodiments, the lens guard 178 is made with wires to cover the lens element 176. Examples of the wires include 300 series stainless steel with 4 mm wire diameter. In the illustrated example, the lens guard 178 is configured to have one or more legs 212 configured to support the lens guard 178 with the lens element 176. For example, the lens element 176 includes one or more mounting holes 214 corresponding to the legs 212 of the lens guard 178 such that the legs 212 of the lens guard 178 engage the corresponding mounting holes 214. In some embodiments, the fasteners 208 (e.g., knurled set screws) can lock in place the corresponding legs of the lens guard 170 when fully mounted through the fastener holes 206 of the device body 170 and the threaded fastener sockets 200 of the lens element 176. In other embodiments, the lens guard 178 can be fixed to the lens element 176 in different manners, such as screws, bolts, rivets, welding, and adhesives.

Referring to FIGS. 7-10, an example second alarm subsystem 106 is described and illustrated in more detail. As described above, the second alarm subsystem 106 is one embodiment of the alarm subsystem 102, and configured as an evacuation alarm subsystem 106. Thus, the second alarm subsystem 106 can also be referred to herein as the evacuation alarm subsystem 106. As described below, the evacuation alarm subsystem 106 is configured as a visual signaling device.

Figure 7:
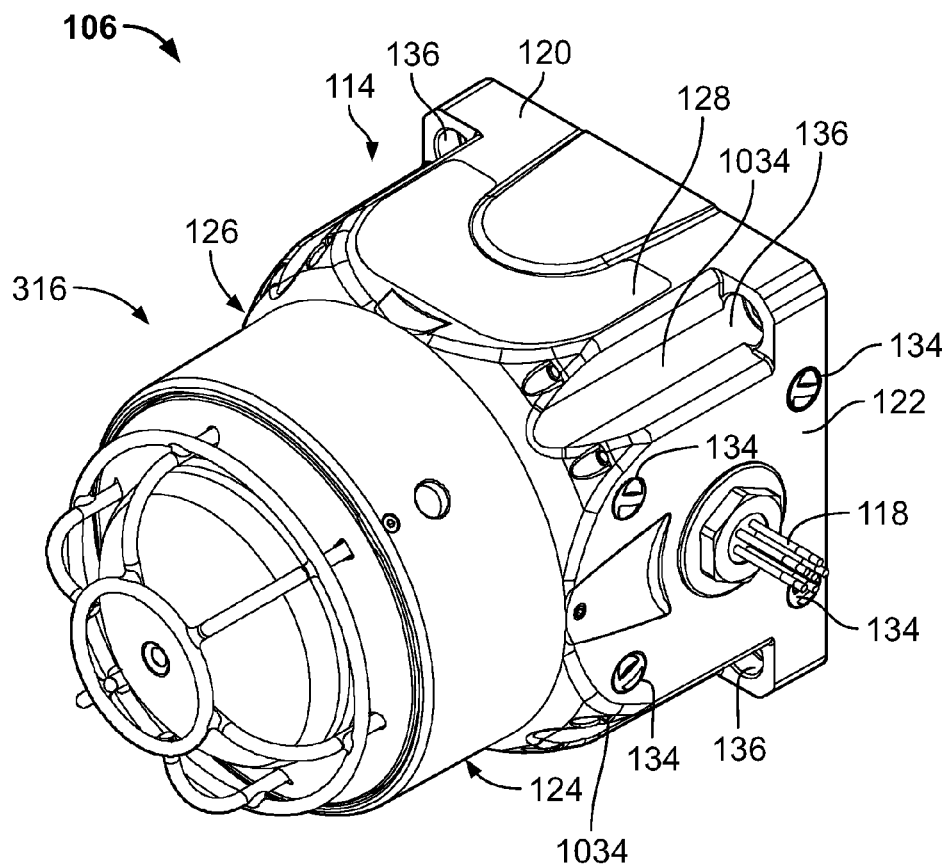
FIG. 7 is a perspective view of an example second alarm subsystem, which is configured as a LED lighting alarm subsystem.
Figure 8:
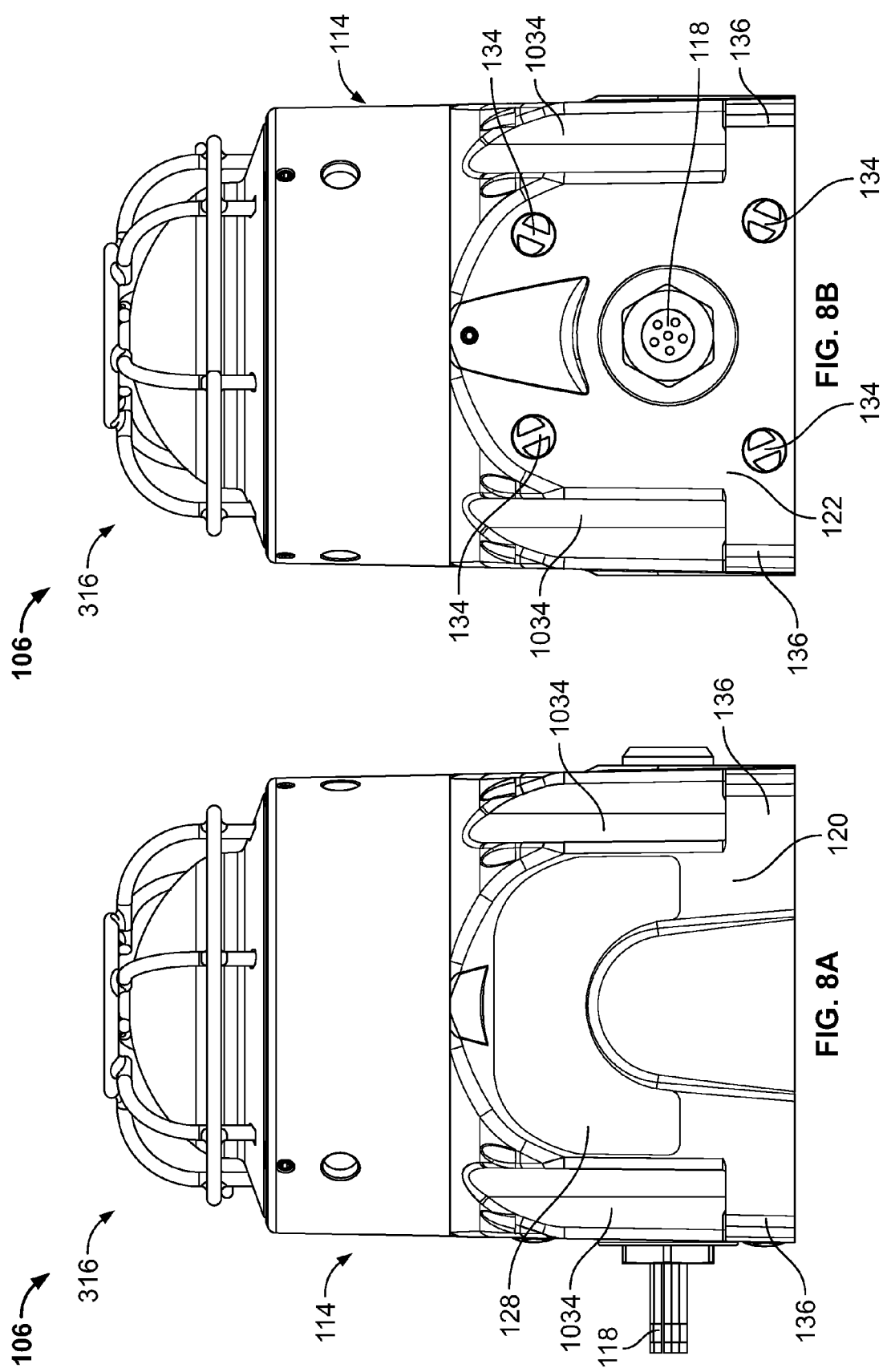
FIG. 8A is a front view of the second alarm subsystem of FIG. 7.
FIG. 8B is a side view of the second alarm subsystem of FIG. 7.

FIG. 7 is a perspective view of an example second alarm subsystem 106. FIG. 8A is a front view of the second alarm subsystem 106 of FIG. 7, and FIG. 8B is a side view of the second alarm subsystem 106 of FIG. 7. In some embodiment, the second alarm subsystem 106 includes the protection housing 114 and a second signaling device 316.

The protection housing 114 for the second alarm subsystem 106 is the same as the protection housing 114 used for the first alarm subsystem 104. As described herein, the protection housing 114 is modularized to be used with different types of signaling devices, such as the first signaling device 116, the second signaling device 316, and a third signaling device 516. The protection housing 114 can interchangeably mount such different signaling devices. For example, as described herein, a device body (e.g., the device body 170, 370, and 570) of each alarm subsystem includes a common coupling mechanism (e.g., the cap portion 182, 382, and 582) configured to engage the signaling device mounting mechanism 154 of the protection housing 114. The description of the protection housing 114 is not repeated with respect to the second alarm subsystem 106 for brevity purposes, and the same reference numbers will be used, as possible, where like or similar features or elements are shown.

The second signaling device 316 operates similarly to the first signaling device 116. In general, the second signaling device 316, as part of the evacuation alarm subsystem, is used to alarm people to evacuate the place where they are. In the depicted example, the second signaling device 316 is configured as a second light emission device. An example of the second signaling device 316 is illustrated and described in more detail with reference to FIGS. 9-10.

In certain embodiments, at least part of the protection housing 114, at least part of the second signaling device 316, and other associated components of the second alarm subsystem 106 can be made of a statically conductive thermoset resin.

Figure 9:
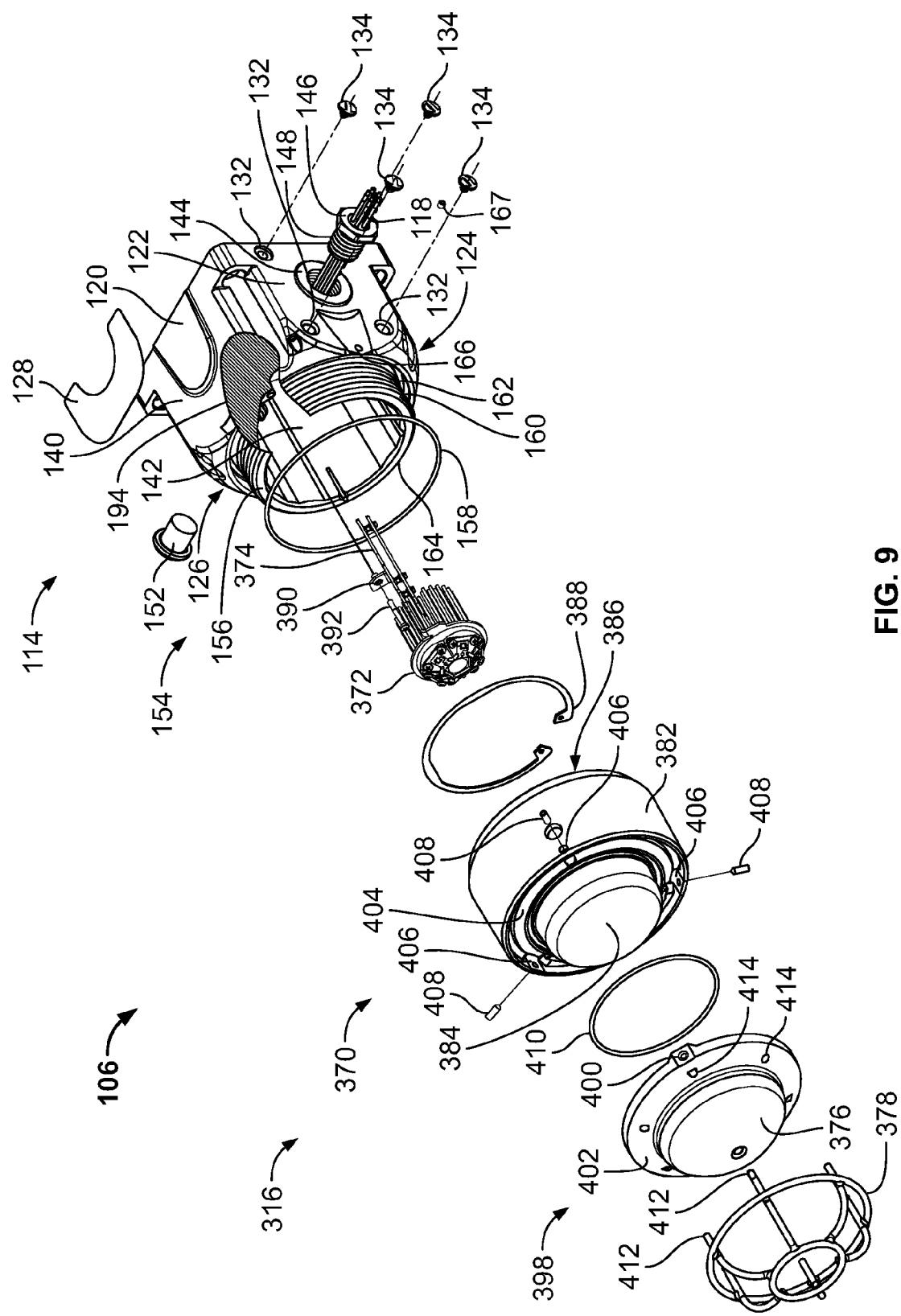
FIG. 9 is an exploded view of the second alarm subsystem of FIG. 7.

FIG. 9 is an exploded view of the second alarm subsystem 106 of FIG. 7, illustrating the protection housing 114 and the second signaling device 316 is more detail.

As the protection housing 114 of the second alarm subsystem 106 is the same as the protection housing 114 of the first alarm subsystem 104, the description of the protection housing 114 of the second alarm subsystem 106 is omitted and the same reference numbers will be used herewith for the same or similar features or elements.

The second signaling device 316 can include a device body 370, an electric light 372, a light circuit 374, a lens element 376, and a lens guard 378.

The device body 370 is configured to receive the electric light 372 and mounted onto the protection housing 114. In some embodiments, the device body 370 includes a cap portion 382 and a light cover portion 384.

The cap portion 382 is configured similarly to the cap portion 182 of the device body 170. In some embodiments, the cap portion 382 has a hollow therein for receiving at least a portion of the electric light 372. In some embodiments, the hollow of the cap portion 382 can also receive at least a portion of the light circuit 374. Similarly to the cap portion 182, the cap portion 382 is configured to engage the signaling device mounting mechanism 154 such that the device body 370 is mounted onto the protection housing 114. For example, the cap portion 382 is shaped as a cylindrical body having a threaded portion internally formed on an inner surface of the cylindrical body of the cap portion 382. The internally-threaded portion of the cap portion 382 corresponds with the externally-threaded portion 160 of the mounting neck 156. The cap portion 382 can be screwed onto the mounting neck 156 such that the internally-threaded portion of the cap portion 382 and the externally-threaded portion 160 of the mounting neck 156 are engaged to provide threaded fastening. This configuration is illustrated and described in more detail with regard to the third alarm subsystem 108 in FIG. 14.

In some embodiments, the cap portion 382 has a bottom lip 386 configured to be inserted into the sealing groove 162 and held by the set screw 167 through the pin support 166.

As described above, the sealing element 158 (e.g., an O-ring) is disposed at the sealing groove 162 formed around the bottom of the mounting neck 156 and abuts the bottom lip 386 when the device body 370 is mounted onto the protection housing 114. This configuration is illustrated and described in more detail with regard to the third alarm subsystem 108 in FIG. 14.

The light cover portion 384 extends from the cap portion 382 and is shaped as a dome for receiving at least a portion of the electric light 372 thereunder. The light cover portion 384 can operate as a cover of the electric light 372. Thus, the light cover portion 384 is dimensioned to substantially cover the electric light 372 thereunder. In the depicted example, the light cover portion 384 has a shorter height than that of the light cover portion 184 of the first alarm subsystem 104 because the electric light 372 is shorter in length then the electric light 172. In some embodiments, the light cover portion 384 is made of glass material, such as borosilicate glass. In some embodiments, the light cover portion 384 has a thickness of about 6.35 mm at the minimum. In other embodiments, the light cover portion 384 may have various shapes and/or dimensions suitable for covering at least a portion of the electric light 372 thereunder.

In some embodiments, a dome retaining ring 388 is disposed within the device body 370 between a bottom portion of the light cover portion 384 and the lip 164 of the mounting neck 156 when the device body 370 is mounted onto the protection housing 114. The dome retaining ring 388 can seat against the lip 164 of the mounting neck 156 and support the light cover portion 384 with respect to the cap portion 382 and/or the protection housing 114. In some embodiments, the light cover portion 384 and the cap portion 382 are separately made and coupled together in various manners (e.g., using fasteners or adhesives). A cemented joint between the light cover portion 384 and the cap portion 382 can be filled with a sealing material (e.g., room temperature vulcanization (RTV) silicone) for providing adequate flame path sealing of at least 10 mm in length.

The electric light 372 operates to emit light to visually alarm a predetermined situation. As described herein, the second alarm subsystem 106 is used as an evacuation alarm subsystem, and thus the electric light 372 is used to provide a visual alert to a situation where people must evacuate from the site. The electric light 372 can be of various types. In some embodiments, the electric light 372 include one or more light emitting diodes (LEDs). In this configuration, therefore, the electric light 372 can also be referred to herein as an LED light, and the second alarm subsystem 106 can also be referred to herein as a LED lighting alarm subsystem. In other embodiments, the electric light 372 can include other types of lighting elements. An example of the electric light 372 is illustrated and described in more detail with reference to FIG. 10.

The light circuit 374 is configured to connect the electric light 372 and operate the electric light 372 as necessary. Since the electric light 372 can be configured as a LED light in this example, the light circuit 374 can also be referred to herein as a LED light circuit. In some embodiments, the light circuit 374 is configured as a printed circuit board (PCB). The light circuit 374 can include a mounting opening 390 through which a circuit mounting fastener (e.g., a screw) 392 passes. The circuit mounting fastener 392 engages the circuit mounting hole 194 formed in the enclosure 140 of the protection housing 114 so that the light circuit 374 is mounted into the enclosure 140 of the protection housing 114. An example combination of the electric light 372 and the light circuit 374 is further illustrated in FIG. 10.

The lens element 376 operates to improve visibility of light from the electric light 372. In some embodiments, the lens element 376 is shapes as a dome to cover or surround the light cover portion 384 of the device body 370. The lens element 376 is coupled to the device body 370 such that the lens element 376 is placed above the light cover portion 384 of the device body 370. An example of the lens element 376 is made of a transparent polycarbonate lens, such as Bayer Makrolon AL2647 and Sabic LS2. In other embodiments, the lens element 376 can have various shapes, other than a dome shape, suitable to be placed above the light cover portion 384.

The lens element 376 can further include a body coupling mechanism 398 configured to mount the device body 370. In some embodiments, the body coupling mechanism 398 is configured as one or more fastener sockets 400 formed on the lens element 376. For example, the lens element 376 has a flange portion 402, and the fastener sockets 400 are formed on a lateral perimeter of the flange portion 402. In the illustrated example, the lens element 376 has three fastener sockets 400 evenly spaced apart around the lateral perimeter of the flange portion 402 of the lens element 376. The flange portion 402 of the lens element 376 is configured to seat on a recessed portion 404 of the device body 370 as the lens element 376 is coupled to the device body 370. The device body 370 includes one or more fastener holes 406 for engaging one or more fasteners 408. In some embodiments, the fastener holes 406 are formed around a lateral wall that defines the recessed portion 404 of the device body 370. In the illustrated example, the device body 370 includes three fastener holes 406 that are evenly spaced and correspond to the fastener sockets 400 when the lens element 376 is abutted with the device body 370. The fasteners 408 first pass through the fastener holes 406 and are inserted into the fastener sockets 400. In some embodiments, the fastener sockets 400 are internally threaded and the fasteners 408 are knurled set screws such that the fasteners 408 are screwed into the fastener sockets 400 of the lens element 376 once the fasteners 408 have passed through the fastener holes 406 of the device body 370, thereby fastening the lens element 376 to the device body 370 in place. In other embodiments, the lens element 376 can be installed onto the device body 370 in different manners, such as bolts, rivets, welding, and adhesives.

In some embodiments, a lens sealing element 410 is disposed between the device body 370 and the lens element 376 to provide sealing therebetween. Examples of the lens sealing element 410 include a silicone O-ring. The lens sealing element 410 can be arranged at the recessed portion 404 of the device body 370 to surround a bottom portion of the light cover portion 384 of the device body 370.

The lens guard 378 operates to protect the lens element 376. In some embodiments, the lens guard 378 is made of wires to cover the lens element 376. Examples of the wires include 300 series stainless steel with 4 mm wire diameter. In the illustrated example, the lens guard 378 is configured to have one or more legs 412 configured to fix the lens guard 378 with the lens element 376. For example, the lens element 376 includes one or more mounting holes 414 corresponding to the legs 412 of the lens guard 378 such that the legs 412 of the lens guard 378 engage the corresponding mounting holes 414. In some embodiments, the fasteners 408 (e.g., knurled set screws) can lock in place the corresponding legs 414 of the lens guard 370 when fully mounted through the fastener holes 406 of the device body 370 and the threaded fastener sockets 400 of the lens element 376. In other embodiments, the lens guard 178 can be fixed to the lens element 176 in different manners, such as screws, bolts, rivets, welding, and adhesives.

Figure 10:
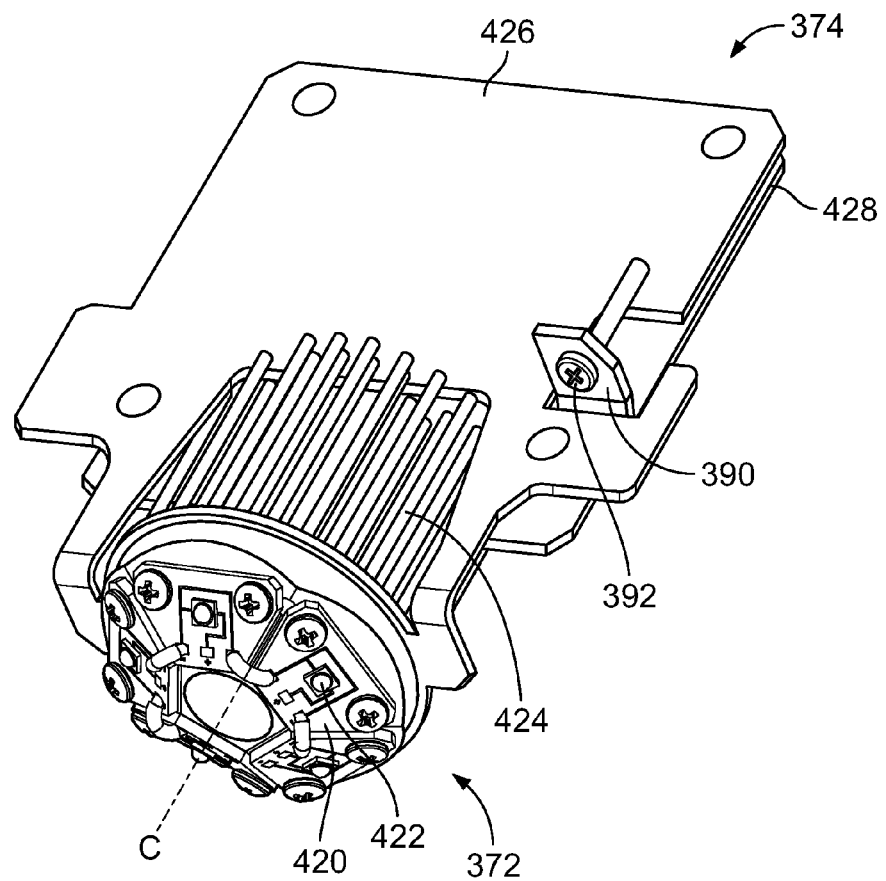
FIG. 10 is a schematic perspective view of a combination of an LED light and a LED light circuit.

FIG. 10 is a schematic perspective view of a combination of the LED light 372 and the light circuit 374.

In some embodiments, the electric light 372 includes a plurality of sub circuit boards 420. Each of the sub circuit boards 420 is configured to include a light emitting diode (LED) 422 and is electrically connected to the light circuit 374 to operate the LED 422. The sub circuit boards 420 can be arranged in a circular manner around a center axis C of the electric light 372. As illustrated, the sub circuit boards 420 are also positioned to generally form a dome shape such that the LEDs arranged on the sub circuit boards 420 generally face radially outwardly. For example, the sub circuit boards 420 are arranged to slant at a predetermined angle with respect to a plane perpendicular to the center axis C.

In some embodiments, the sub circuit boards 420 are arranged to be at an angle between 15 and 45 degree with respect to a plane perpendicular to the center axis C. In other embodiments, the sub circuit boards 420 are positioned to be angled at about 30 degree with respect to a plane perpendicular to the center axis C. In this configuration, the dome-shape arrangement of sub circuit boards 420 provides an improved frontal view of light from the LEDs while having good side coverage with the light, when projected upon the lens element 376. The lens element 376 can have fluted, Fresnel-type, cylindrical, dome-shaped, and/or other optical designs suitable for the improved frontal view and side coverage. The light emitting from the LEDs in this configuration are distributed evenly along the center axis C of the electric light 372, as well as providing effective radial illumination around the electric light 372. In the illustrated example, five sub circuit boards 420 (thus, five LEDs 422) are evenly spaced in a circular manner around the center axis C. This configuration of the sub circuit boards 420 and the associated parts thereof can also be used with the lens element 176.

In some embodiments, the sub circuit boards 420 are placed on a plurality of heat sink fins 424 configured to cool the second signaling device 316 by dissipating heat generated from the LEDs 422 of the sub circuit boards 420. In some embodiments, the light circuit 374 includes a heat sink plate 426 configured to dissipate heat from a circuit board 428 of the light circuit 374 and the LEDs 422 of the electric light 372. The heat sink plate 426 can be placed over the circuit board 428 to efficiently absorb heat generated therefrom. Further, the heat sink plate 426 can be arranged adjacent the heat sink fins 424 to dissipate heat transferred from the heat sink fins 424. In some embodiments, the heat sink fins 424 and the heat sink plate 426 are made of aluminum, aluminum alloys, copper, various composite materials, and other materials with thermal conductivity suitable for heat dissipation.

Referring to FIGS. 11-15, an example third alarm subsystem 108 is described and illustrated in more detail. As described above, the third alarm subsystem 108 is one embodiment of the alarm subsystem 102, and configured as a hazardous material alarm subsystem. Thus, the third alarm subsystem 108 can also be referred to herein as the hazardous material alarm subsystem 108. As described below, the hazardous material alarm subsystem 108 is configured as an audio signaling device.

Figure 11:
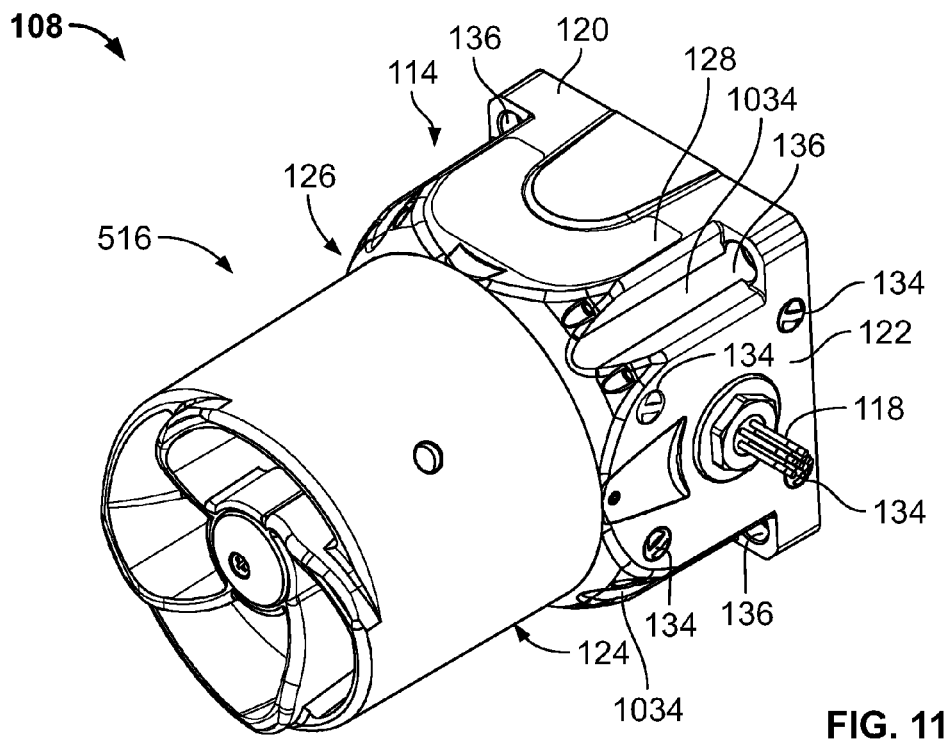
FIG. 11 is a perspective view of an example third alarm subsystem, which is configured as a tone sounder or speaker audio alarm subsystem.
Figure 12:
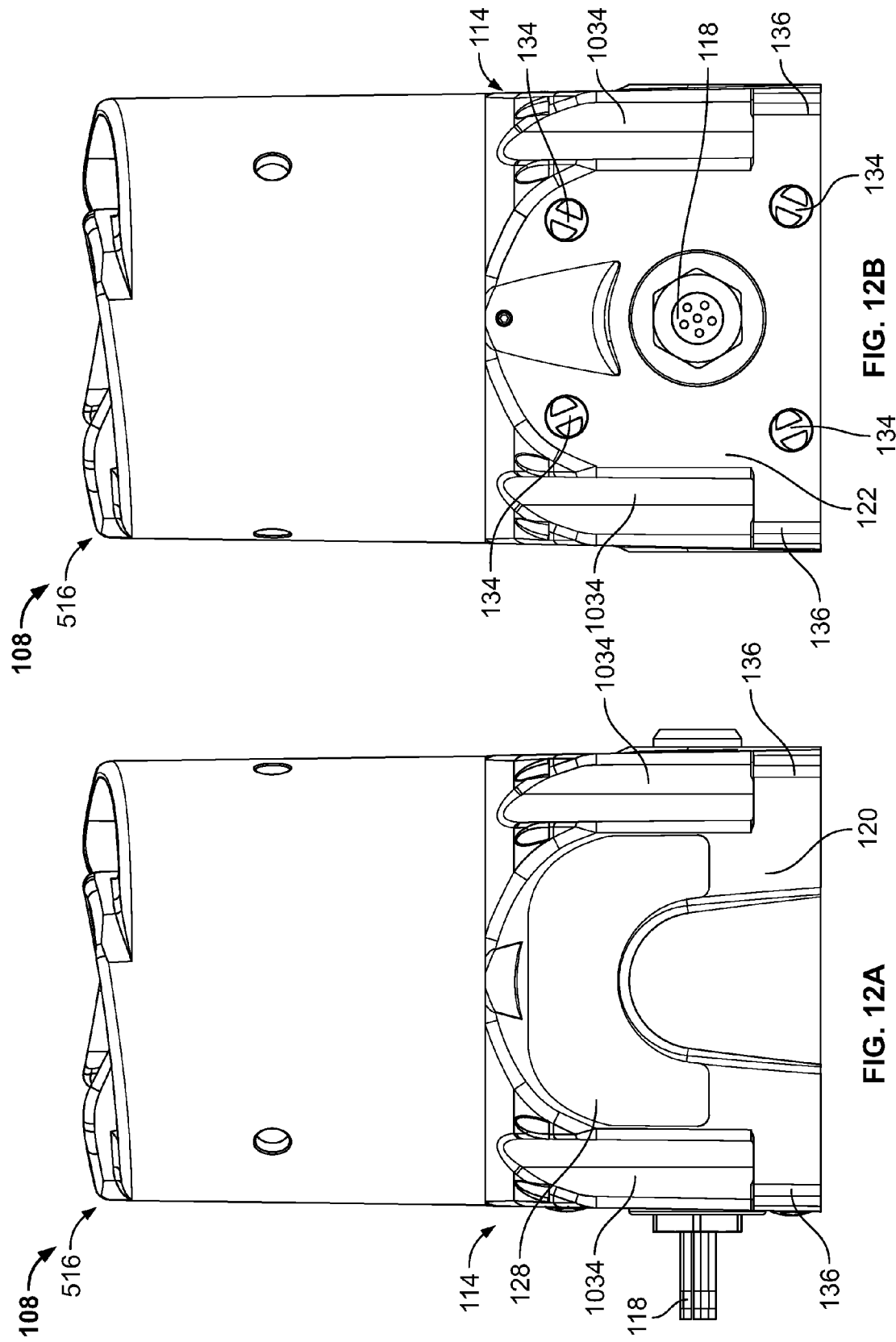
FIG. 12A is a front view of the third alarm subsystem of FIG. 11.
FIG. 12B is a side view of the third alarm subsystem of FIG. 11.

FIG. 11 is a perspective view of an example third alarm subsystem 108. FIG. 12A is a front view of the third alarm subsystem 108 of FIG. 11, and FIG. 12B is a side view of the third alarm subsystem 108 of FIG. 11. In some embodiment, the third alarm subsystem 108 includes the protection housing 114 and a third signaling device 516.

The protection housing 114 for the third alarm subsystem 108 is the same as the protection housing 114 used for either the first alarm subsystem 104 or the second alarm subsystem 106. As described herein, the protection housing 114 is modularized to be used with different types of signaling devices, such as the first signaling device 116, the second signaling device 316, and the third signaling device 516. The protection housing 114 can interchangeably mount such different signaling devices. For example, as described herein, a device body (e.g., the device body 170, 370, and 570) of each alarm subsystem includes the same coupling mechanism (e.g., the cap portion 182, 382, and 582) configured to engage the signaling device mounting mechanism 154 of the protection housing 114. The description of the protection housing 114 is not repeated with respect to the third alarm subsystem 108 for brevity purposes, and the same reference numbers will be used, as possible, where like or similar features or elements are shown.

The third signaling device 516, as part of the hazardous material alarm subsystem, is used to alert people of one or more hazardous materials. In the depicted example, the third signaling device 516 is configured as an audio signaling device. Therefore, in this example, the third alarm subsystem 108 can also be referred to herein as a tone sounder or speaker audio alarm subsystem. An example of the third signaling device 516 is illustrated and described in more detail with reference to FIG. 13-15.

In certain embodiments, at least part of the protection housing 114, at least part of the third signaling device 516, and other associated components of the third alarm subsystem 108 can be made of a statically conductive thermoset resin.

Figure 13:
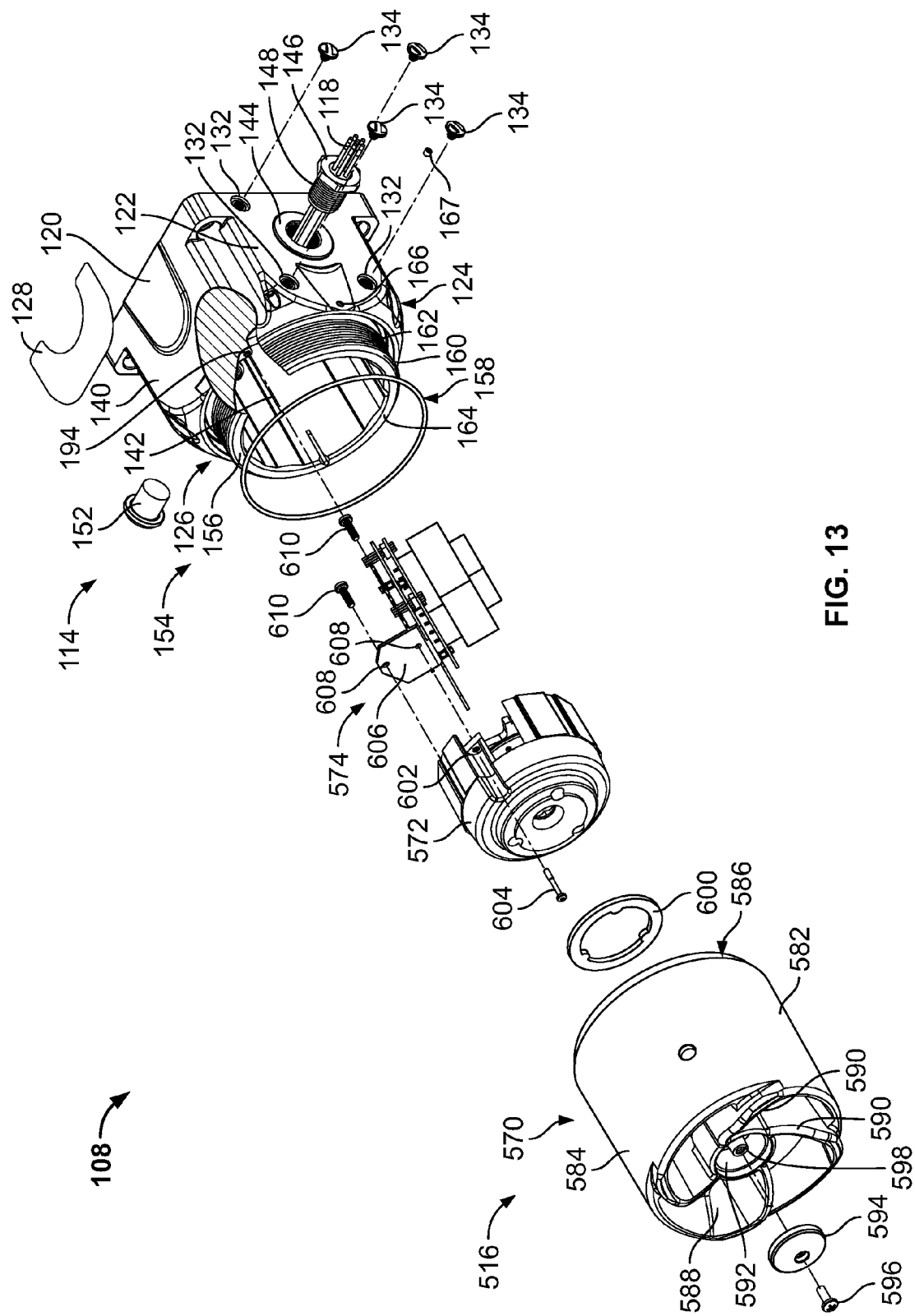
FIG. 13 is an exploded view of the third alarm subsystem of FIG. 11.
Figure 14:
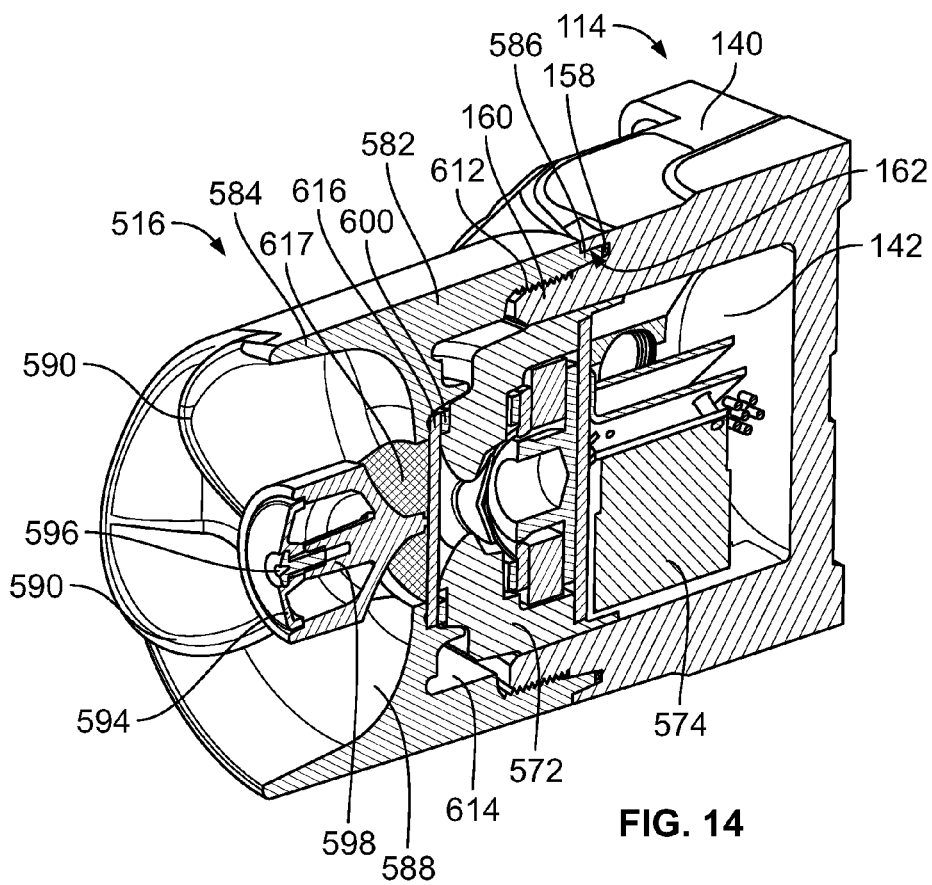
FIG. 14 is a cross sectional view of the third alarm subsystem of FIG. 13.

FIG. 13 is an exploded view of the third alarm subsystem 108 of FIG. 11, illustrating the protection housing 114 and the third signaling device 516 is more detail. FIG. 14 is a cross sectional view of the third alarm subsystem 108 of FIG. 13.

As the protection housing 114 of the third alarm subsystem 108 is the same as the protection housing 114 of the first alarm subsystem 104 or the second alarm subsystem 106, the description of the protection housing 114 of the third alarm subsystem 108 is omitted and the same reference numbers will be used herewith for the same or similar features or elements.

Referring to FIGS. 13 and 14, the third signaling device 516 can include a device body 570, an audio driver assembly 572, and an audio driver circuit 574.

The device body 570 is configured to receive the audio driver assembly 572 and mounted onto the protection housing 114. In some embodiments, the device body 570 includes a cap portion 582 and an audio driver cover portion 584.

The cap portion 582 is configured to similarly to the cap portion 182 of the device body 170 and the cap portion 382 of the device body 370. In some embodiments, the cap portion 582 has a hollow 614 (FIG. 14) therein for receiving at least a portion of the audio driver assembly 572. In some embodiments, the hollow 614 of the cap portion 582 can also receive at least a portion of the audio driver circuit 574.

Similarly to the cap portion 182 or 382, the cap portion 582 is configured to engage the signaling device mounting mechanism 154 such that the device body 570 is mounted onto the protection housing 114. For example, the cap portion 582 is shaped as a cylindrical body having a threaded portion 612 (FIG. 14) internally formed on an inner surface of the cylindrical body of the cap portion 582. The internally-threaded portion 612 of the cap portion 582 corresponds with the externally-threaded portion 160 of the mounting neck 156. The cap portion 582 can be screwed onto the mounting neck 156 such that the internally-threaded portion of the cap portion 582 and the externally-threaded portion 160 of the mounting neck 156 are engaged to provide threaded fastening.

In some embodiments, the cap portion 582 has a bottom lip 586 that is inserted into the sealing groove 162 and held by the set screw 167 through the pin support 166.

As described above, the sealing element 158 (e.g., an O-ring) is disposed at the sealing groove 162 formed around the bottom of the mounting neck 156 and abuts the bottom lip 586 when the device body 570 is mounted onto the protection housing 114.

The audio driver cover portion 584 extends from the cap portion 582 and has a sound channel 588 configured to allow sound generated from the audio driver assembly 572 to pass therethrough. The audio driver cover portion 584 can have various shapes. In some embodiments, the sound channel 588 of the audio driver cover portion 584 is divided into a plurality of sections by one or more blades 590. The sound channel 588 can also include a center section 592. The center section 592 can be covered by a center cover 594. In some embodiments, the center cover 594 is mounted onto the center section 592 by engaging a fastener 596 with a coupling socket 598. For example, the fastener 596 is a screw and the coupling socket 598 is internally threaded such that the fastener 596 is threadedly fastened into the coupling socket 598 to mount the center cover 594 onto the center section 592.

In some embodiments, an audio driver sealing element 600 is disposed within the hollow 614 of the cap portion 582 against the audio driver assembly 572 when the audio driver assembly 572 is inserted into the cap portion 582 of the device body 570. The audio driver sealing element 600 is used to provide sealing between the device body 570 and the audio driver assembly 572. In some embodiments, the audio driver sealing element 600 is a silicone gasket. An adhesive can be applied on at least one side of the audio driver sealing element 600 such that the audio driver sealing element 600 is securely attached onto either or both of a corresponding inner surface of the cap portion 582 and a corresponding top surface of the audio driver assembly 572. In the depicted example of FIG. 15, the audio driver sealing element 600 is attached onto the top surface of the audio driver assembly 572 with adhesive.

The audio driver assembly 572 operates to generate sound to audibly alarm a predetermined situation. As described herein, the third alarm subsystem 108 is used as a hazardous material alarm subsystem, and thus the audio driver assembly 572 is used to provide an audio alert on presence of one or more hazardous materials. Examples of the audio driver assembly 572 include sounders, powered speakers, and loudspeakers.

In some embodiments, the audio driver assembly 572 includes a mounting opening 602 through which an audio driver fastener (e.g., a screw) 604 passes. The audio driver fastener 604 engages the circuit mounting hole 194 formed in the enclosure 140 of the protection housing 114 so that the audio driver assembly 572 is mounted into the enclosure 140 of the protection housing 114.

Figure 15:
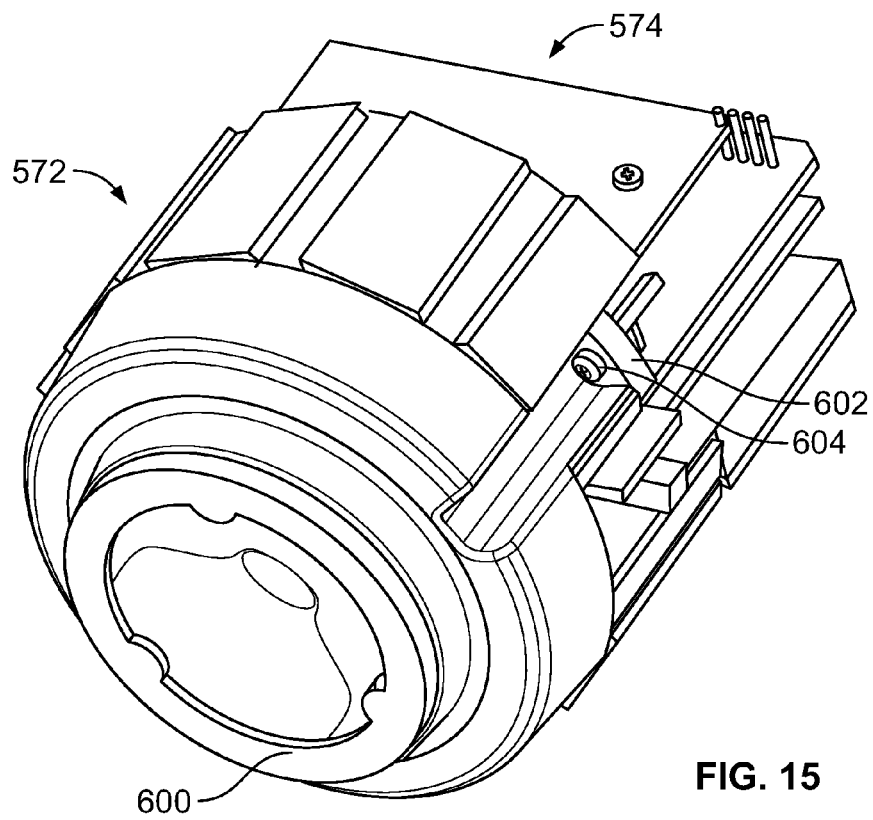
FIG. 15 is a schematic perspective view of an example electric connection between an audio driver assembly and an audio driver circuit.

The audio driver circuit 574 is configured to connect the audio driver assembly 572 and operate the audio driver assembly 572 as necessary. In some embodiments, the audio driver circuit 574 is configured as a printed circuit board (PCB). The audio driver circuit 574 can include a mounting flange 606 having one or more fastening holes 608. The mounting flange 606 with the fastening holes 608 can be used to couple the audio driver circuit 574 with the audio driver assembly 572. In some embodiments, one or more fasteners (e.g., screws) 610 are used to fasten the audio driver circuit 574 to the audio driver assembly 572 through the fastening holes 608 of the mounting flange 606. An example electric connection between the audio driver assembly 572 and the audio driver circuit 574 is illustrated in FIG. 15.

Referring to FIG. 14, a sound disk 616, which is also referred to as a sinter, is positioned within the hollow 614 of the cap portion 582 and disposed between the audio driver cover portion 584 and the audio driver assembly 572. A protective stainless mess screen 617 can also be placed on the sound disk 616 (e.g., between the sound disk 616 and the housing). The sound disk 616 is highly-compressed pieces of metal with air gap therebetween, which allows sound to pass therethrough. While permitting sound to pass through, the sound disk 616 can also be configured to provide sealing between the audio driver cover portion 584 and the audio driver assembly 572. Therefore, in the event of an ignition within the assembly, the ignition flame path can be confined from reaching external environment. In some embodiments, the sound disk 616 is arranged to abut the audio driver sealing element 600 on one side thereof and a portion of the audio driver cover portion 584 on the other side thereof. Using the sound disk 616 separately from the audio driver assembly 572 makes it easy and convenient to assemble the third alarm subsystem 108. In some embodiments, the sound disk 616 is attached to the audio driver cover portion 584 by a cemented RTV joint not less than 10 mm in total length.

Referring now to FIGS. 16-20, an example coupling device 110 is illustrated and described in more detail. In some embodiments, at least part of the coupling device 110 and other associated components thereof can be made of a statically conductive thermoset resin.

Figure 16:
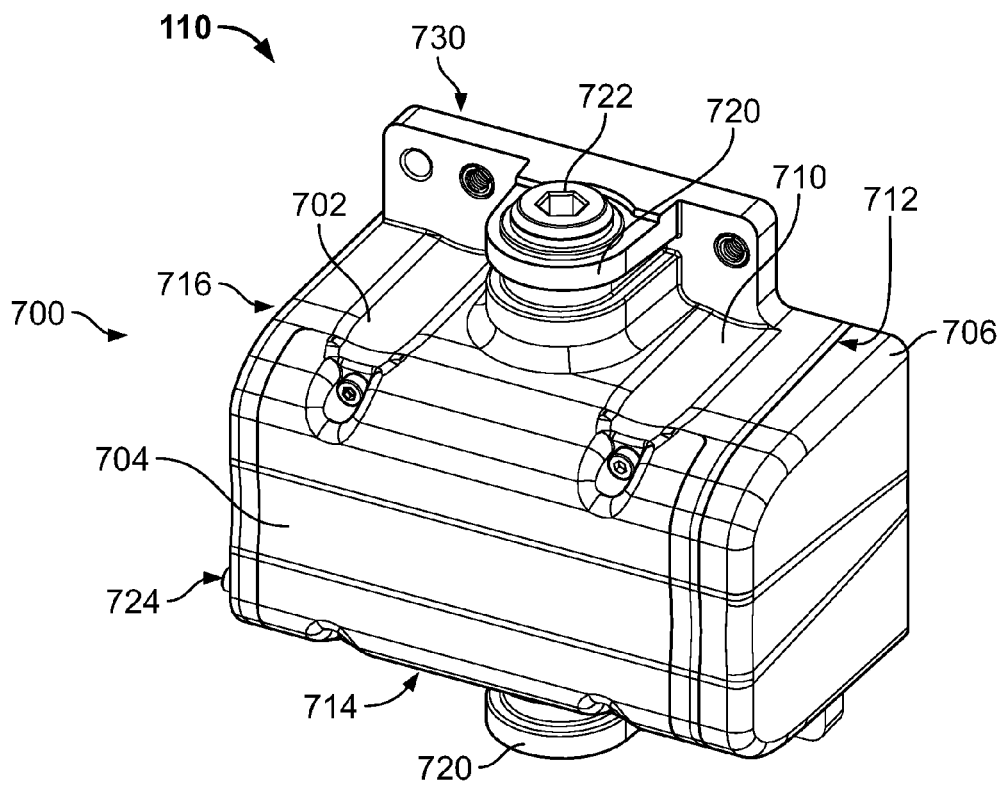
FIG. 16 is a perspective view of an example coupling device.
Figure 17A:
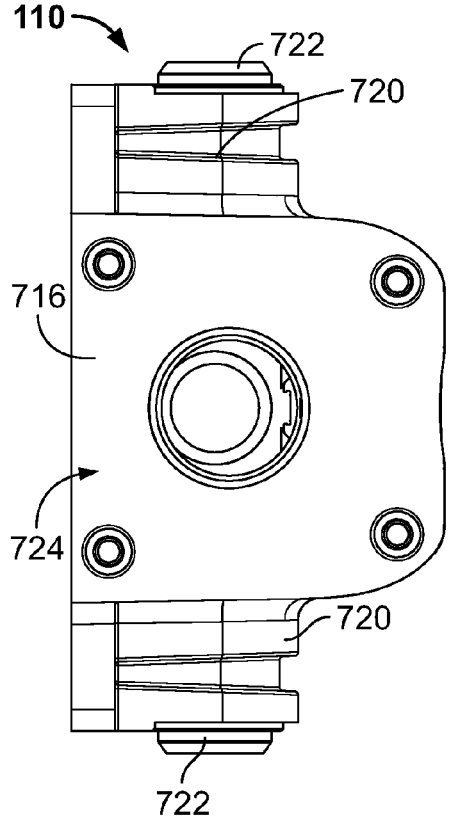
FIG. 17A is a side view of the coupling device of FIG. 16.

FIG. 16 is a perspective view of an example coupling device 110. FIG. 17A is a side view of the coupling device 110 of FIG. 16, FIG. 17B is a top view of the coupling device 110 of FIG. 16, FIG. 17C is a front view of the coupling device 110 of FIG. 16, and FIG. 17D is another side view of the coupling device 110 of FIG. 16. In some embodiments, the coupling device 110 includes a coupling housing 700 including a coupling body 702 and a coupling cover 704, and one or more end covers 706.

The coupling device 110 is used to connect one or more alarm subsystems 102 in various manners, as illustrated with reference to FIGS. 25-33. In some embodiments, the coupling device 110 operates as a wiring bridge configured to interconnect alarm subsystems 108. In some embodiments, the coupling device 110 is coupled with the protection housing 114 of an alarm subsystem 102. An example coupling mechanism of the coupling device 110 is described below in more detail.

In some embodiments, the coupling device 110 is made to meet the increased safety protection standard (EX-E) to prevent creation of sparks or electric arcs therein.

The coupling housing 700 is configured to provide a wiring chamber 732 (FIG. 18) through which one or more alarm subsystems 108 are wired without using external conduit, armored cables, and/or cable glands. In some embodiments, the coupling housing 700 includes the coupling body 702 and the coupling cover 704. In some embodiments, the coupling body 702 has four lateral walls 710, 712, 714 and 716 that define the wiring chamber 732. As illustrated, the coupling body 702 can be configured to define the wiring chamber 732 with the lateral walls 710, 712, 714 and 716. The coupling cover 704 can be configured to selectively open to expose the wiring chamber 732 of the coupling body 702.

The coupling housing 700 includes one or more cable passages 720 for receiving one or more wiring cables into the wiring chamber 732. In the illustrated example, the cable passages 720 are formed on opposite lateral walls 710 and 714 of the coupling body 702. In some embodiments, the cable passage 720 can be protected by a protection plug 722. The protection plug 722 is configured to be inserted into the cable passage 720 when no wire cable passes through the cable passage 720. When the cable passage 720 is not in use, the protection plug 722 is used for sealing the cable passage 720 so that the coupling device 110 continues to meet relevant safety requirements, such as the explosion protection increased safety enclosure (EX-E) standard. Further, the protection plug 722 may also be certified to satisfy the safety requirements, such as the EX-E standard. In some embodiments, the protection plug 722 is made of thermoplastic elastomer so that at least a portion of the protection plug 722 is compressively inserted into the cable passage 720.

The coupling housing 700 further includes one or more coupling mechanisms 724 for mounting an alarm subsystem 102. In some embodiments, the coupling mechanism 724 is arranged on at least one side of the coupling housing 700. For example, the coupling mechanisms 724 are formed on opposite lateral walls 712 and 716 of the coupling body 702. The coupling mechanism 724 of the coupling housing 700 is illustrated and described with reference to FIGS. 17 and 18.

The coupling housing 700 also includes one or more coupler interconnection mechanism 730 for coupling the coupling device 110 with another coupling device 110. An example coupler interconnection mechanism 730 is illustrated and described with reference to FIGS. 21-24.

The end cover 706 is configured to selectively cover the coupling mechanism 724 that is not in use. In the illustrated example, the end cover 706 is attached to a second lateral wall 712 to sealingly cover the coupling mechanism 724 arranged on the second lateral wall 712. The end cover 706 is further illustrated and described with reference to FIGS. 18-20.

Figure 18:
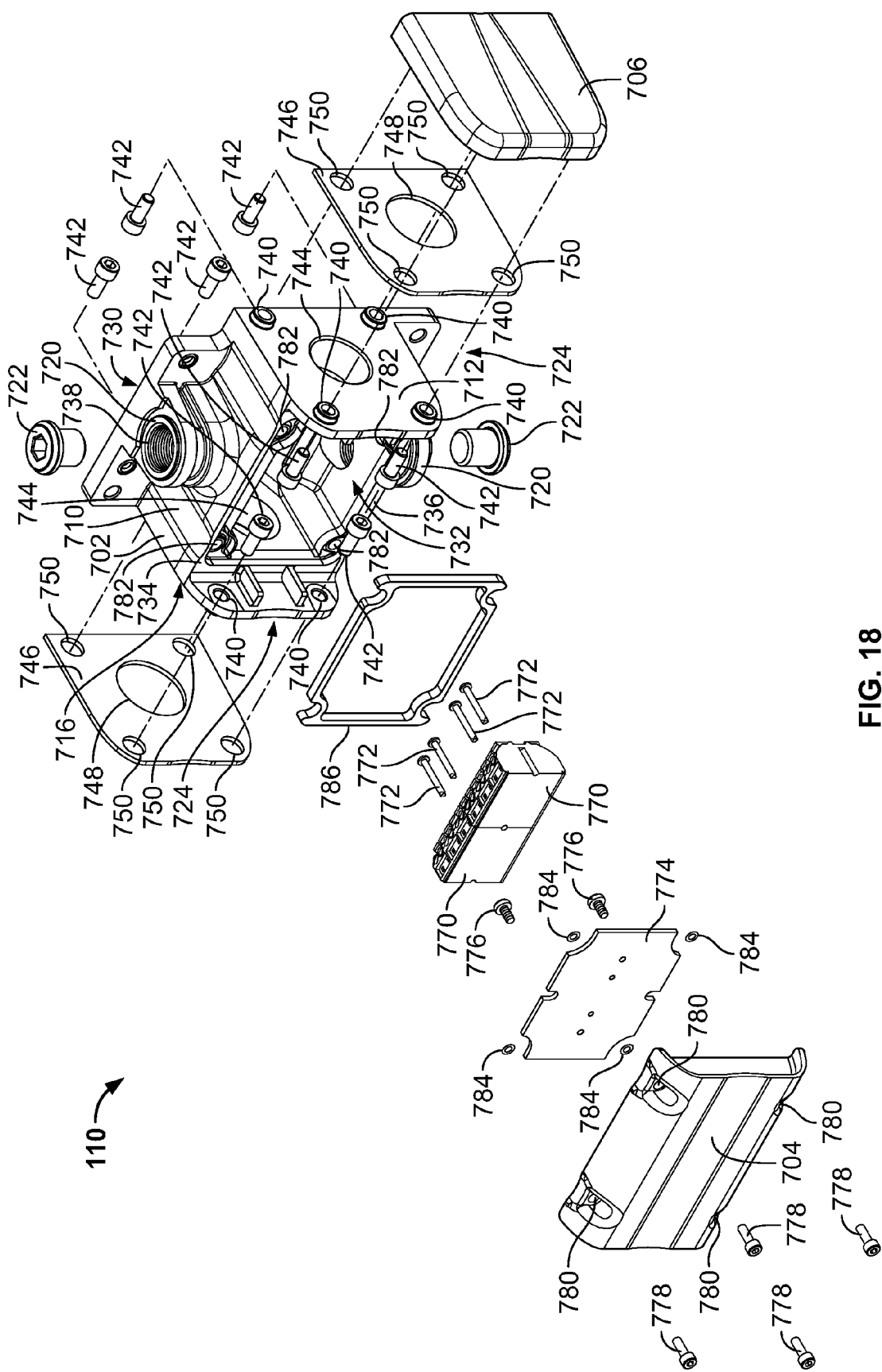
FIG. 18 is an exploded view of the coupling device of FIG. 16.

FIG. 18 is an exploded view of the coupling device 110 of FIG. 16, illustrating the coupling device 110 in more detail.

As described above, the coupling device 110 includes the coupling body 702 that defines a wiring chamber 732 therewithin. The wiring chamber 732 is configured to receive and contain an electrical connector 770, one or more wiring cables 920 (FIG. 26) inserted through the cable passages 720, and/or one or more wiring cables 118 inserted through cable conduits 744.

In some embodiments, the coupling body 702 has four lateral walls 710, 712, 714 and 716 that surround and define the wiring chamber 732. The coupling body 702 has a top portion 734 defined by the four lateral walls 710, 712, 714 and 716. The wiring chamber 732 is open toward the top portion 734 of the coupling body 702. In some embodiments, the top portion 734 has a groove portion 736 formed along peripheral top edges of the lateral walls 710, 712, 714 and 716. As described below, the groove portion 736 is configured to receive a cover gasket 786.

The coupling body 702 can have one or more cable passages 720 that defines a channel for receiving one or more wiring cables 920 (FIG. 26) into the wiring chamber 732 of the coupling body 702. In the illustrated example, the cable passages 720 are formed on a first lateral wall 712 and a third lateral wall 716 opposite to the first lateral wall 712. In some embodiments, the cable passages 720 have an internal surface 738 that is internally threaded such that the wiring cables 920 having external threads are screwed therein.

The coupling body 702 includes one or more coupling mechanisms 724 configured to mount an alarm subsystem 102. The coupling mechanisms 724 can be arranged on at least one of the lateral walls 710, 712, 714 and 716 of the coupling body 702. In the illustrated example, the coupling mechanisms 724 are formed at a first lateral wall 710 and a third lateral wall 714 opposite to the first lateral wall 710.

In some embodiments, the coupling mechanism 724 includes one or more coupling holes 740 for receiving fasteners 742 and enabling the fasteners 742 to pass therethrough. The coupling holes 740 can be formed at the second and third lateral walls 712 and 716. For example, four coupling holes 740 are formed at the corners of the second and their lateral walls 712 and 716, respectively. In some embodiments, the fasteners 742 are socket head cap screws. In other embodiments, the fasteners 742 can be of different types, such as bolts, brass fasteners, cable ties, clamps, clips, pins, latches, retaining rings, rivets, snap fasteners, staples, and other mechanical fasteners.

The coupling mechanism 724 also includes a cable conduit 744 configured to enable the wiring cables 118 to enter into the wiring chamber 732 therethrough. In some embodiments, the cable conduit 744 is formed on each of the second and fourth lateral walls 712 and 716. In some embodiments, the cable conduit 744 is configured to at least partially receive the bushing 146 mounted to the protection housing 114 of the alarm subsystem 102. For example, as illustrated in FIG. 3, a head portion of the bushing 146 extends from the second side wall 122 of the protection housing 114 and can be at least partially received through the cable conduit 744 when the alarm subsystem 102 mounts to the coupling device 110.

As such, the cable conduits 744 on the second and fourth lateral walls 712 and 716, as well as the cable passages 720 on the first and third lateral walls 710 and 714, allow access to the wiring chamber 732 of the coupling device 110.

As the alarm subsystem 102 is connected with the coupling device 110, the coupling holes 740 of the coupling body 702 are aligned with the insert sockets 132 of the alarm subsystem 102 (e.g., the protection housing 114 thereof). The fasteners 742 are then inserted into the insert sockets 132 of the alarm subsystem 102 through the coupling holes 740 of the coupling body 702. In some embodiments, the insert sockets 132 are internally threaded such that the fasteners 742 engaging the coupling body 702 through the coupling holes 740 are screwed into the insert sockets 132 for threaded coupling between the alarm subsystem 102 and the coupling device 110.

In some embodiments, a lateral end gasket 746 is disposed between the alarm subsystem 102 and the coupling device 110 to provide sealing therebetween. For example, the lateral end gasket 746 is arranged between the coupling mechanism 130 of the protection housing 114 and the coupling mechanism 724 of the coupling body 702. The lateral end gasket 746 has a cable hole 748 corresponding to the associated cable conduit 744 of the coupling body 702. The lateral end gasket 746 also has one or more fastener holes 750 corresponding to the coupling holes 740 of the coupling body 702. One example of the lateral end gasket 746 is made of silicone having a thickness of about 2.4 mm and a hardness of 40-50 durometer. In some embodiments, the lateral end gasket 746 is attached onto a corresponding lateral wall (e.g., the second lateral wall 712 or the fourth lateral wall 716) of the coupling body 702 with adhesive. One example of the adhesive is a pressure sensitive adhesive, such as part number ARclad® 8458 available from Adhesive Research Inc., or part number DLC506 available from Metric Felt Company.

As described above, the end cover 706 is used to cover the coupling mechanism 724 that is not used for mounting an alarm subsystem 102. In the illustrated example, the end cover 706 is attached to the second lateral wall 712 to sealingly cover the coupling mechanism 724 arranged on the second lateral wall 712. The end cover 706 has one or more fastening sockets (not shown) formed on an interior side of the end cover 706. In some embodiments, similarly to the insert sockets 132 of an alarm subsystem 102, the fastening sockets of the end cover 706 are internally threaded such that the fasteners 742 are screwed therein.

The fastening sockets of the end cover 706 are arranged to correspond with the coupling holes 740 of the coupling body 702 and the fastener holes 750 of the lateral end gasket 746 so that the fasteners 742 are inserted into the fastening sockets of the end cover 706 through the coupling holes 740 and the fastener holes 750. As such, the end cover 706 is attached onto the lateral wall 712 of the coupling body 702 by the fasteners 742. As illustrated, the lateral end gasket 746 is disposed between the lateral wall 712 of the coupling body 702 and the interior side of the end cover 706 to provide sealing therebetween. In some embodiments, the end cover 706 can be certified to meet relevant safety requirements, such as the explosion protection increased safety enclosure (EX-E) standard. One example of the end cover 706 generally has a thickness of about 4.0 mm.

Referring again to FIG. 18, the coupling device 110 includes an electrical connector 770. The electrical connector 770 is at least partially received within the wiring chamber 732 of the coupling body 702 and operates as an electrical connection point for connecting a plurality of wiring cables 118 and 920 within the coupling device 110. In some embodiments, the electrical connector 770 is configured as a terminal block, providing a means of connecting the wiring cables 118 and 920 without a splice or physically joining the ends of the cables.

In some embodiments, the electrical connector 770 can be certified to meet relevant safety requirements, such as the explosion protection increased safety enclosure (EX-E) standard. One example of the electrical connector 770 is part number 862-0503 from Wago Corporation, which is certified under ATEx (e.g., certificate number PTB 04 ATEX 1189U) and IECEx (e.g., certificate number PTB 05. 003U). In some embodiments, the electrical connector 770 can be made with a plurality of terminal blocks.

In some embodiments, the electrical connector 770 is mounted onto an interior side of the coupling cover 704. This configuration can allow easy access to the electrical connector 770, thereby improving efficiency in wiring work in the field. Because the electrical connector 770 is accessible from the coupling cover 704 by disassembling the coupling cover 704 from the coupling body 702, a field practitioner can easily connect the wiring cables 118 and 920 to the electrical connector 770 without having to access to the wiring chamber 732 of the coupling body 702. In some embodiments, the electrical connector 770 is fixed onto the interior side of the coupling cover 704 by one or more fasteners 772, such as screws.

In some embodiments, a connector mounting plate 774 is provided to mount the electrical connector 770 to the coupling cover 704. The connector mounting plate 774 provides an area configured to mount the electrical connector 770. In some embodiments, the connector mounting plate 774 is fixed onto the interior of the coupling cover 704 by one or more fasteners 776, such as screws. In some embodiments, the connector mounting plate 774 is made of aluminum, such as 5052-H32, and has a thickness of about 58.1 mm.

The coupling cover 704 can be attached to the coupling body 702 in various manners. In some embodiments, the coupling cover 704 can be coupled with the coupling body 702 with one or more fasteners 778, such as socket head cap screws. The coupling cover 704 includes one or more fastening holes 780 for engaging the fasteners 778 to fix the coupling cover 704 onto the coupling body 702. The coupling body 702 can include one or more fastening sockets 782 corresponding to the fastening holes 780 of the coupling cover 704. In some embodiments, the fastening sockets 782 are formed on the top portion 734 of the coupling body 702. In some embodiments, one or more washers 784 are used in attaching the coupling cover 704 onto the coupling body 702 by the fasteners 778.

In some embodiments, a cover gasket 786 is disposed between the coupling body 702 and the coupling cover 704 to provide sealing therebetween. The cover gasket 786 can be configured to seat onto the groove portion 736 of the top portion 734 of the coupling body 702. One example of the cover gasket 786 is made of silicone having a thickness of about 4.8 mm and a hardness of 40-50 durometer. In some embodiments, the cover gasket 786 is attached onto the groove portion 736 of the coupling body 702 with adhesive. One example of the adhesive is a pressure sensitive adhesive, such as part number ARclad® 8458 available from Adhesive Research Inc., or part number DLC506 available from Metric Felt Company.

Figure 19:
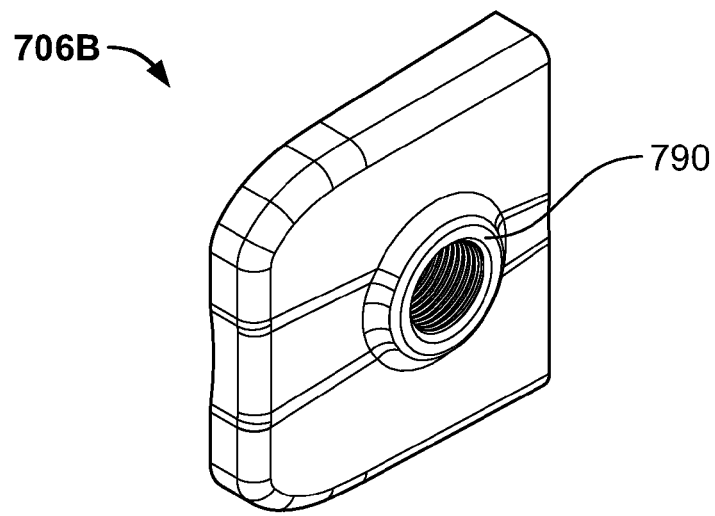
FIG. 19 illustrates a second example end cover.
Figure 20:
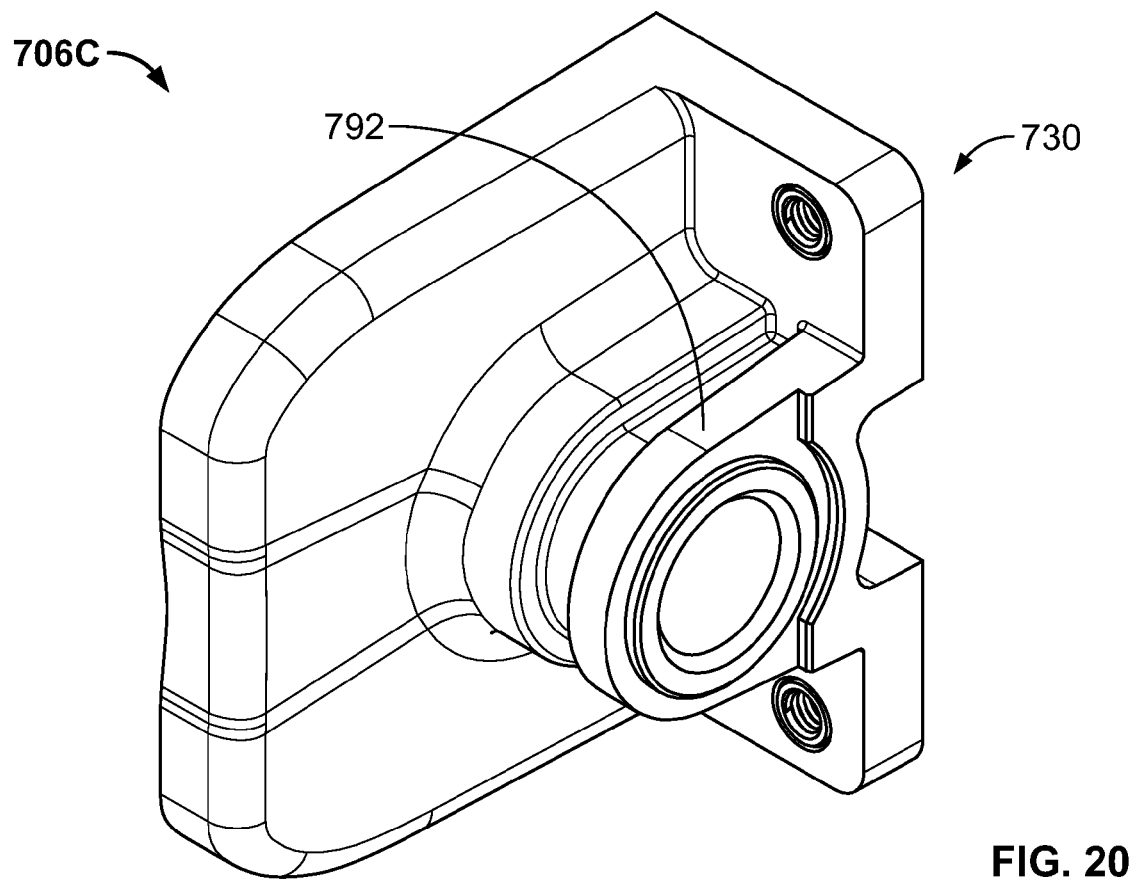
FIG. 20 illustrates a third example end cover.

FIGS. 19 and 20 illustrate other embodiments of the end cover 706. In particular, FIG. 19 illustrates a second example end cover 706B, and FIG. 20 illustrates a third example end cover 706C.

Referring to FIG. 19, the end cover 706B is configured similarly to the end cover 706 except for a cable port 790 for receiving one or more wiring cables into the wiring chamber 732. In some embodiments, the cable port 790 is internally threaded for a wiring cable having external threads to be screwed therein. Other configurations of the end cover 706B are similar to the end cover 706, and, therefore, the description of the end cover 706B is omitted for brevity purposes.

Referring to FIG. 20, the end cover 706C is configured similarly to the end cover 706 except for a cable passage 792 and the coupler interconnection mechanism 730. Similarly to the cable passage 720, the cable passage 792 is formed to receive one or more wiring cables into the wiring chamber 732. The coupler interconnection mechanism 730 is configured to connect another coupling device 110 with the coupling device 110 to which the end cover 706C is attached. An example coupler interconnection mechanism 730 is illustrated and described with reference to FIGS. 21-24. Other configurations of the end cover 706C are similar to the end cover 706, and, therefore, the description of the end cover 706C is omitted for brevity purposes.

Figure 21:
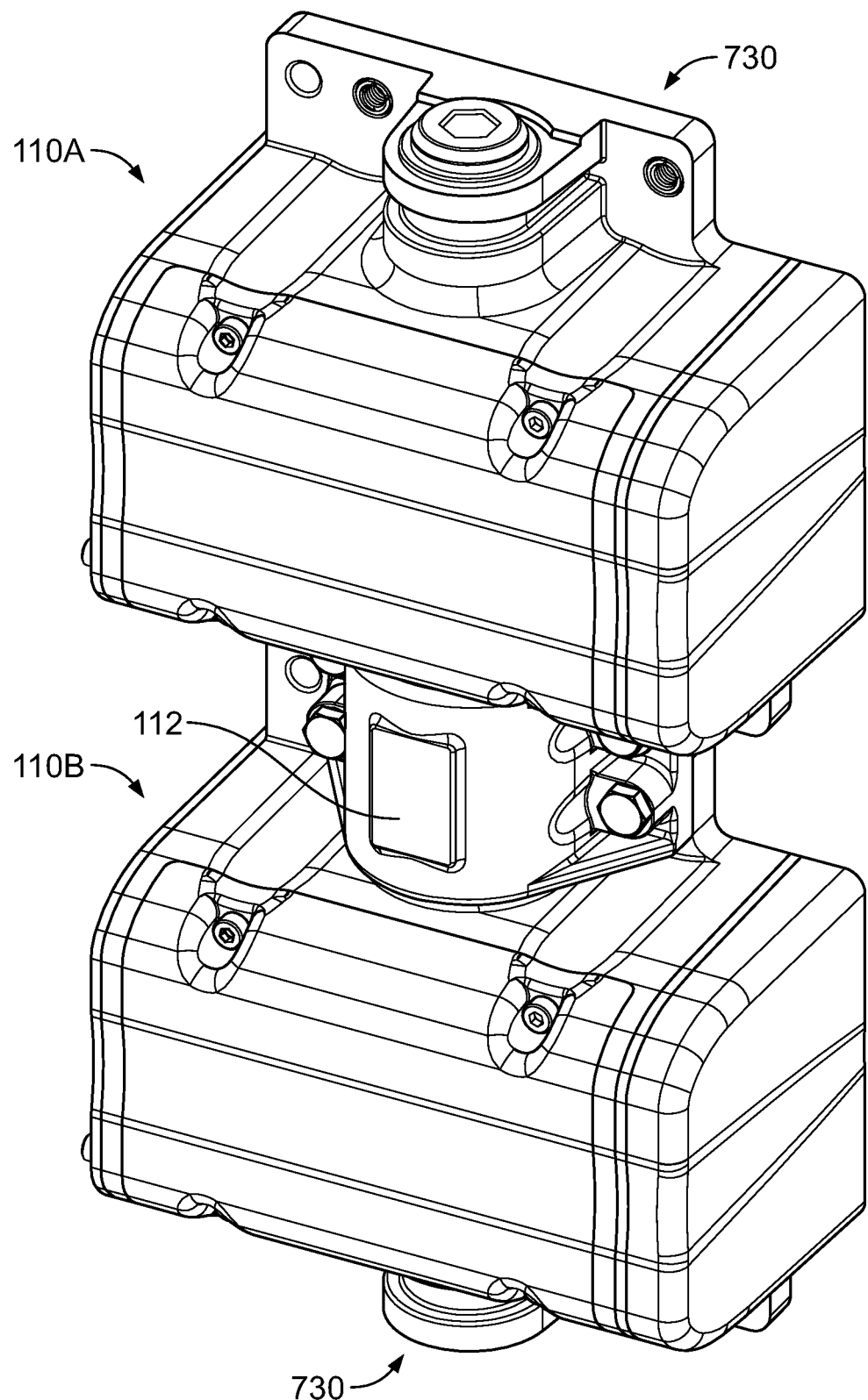
FIG. 21 is a perspective view of two coupling devices connected by a clamping device.
Figure 22:
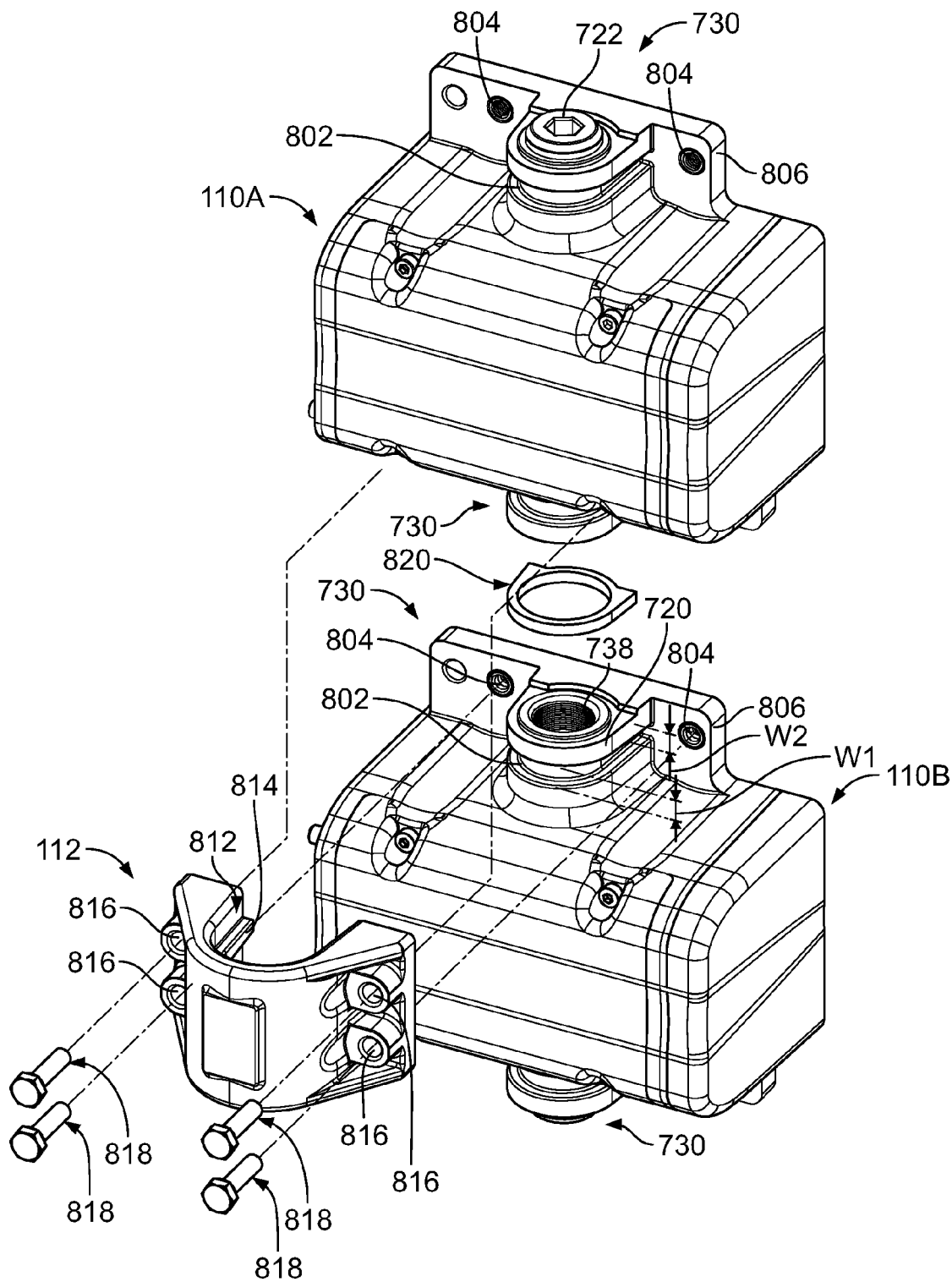
FIG. 22 is an exploded view of two coupling devices with the clamping device.
Figure 23:
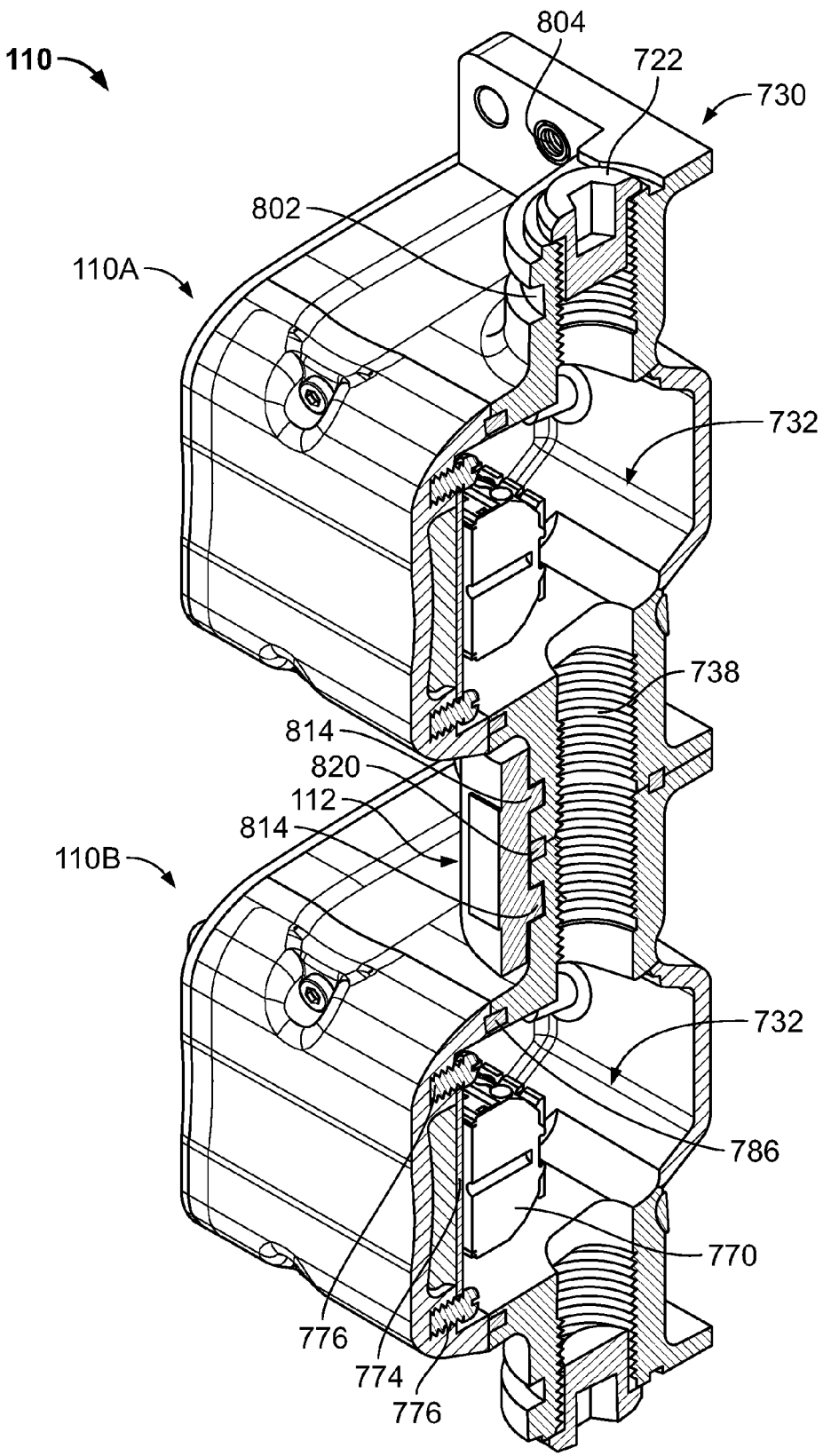
FIG. 23 is a cross sectional view of the assembly of FIG. 21.
Figure 24:
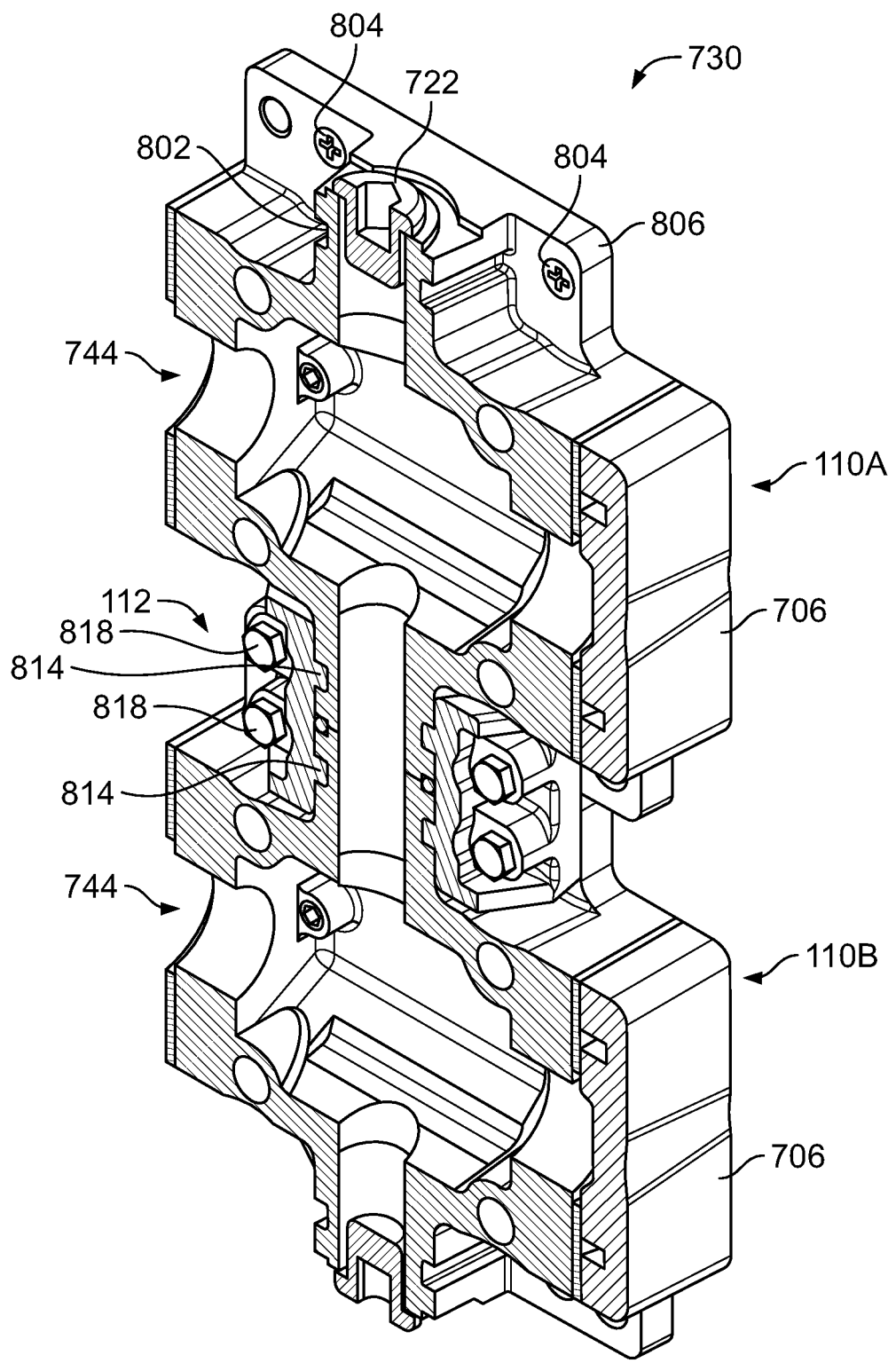
FIG. 24 is another cross-sectional view of the assembly of FIG. 21.

FIGS. 21-24 illustrate an example coupler interconnection mechanism 730 with a clamping device 112. FIG. 21 is a perspective view of two coupling devices 110 that are connected by a clamping device 112, FIG. 22 is an exploded view of the two coupling devices 110 with the clamping device 112, FIG. 23 is a cross sectional view of the assembly of FIG. 21, and FIG. 24 is another cross-sectional view of the assembly of FIG. 21.

For clarity, two coupling devices 110 are designated herein as a first coupling device 110A and a second coupling device 110B. In some embodiments, a clamping device 112 is used to couple the first and second coupling devices 110A and 110B. As described below, the clamping device 112 is configured to cooperate with the coupler interconnection mechanism 730 of the first coupling device 110A and the coupler interconnection mechanism 730 of the second coupling device 110B.

Referring to FIGS. 22-24, the coupling devices 110 (e.g., the first and second coupling devices 110A and 110B) are interconnected with the coupler interconnection mechanisms 730 and a clamping device 112.

In some embodiments, the coupler interconnection mechanism 730 of the coupling device 110 includes a groove 802 formed on the cable passage 720. In some embodiments, the exterior of the cable passage 720 is shaped to be at least partially round. The groove 802 is defined on the exterior of the cable passage 720 around the cable channel of the cable passage 720.

In some embodiments, the groove 802 can be tapered between the top end and the two bottom ends thereof. In some embodiments, a width of the groove 802 gradually decreases from its top end to its two bottom ends. For example, a width W1 of the groove 802 at the top end is greater than a width W2 of the groove 802 at the bottom ends, and the width of the groove 802 gradually changes between the top end and the bottom ends. The tapered width of the groove 703 helps adjacent coupling devices 110 being pulled together as the clamping device 112 engages the two coupler interconnection mechanisms 730 of the adjacent coupling devices 110.

The coupler interconnection mechanism 730 can further include one or more coupler fastening holes 804 configured to fasten the clamping device 112 in place. In some embodiments, the coupler fastening holes 804 are formed on a flange portion 806 of the coupler interconnection mechanism 730, and are internally threaded to enable the clamping device 112 to be threadedly coupled to the coupling device 110.

As described above, the end cap 706C can include the coupler interconnection mechanism 730. The configuration of the coupler interconnection mechanism 730 of the end cap 706C is the same as the coupler interconnection mechanism 730 of the coupling device 110.

The clamping device 112 is configured to engage the coupler interconnection mechanism 730 of the first coupling device 110A and the coupler interconnection mechanism 730 of the second coupling devices 110B such that the coupler interconnection mechanisms 730 abut each other. In some embodiments, the clamping device 112 is shaped to cover both of the cable passages 720 of the first and second coupling devices 110A and 110B. For example, a half of the clamping device 112 is configured to cover the cable passage 720 of the first coupling device 110A and the other half is configured to cover the cable passage 720 of the second coupling device 110B. Where the cable passages 720 have a rounded exterior as illustrated in FIG. 22, the clamping device 112 has an inner surface 812 shaped to correspond to the exterior shape of the cable passages 720. For example, the clamping device 112 can have the inner surface 812 configured as a U-shape.

In some embodiments, the clamping device 112 can include a pair of ribs 814, each of which is configured to engage the groove 802 of the coupler interconnection mechanism 730. The two ribs 814 are formed substantially in parallel on the inner surface 812 of the clamping device 112. Each of the ribs 814 is configured to correspond to the groove 802 of the coupler interconnection mechanism 730. In the embodiments where the groove 802 is tapered in width, the ribs 814 are also tapered in the same manner. The tapered ribs 814 cooperate with the tapered grooves 703 of the coupling devices 110A and 110B and pull the coupling devices 110A and 110B close to abut each other as the clamping device 112 engages the coupler interconnection mechanisms 730 of the coupling devices 110A and 110B.

The clamping device 112 can include one or more fastening holes 816 configured to mount the clamping device 112 onto the coupler interconnection mechanisms 730 of the coupling devices 110A and 110B. The fastening holes 816 are arranged to align with the coupler fastening holes 804 of the coupler interconnection mechanisms 730 of the first and second coupling devices 110A and 110B.

In some embodiments, a coupler gasket 820 is disposed between the first and second coupling devices 110A and 110B to provide sealing therebetween. When the clamping device 112 engages the coupler interconnection mechanisms 730 of the first and second coupling devices 110A and 110B, the first and second coupling devices 110A and 110B are pulled together such that the coupler gasket 820 is compressed therebetween to provide a weatherproof sealing. The coupler gasket 820 is configured to be arranged between a face of the cable passage 720 of the first coupling device 110A and a face of the cable passage 720 of the second coupling device 110B.

Figure 25:
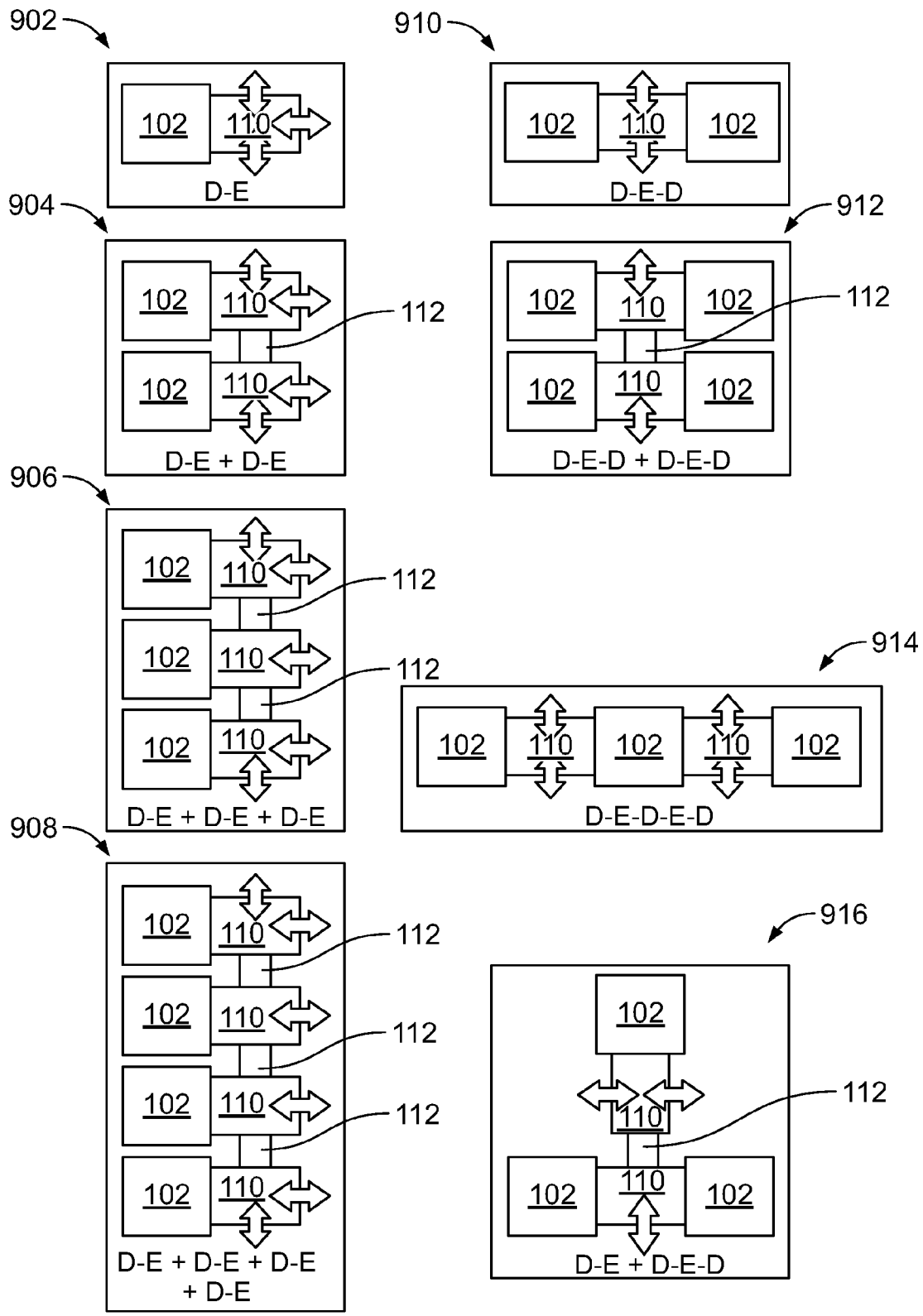
FIG. 25 illustrates various example arrangements of the warning system.

In some embodiments, the face of the cable passage 720 of the coupling device 110 is configured to receive the coupler gasket 820 in place. Correspondingly, the coupler gasket 820 is configured to seat on the face of the cable passage 720 of the coupling device 110. One example of the coupler gasket 820 is made of silicone having a thickness of about 4.8 mm and a hardness of 40-50 durometer. In some embodiments, the coupler gasket 820 is attached onto the face of the cable passage 720 with adhesive. One example of the adhesive is a pressure sensitive adhesive, such as part number ARclad® 8458 available from Adhesive Research Inc., or part number DLC506 available from Metric Felt Company FIG. 25 illustrates various example arrangements of the warning system 100. As the alarm subsystem 102, the coupling device 110, and the clamping device 112 are modularized, the warning system 100 can include different numbers of the alarm subsystems 102, the coupling devices 110, and the clamping devices 800 to produce various configurations of the warning system 100. For example, the warning system 100 can be configured in different arrangements 902, 904, 906, 908, 910, 912, 914, and 916.

In the arrangement 902, the warning system 100 includes one alarm subsystem 102 and one coupling device 110. The coupling device 110 is mounted to the alarm subsystem 102 using the coupling mechanism 724 of the coupling device 110. The coupling device 110 is accessible from three sides (see arrows) other than the side connected to the alarm subsystem 102. Thus, one or more wiring cables can be inserted into the coupling device 110 through at least one of the accessible sides.

In the arrangement 904, the warning system 100 includes two alarm subsystems 102, two coupling devices 110, and one clamping device 112. The alarm subsystems 102 are mounted to the coupling devices 110 through the coupling mechanisms 724 thereof, respectively, and the coupling devices 110 are connected by the clamping device 112 through the coupler interconnection mechanisms 730 such that a group of the alarm subsystem 102 and the coupling device 110 is arranged in parallel with another group of the alarm subsystem 102 and the coupling device 110. The coupling devices 110 are accessible from two sides other than the sides coupled to the alarm subsystem 102 and the clamping device 112.

In the arrangement 906, the warning system 100 includes three alarm subsystem 102, three coupling devices 110, and two clamping device 112. The warning system 100 in this arrangement is configured similarly to the arrangement 904 except that another group of the alarm subsystem 102 and the coupling device 110 is added in parallel. For example, the alarm subsystems 102 are mounted to the coupling devices 110 through the coupling mechanisms 724 thereof, respectively, and the coupling devices 110 are connected by the clamping device 112 through the coupler interconnection mechanisms 730 such that three combinations of the alarm subsystem 102 and the coupling device 110 are arranged in parallel. The coupling devices 110 arranged at the outskirts are accessible from two sides other than the sides coupled to the alarm subsystem 102 and the clamping device 112. The coupling device 110 arranged in the middle is accessible from one side other than the sides coupled to the alarm subsystem 102 and the clamping device 112.

In the arrangement 908, the warning system 100 includes four alarm subsystem 102, four coupling devices 110, and three clamping device 112. The warning system 100 in this arrangement is configured similarly to the arrangement 906 except that another group of the alarm subsystem 102 and the coupling device 110 is added in parallel. For example, the alarm subsystems 102 are mounted to the coupling devices 110 through the coupling mechanisms 724 thereof, respectively, and the coupling devices 110 are connected by the clamping device 112 through the coupler interconnection mechanisms 730 such that four combinations of the alarm subsystem 102 and the coupling device 110 are arranged in parallel. The coupling devices 110 arranged at the outskirts are accessible from two sides other than the sides coupled to the alarm subsystem 102 and the clamping device 112. The coupling devices 110 arranged in the middle are accessible from one side other than the sides coupled to the alarm subsystem 102 and the clamping device 112.

In the arrangement 910, the warning system 100 includes two alarm subsystem 102 and one coupling device 110. Two alarm subsystems 102 are mounted to the coupling device 110 through the coupling mechanisms 724 formed at opposite sides of the coupling device 110. The coupling device 110 is accessible from two opposite sides other than the sides connected to the alarm subsystems 102.

In the arrangement 912, the warning system 100 includes four alarm subsystem 102, two coupling devices 110, and one clamping device 112. Two alarm subsystems 102 are mounted to one of the coupling devices 110 through the coupling mechanisms 724 formed at opposite sides thereof. The other two alarm subsystems 102 are mounted to the other coupling device 110 through the coupling mechanisms 724 at opposite sides thereof. The coupling devices 110 are coupled together through the coupler interconnection mechanisms 730 thereof. The coupling devices 110 are accessible from one side other than the sides connected to the alarm subsystems 102 and the clamping device 112.

In the arrangement 914, the warning system 100 includes three alarm subsystem 102 and two coupling devices 110 to form a straight line configuration. For example, three alarm subsystems 102 are linearly connected through two coupling devices 110 therebetween. The coupling devices 110 are accessible from two sides other than the sides connected to the alarm subsystems 102.

In the arrangement 916, the warning system 100 includes three alarm subsystem 102, two coupling devices 110, and one clamping device 112 to form a transverse configuration. One alarm subsystem 102 and one of the coupling devices 110 is connected as a first set as in the arrangement 902. The other two alarm subsystems 102 are mounted to the other coupling device 110 as a second set as in the arrangement 910. The coupling devices 110 then are connected by the clamping device 112 such that the first and second sets are arranged transversely.

In the present disclosure, the arrangements 902, 904, 906, 908, 910, 912, 914, and 916 are described and illustrated for exemplary purposes only. The warning system 100 can have many other different arrangements by using a different number of the alarm subsystems 102, the coupling devices 110, and the clamping devices 800, and by selectively using one or more coupling mechanisms and coupler interconnection mechanisms thereof.

Figure 26:
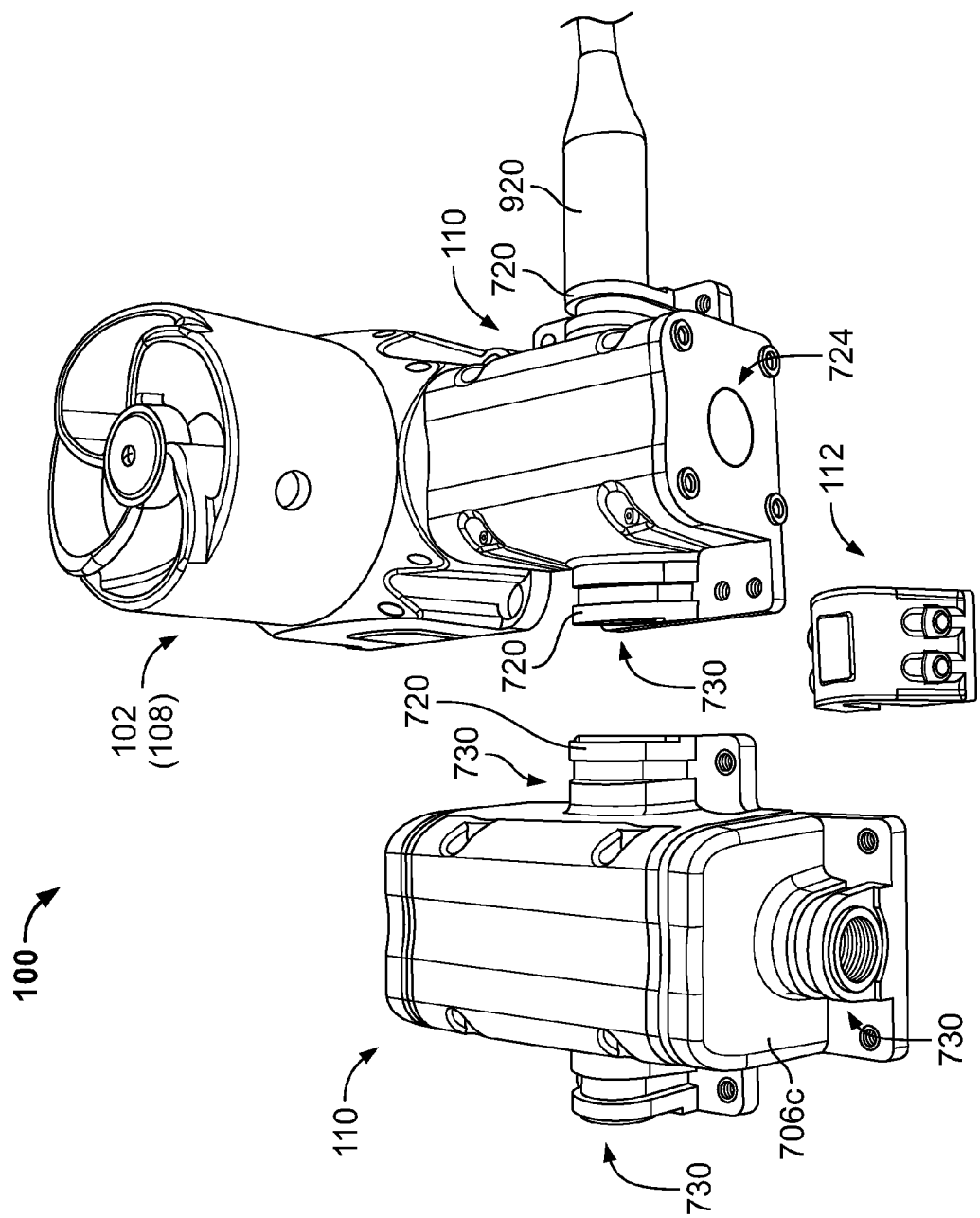
FIG. 26 illustrates two coupling devices arranged in parallel before coupling by the clamping device.
Figure 27:
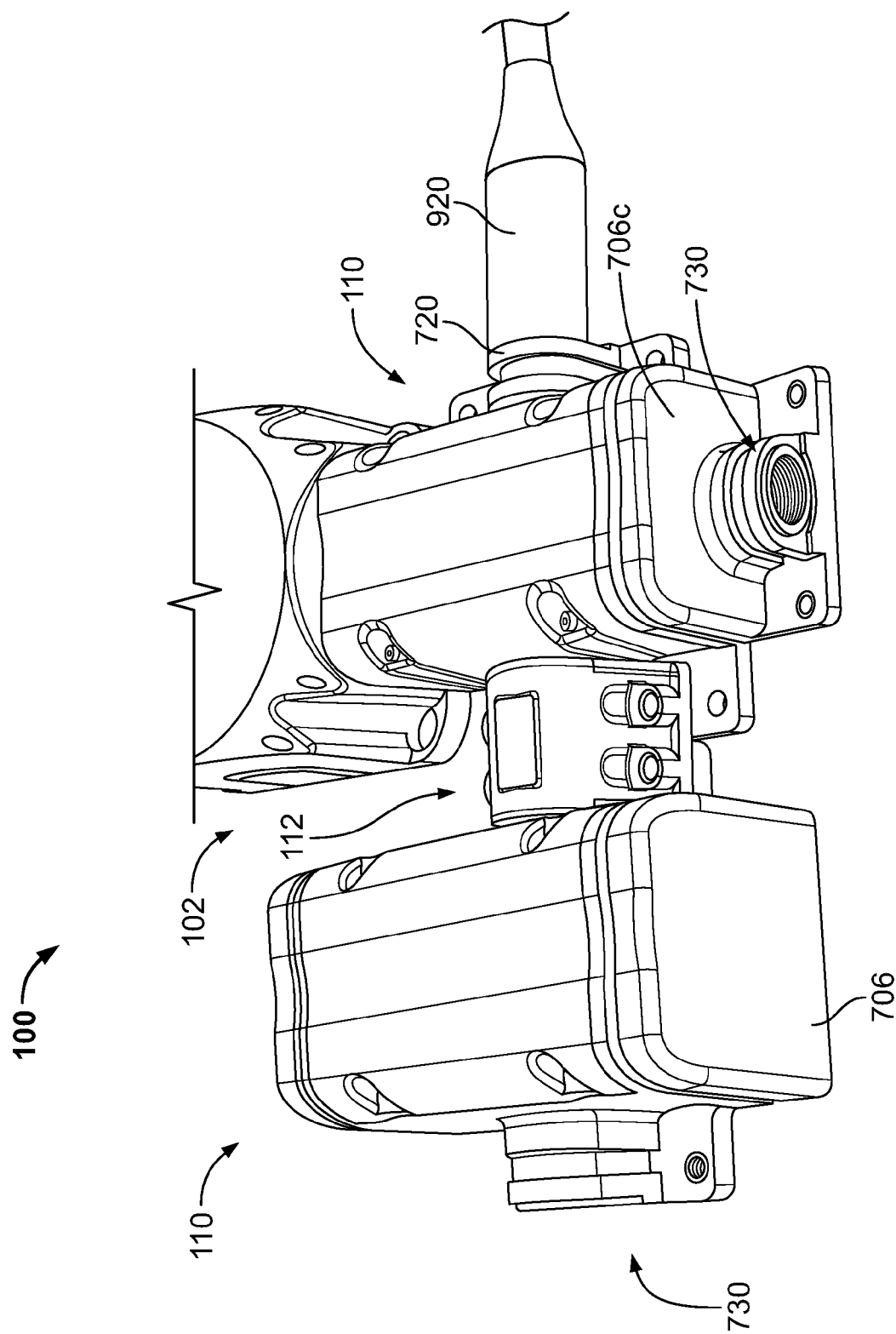
FIG. 27 illustrates two coupling devices coupled in parallel by the clamping device.
Figure 28:
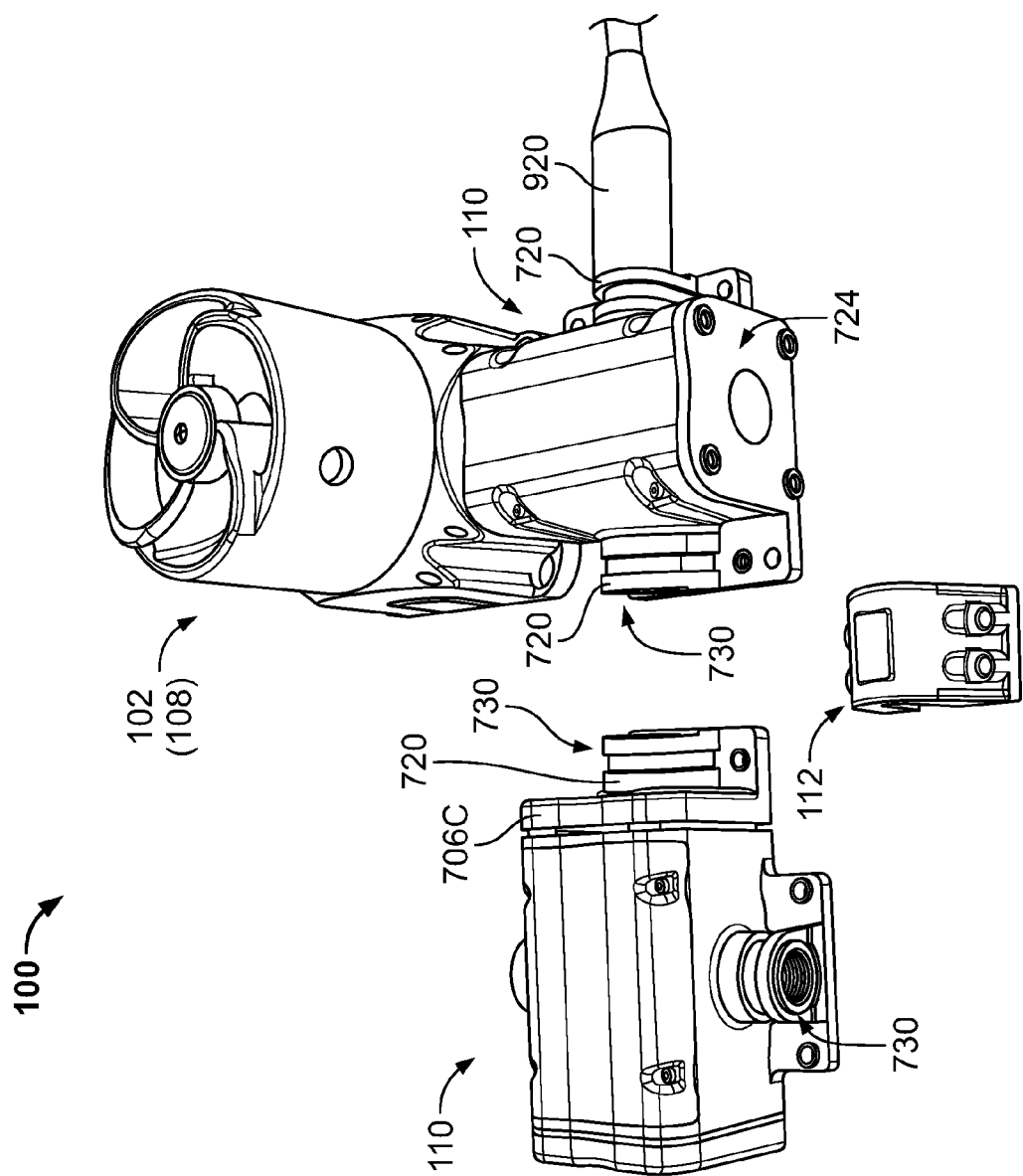
FIG. 28 illustrates two coupling devices arranged transversely before coupling by the clamping device.
Figure 29:
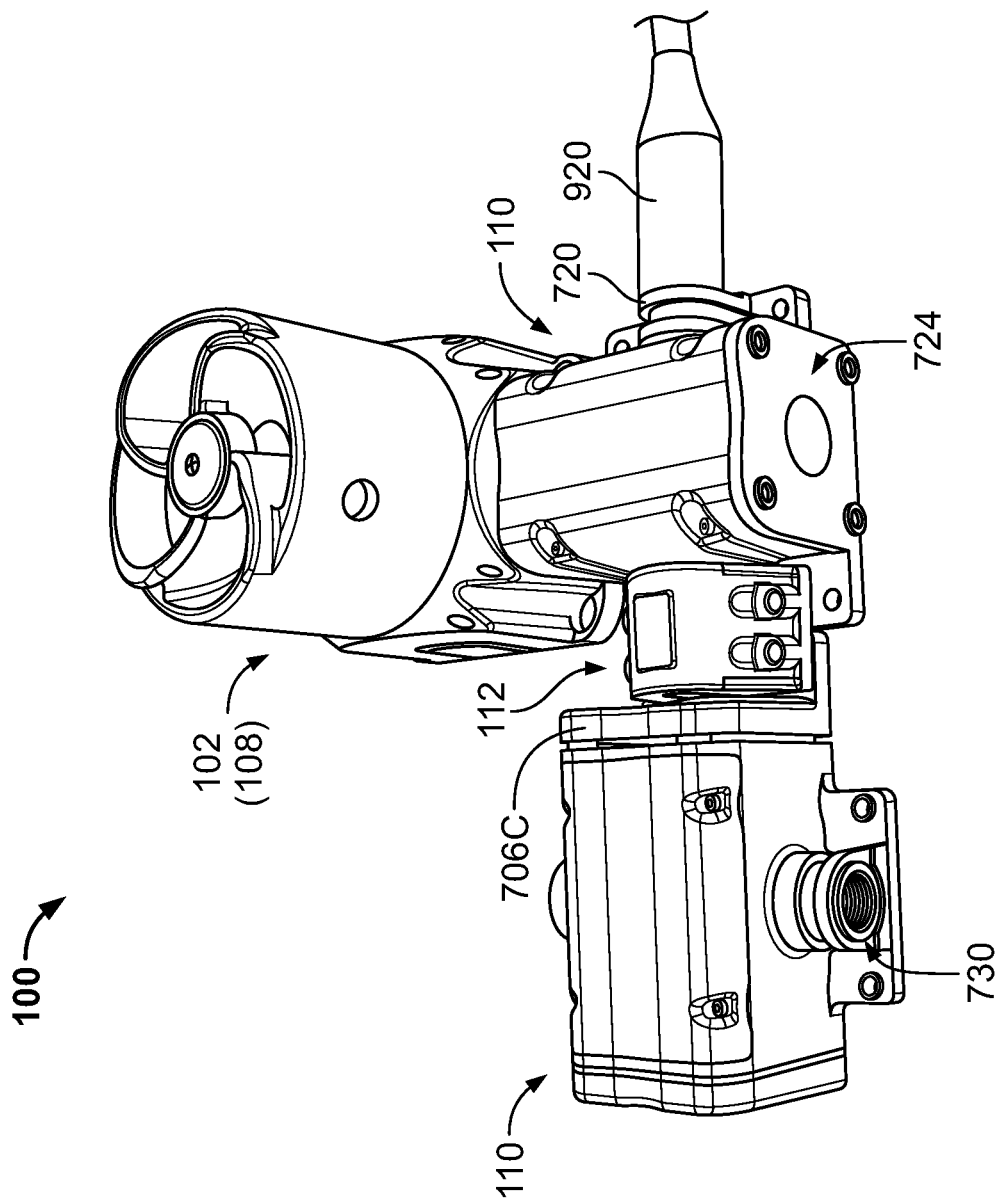
FIG. 29 illustrates two coupling devices transversely coupled by the clamping device.
Figure 30:
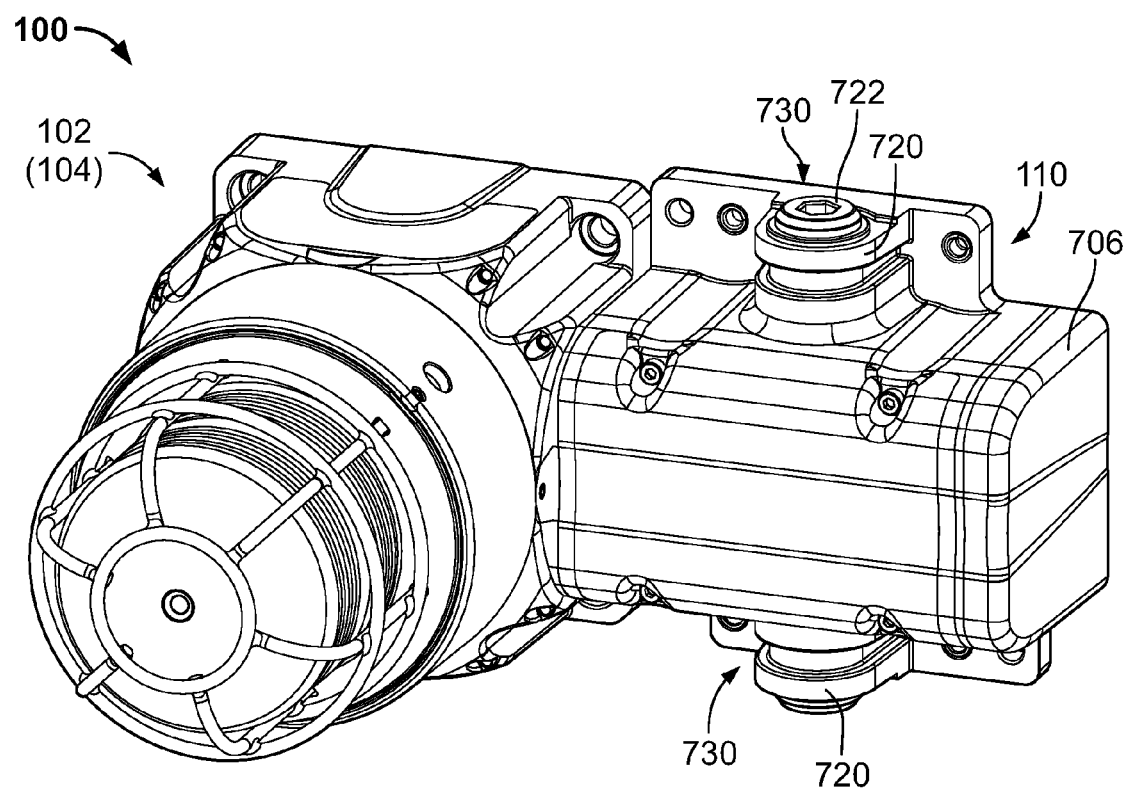
FIG. 30 is a schematic view of the warning system in an example arrangement.
Figure 31:
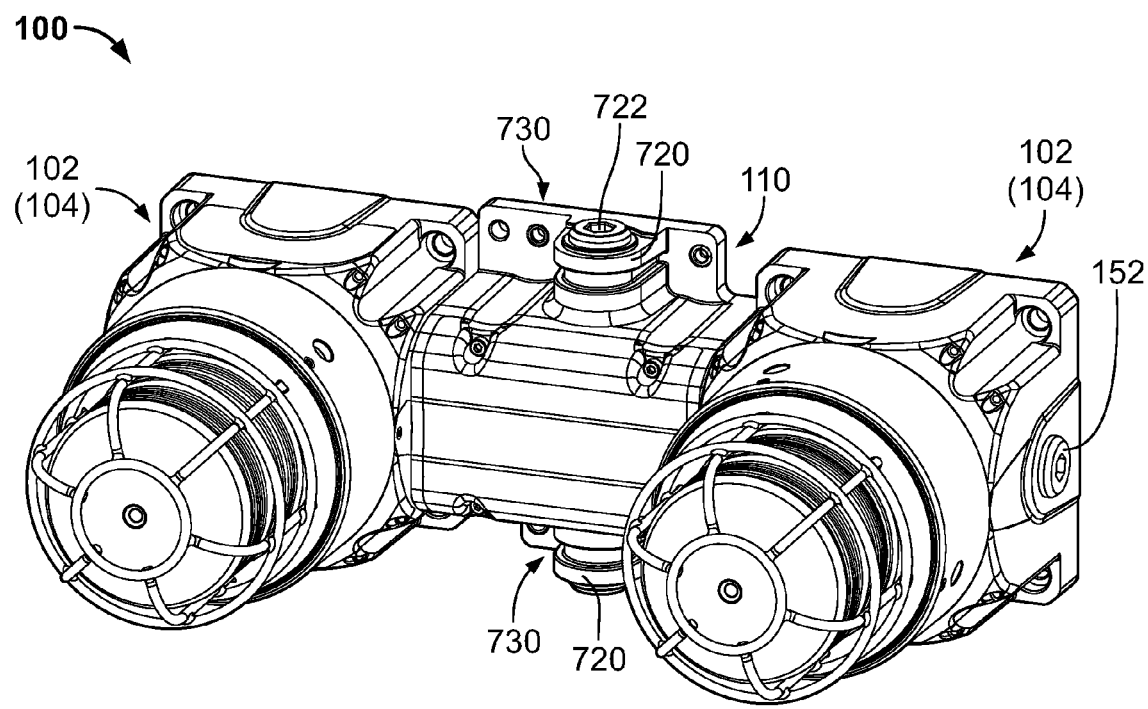
FIG. 31 is a schematic view of the warning system in an example arrangement.
Figure 32:
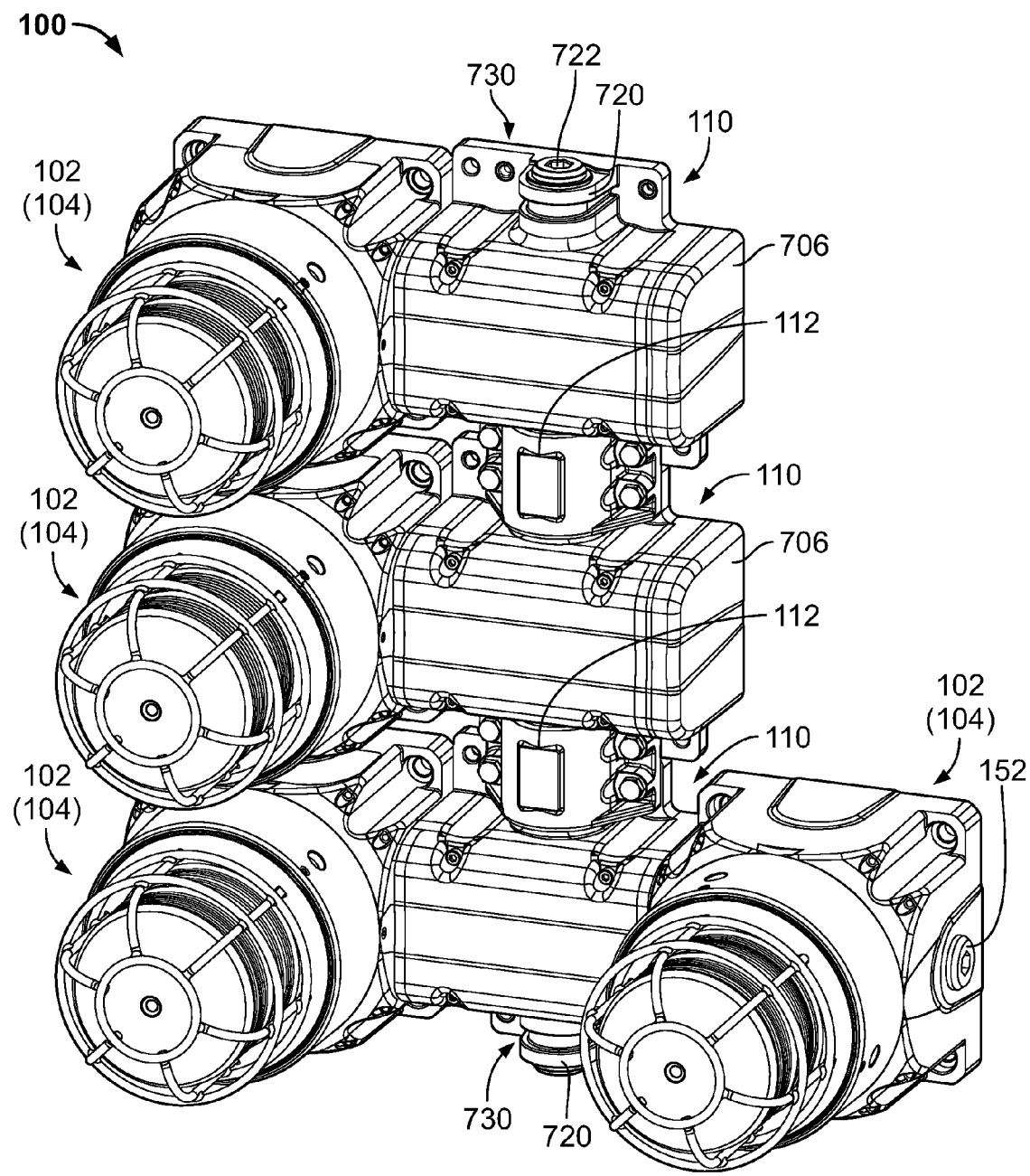
FIG. 32 is a schematic view of the warning system with two coupling devices coupled in parallel.
Figure 33:
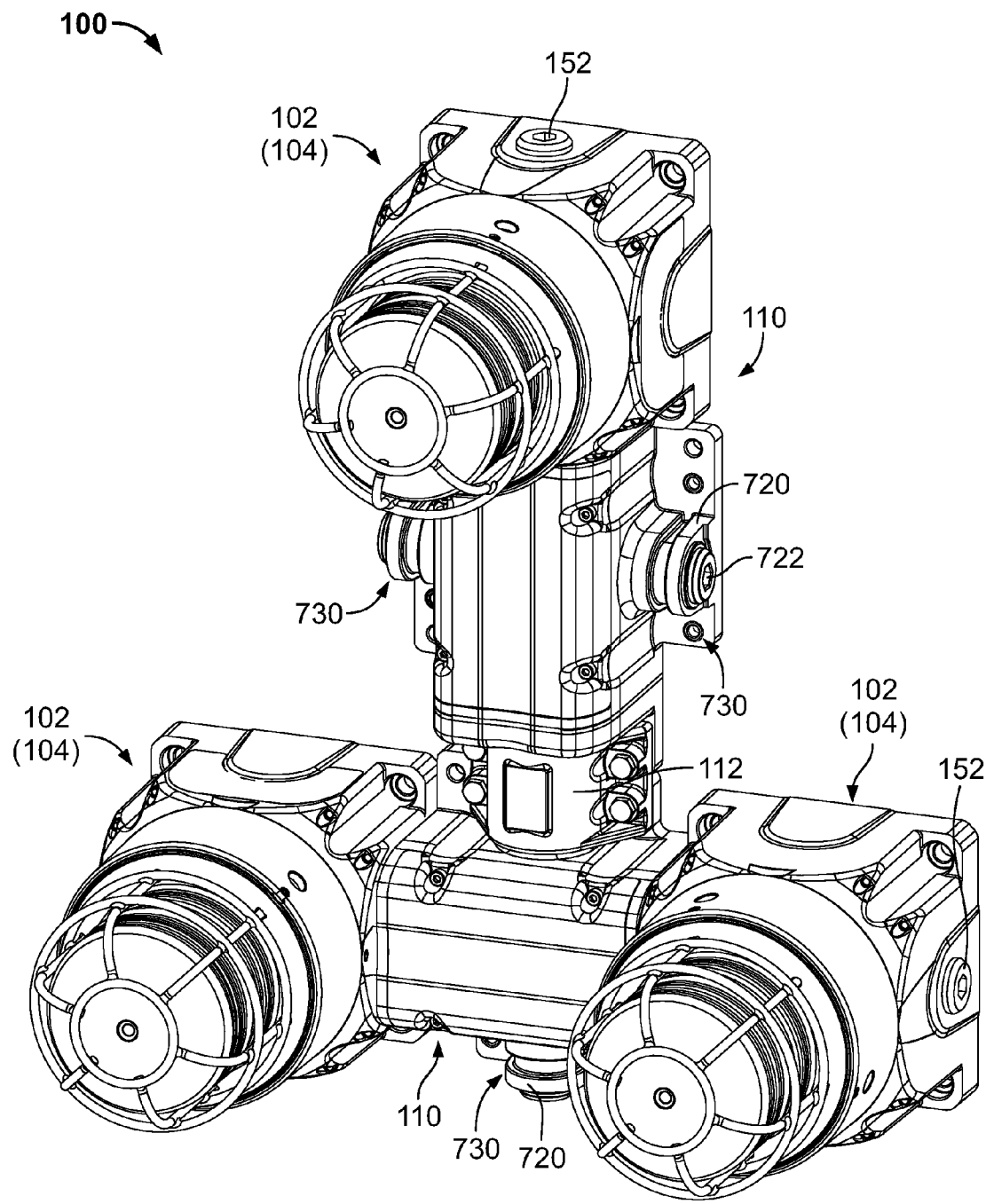
FIG. 33 is a schematic view of the warning system in an example arrangement.

FIGS. 26-33 further illustrate example arrangements of the warning system 100. In particular, FIG. 26 illustrates two coupling devices 110 that are arranged in parallel before coupled by the clamping device 112, and FIG. 27 illustrates that two coupling devices 110 are coupled in parallel by the clamping device 112. The parallel arrangement of the coupling devices 110 is shown in the arrangements 904, 906, 908, and 912. FIG. 28 illustrates two coupling devices 110 that are arranged transversely before coupled by the clamping device 112, and FIG. 29 illustrates that two coupling devices 110 are transversely coupled by the clamping device 112. The transverse arrangement of the coupling devices 110 is shown in the arrangement 914. FIG. 30 is a schematic view of the warning system 100 in the arrangement 902. FIG. 31 is a schematic view of the warning system 100 in the arrangement 910. FIG. 32 is a schematic view of the warning system 100, illustrating the coupling devices 110 coupled in parallel. The warning system 100 of FIG. 32 is the same as in the arrangement 906 except for another alarm subsystem 102 mounted to one of the coupling device 110. FIG. 33 is a schematic view of the warning system 100 in the arrangement 916.

Figure 34:
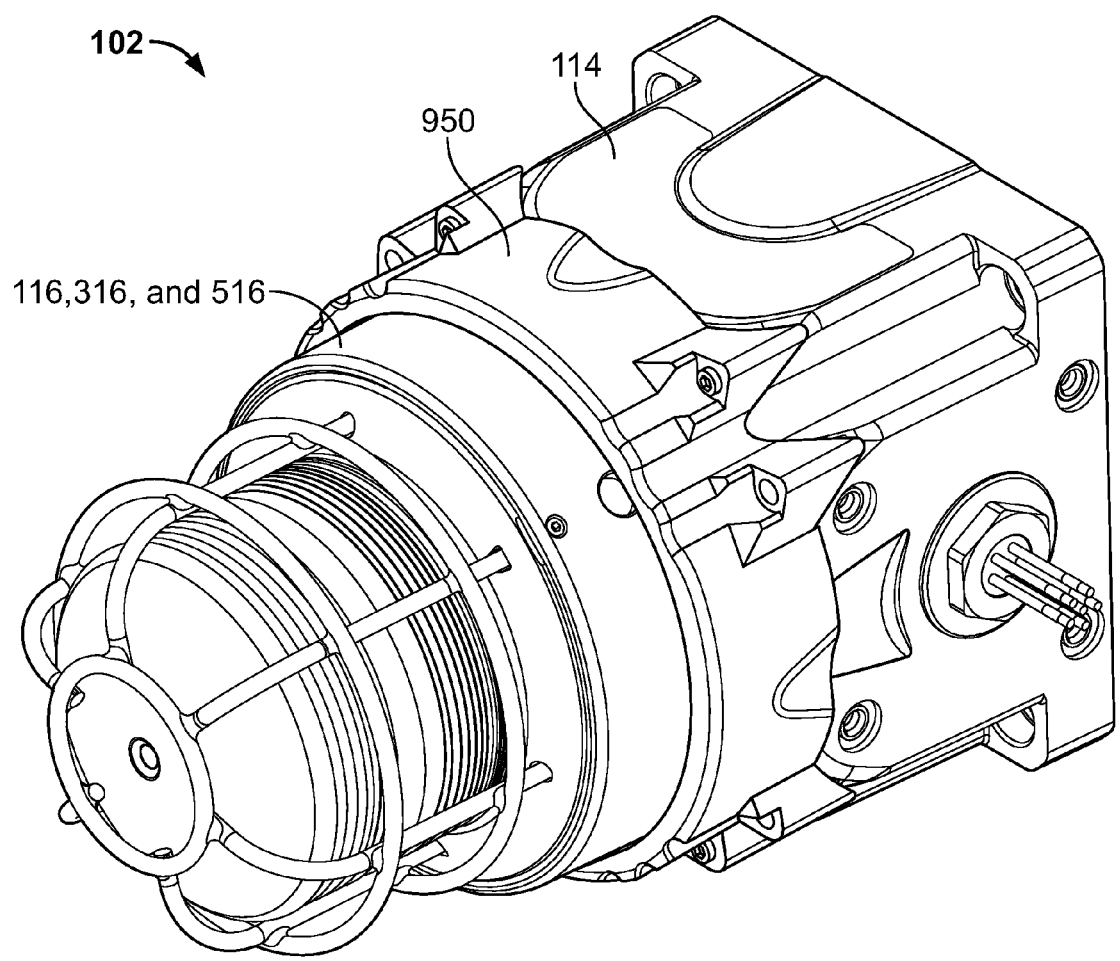
FIG. 34 is a perspective view of an example visual indicator.
Figure 35:
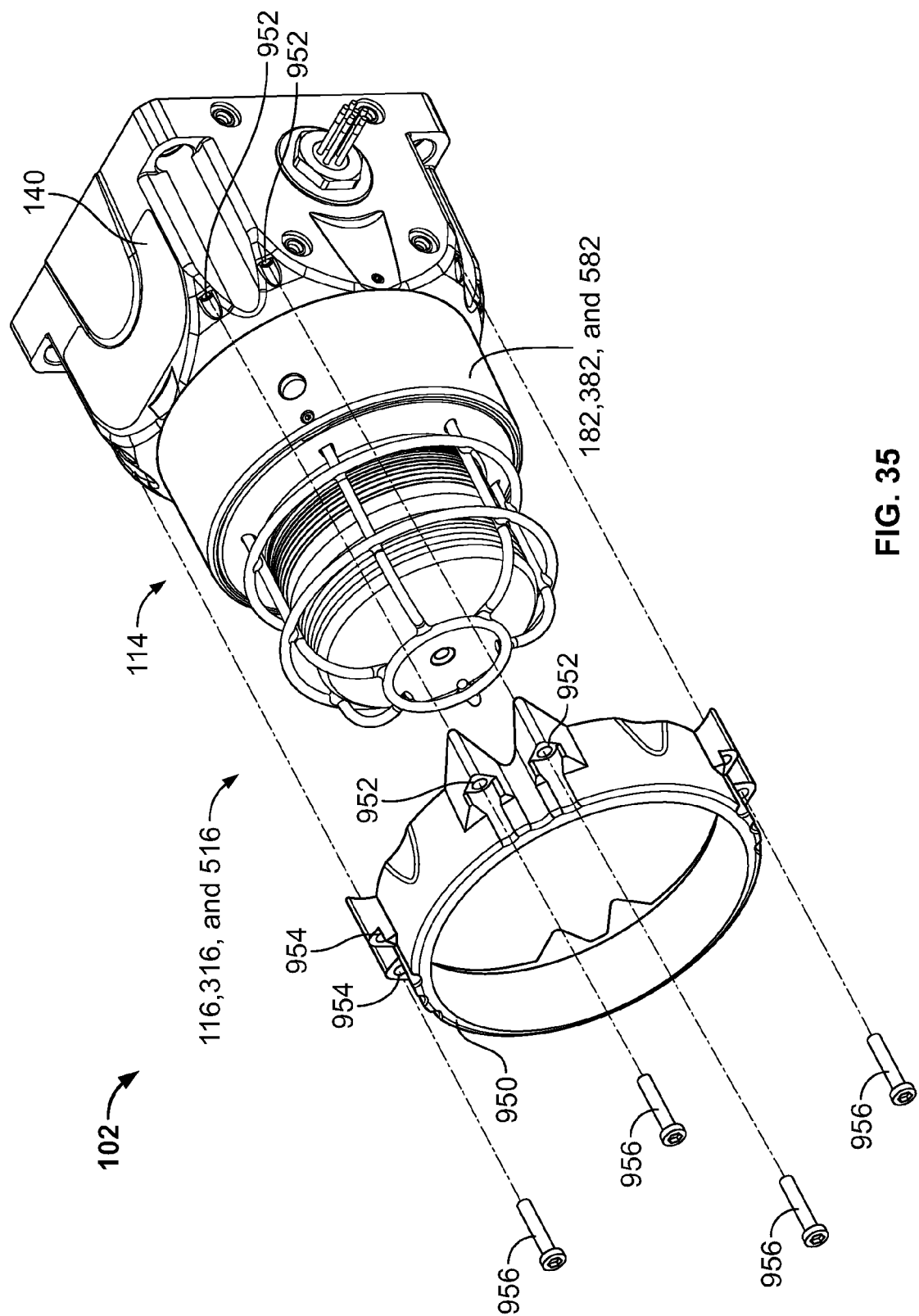
FIG. 35 is a perspective view of the visual indicator decoupled from an alarm subsystem.

Referring to FIGS. 34 and 35, a visual indicator 950 is described and illustrated in detail.

FIG. 34 is a perspective view of an example visual indicator 950 detachably mounted to the alarm subsystem 102. The visual indicator 950 is used to indicate the information about the alarm subsystem 102 to which the visual indicator 950 is attached. In some embodiments, the visual indicator 950 can indicate a type of the signaling device 116, 316, and 516 of the alarm subsystem 102, such as the fire alarm subsystem 104, the evacuation alarm subsystem 106, and the hazardous material alarm subsystem 108.

The visual indicator 950 can be differentiated by various manners. In some embodiments, the visual indicator 950 can have different colors to designate different types of the alarm subsystem 102. For example, the visual indicator 950 can be made in a first color (e.g., red) to indicate a first type of alarm subsystem 102 (e.g., the fire alarm subsystem 104), in a second color (e.g., yellow) to indicate a second type of alarm subsystem 102 (e.g., the evacuation alarm subsystem 106), or in a third color (e.g., blue) to indicate a third type of alarm subsystem 102 (e.g., the hazardous material alarm subsystem 108). In certain examples, the visual indicator 950 can also be made in the same color as the alarm subsystem 102. In other embodiments, the visual indicator 950 can have different visual identifiers, such as patterns, thereon to indicate different types of the alarm subsystem 102.

The visual indicator 950 is modularized to be replaceable in a same alarm subsystem 102. Thus, an alarm subsystem 102 can mount different visual indicators 950 thereon. As the alarm subsystems 102 can mount different types of signaling devices 116, 316, and 516 on the protection housing 114, the alarm subsystems 102 can be easily distinguished by simply replacing visual indicators 950. As such, the alarm subsystems 102 need not use other indication methodologies, such as painting on the alarm subsystems 102.

FIG. 35 is a perspective view of the visual indicator 950 that is decoupled from the alarm subsystem 102. In some embodiments, the visual indicator 950 is a sleeve ring configured to surround a portion of the alarm subsystem 102. In the depicted example, the visual indicator 950 is configured to surround a portion of the signaling device 116, 316, and 516 and cover a portion of the protection housing 114. The protection housing 114 includes one or more indicator mounting sockets 952 to fasten the visual indicator 950 therein. The visual indicator 950 includes one or more indicator mounting holes 954 that correspond with the indicator mounting sockets 952 and are aligned with the indicator mounting sockets 952. The visual indicator 950 is then fastened by one or more fasteners 956 (e.g., screws) engaged into the indicator mounting sockets 952 through the indicator mounting holes 954. In other embodiments, the visual indicator 950 can be mounted onto the alarm subsystem 102 in different manners.

Figure 36:
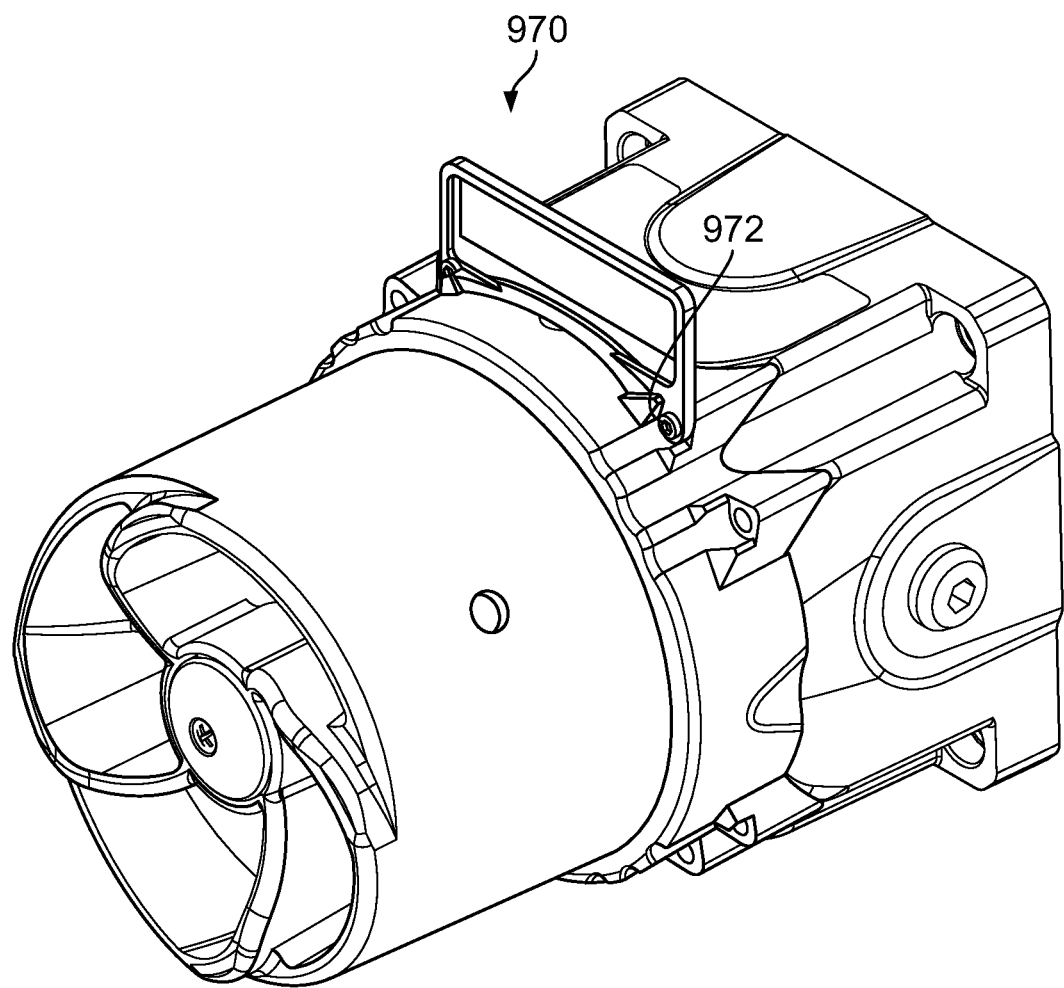
FIG. 36 illustrates a placard used with an alarm subsystem.
Figure 37:
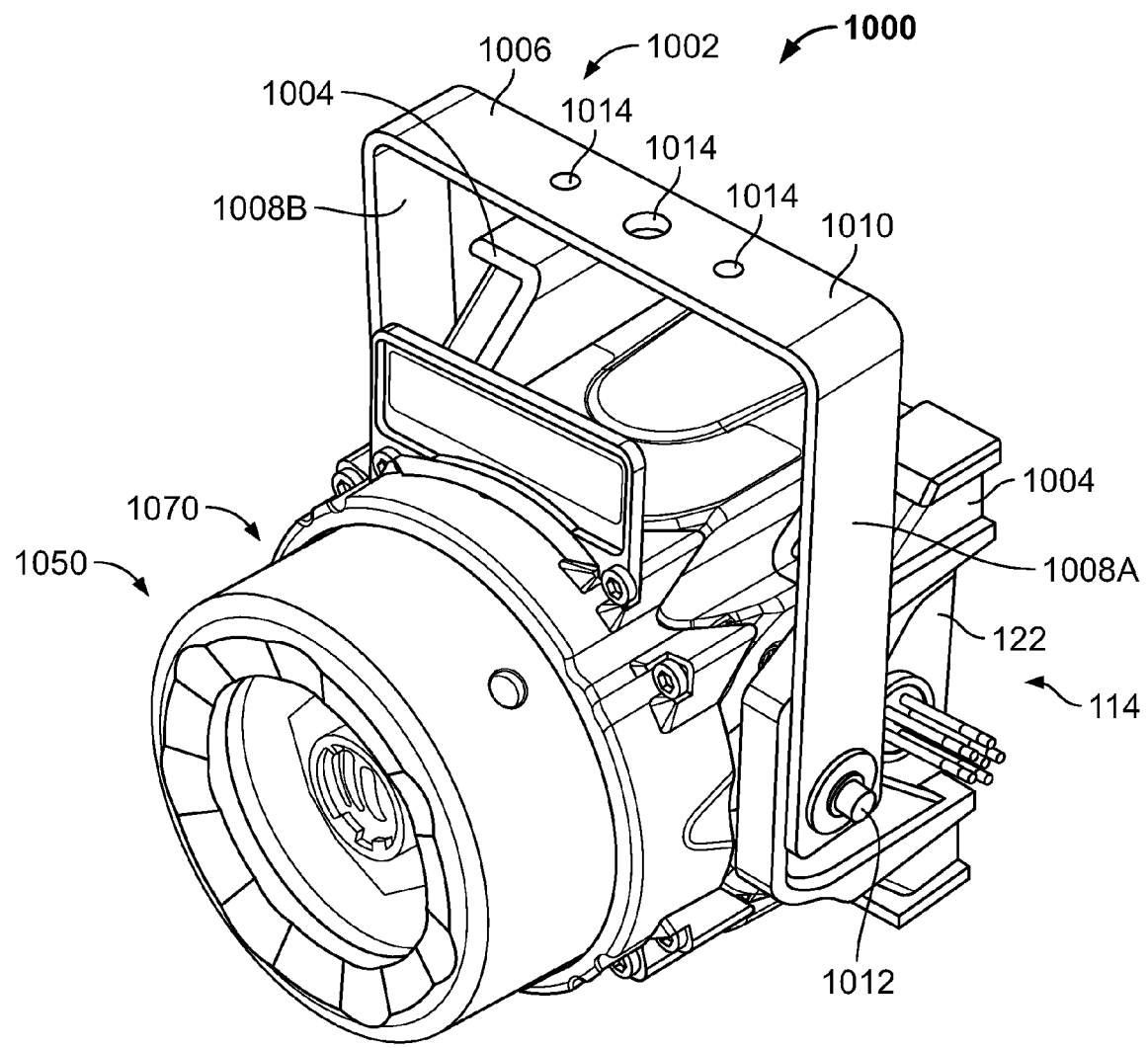
FIG. 37 is a perspective view of a first example mounting assembly secured to the protection housing.
Figure 38:
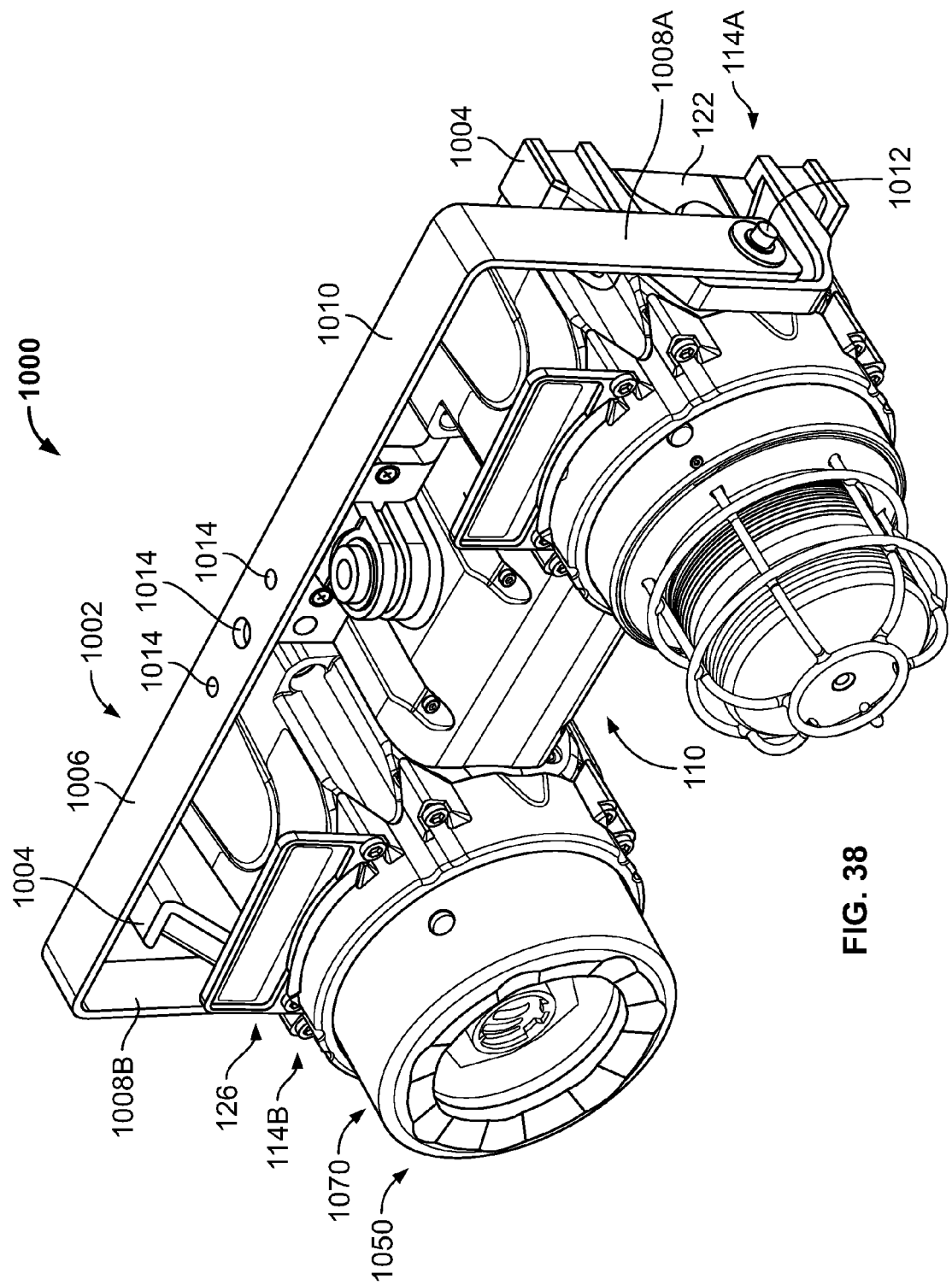
FIG. 38 is a perspective view of a second example mounting bracket assembly secured to the protection housing.

FIG. 36 illustrates a placard 970 that is used with the alarm subsystem 102. The placard 970 is configured to indicate the information about the alarm subsystem 102 to which the placard 970 is attached. Therefore, the placard 970 operates as a second visual indicator. In some embodiments, the placard 970 can indicate a type of the signaling device 116, 316, and 516 of the alarm subsystem 102. For example, the placard 970 can include a phrase, such as "FIRE," "EVAC," and "HAZMAT," to indicate a type of the alarm subsystem 102 (e.g., the fire alarm subsystem 104, the evacuation alarm subsystem 106, and the hazardous material alarm subsystem 108). When other devices are used with the protection housing 114 and/or the coupling device 110 than the first, second and third signaling devices 116, 316 and 516, the placard 970 can include different phrases suitable for indicating such other devices. For example, the placard 970 can include "CAM" or "CAM1" for representing a camera device mounted onto the protection housing 114, as illustrated in FIGS. 37 and 38.

In some embodiments, the placard 970 can be used together with the visual indicator 950. In other embodiments, the placard 970 can replace the visual indicator 950.

The placard 970 can be attached to the alarm subsystem 102 in various manners. In some embodiments, the placard 970 is coupled to the alarm subsystem 102 by fasteners 972 (e.g., screws). The placard 970 can have one or more fastener holes through which the fasteners 972 pass to mount the placard 970 onto the alarm subsystem 102. In some embodiments, the placard 970 can have the fastener holes arranged to align with the indicator mounting sockets 952 such that the fasteners 972 are engaged into the indicator mounting sockets 952 through the fastener holes of the placard 970, thereby fixing the placard 970 to the alarm subsystem 102. In other embodiments, as illustrated in FIG. 36, the placard 970 can be mounted onto the visual indicator 950 using the indicator mounting holes 954 by engaging the fasteners 972 into the indicator mounting holes 954.

Referring to FIGS. 37-42, an example mounting bracket assembly 1000 is described.

FIG. 37 is a perspective view of a first example mounting assembly 1000 secured to the protection housing 114. In some embodiments, the mounting assembly 1000 includes a mounting bracket 1002 and a pair of bracket bases 1004.

The mounting assembly 1000 is configured to mount one or more protection housings 114 to a desired location. For example, the mounting assembly 1000 is used to mount the protection housing 114 to a wall or ceiling at a predetermined location.

The mounting bracket 1002 includes a mounting frame 1006 that can be connected to the protection housing 114 through the bracket bases 1004. The mounting bracket 1002 can be pivotally coupled to the protection housing 114 at one or more of the side walls 120, 122, 124 and 126 through the bracket bases 1004. In the illustrated example, the mounting frame 1006 of the mounting bracket 1002 has two side members 1008A and 1008B and a cross member 1010 connecting the side members 1008A and 1008B. Each of the side members 1008A and 1008B can be pivotally coupled to each of the bracket bases 1004. In this example, the side members 1008A and 1008B are coupled to the bracket bases 1004 that are, respectively, secured to the opposing side walls 122 and 126 of the protection housing 104. In some embodiments, the side members 1008A and 1008B are secured to the bracket bases 1004 by fasteners 1012. The cross member 1010 can be provided with one or more holes 1014 configured to receive one or more fasteners (not shown) to fix the cross member 1010 (and thus the mounting bracket 1002) to a desired place.

The bracket base 1004 is configured to mount onto one of the side wall 120, 122, 124 and 126 of the protection housing 114 to pivotally couple the mounting bracket 1002. An example of the bracket base 1004 is illustrated and described in more detail with reference to FIGS. 39-41.

FIG. 38 is a perspective view of a second example mounting bracket assembly 1000. The mounting assembly 1000 in this example is similar to the mounting assembly as illustrated in FIG. 37, except that the mounting bracket 1002 is modified to be secured to a set of multiple protection housings 114. The description of the mounting assembly 1000 as described in FIG. 37 is incorporated by reference and is not repeated in the example for brevity purposes. The following description is limited to differences between the first and second examples.

In this example, two protection housing 114 are connected by the coupling device 110, as illustrated in FIG. 31. The cross member 1010 of the mounting frame 1006 has a longer length than the cross member 1010 of FIG. 37 and extends over the two protection housing 114A and 114B and the coupling device 110. One side member 1008A is pivotally coupled to a bracket base 1004 secured to a side wall 122 of a first protection housing 114A, and the other side member 1008B is pivotally coupled to a bracket base 1004 secured to a side wall 126 of a second protection housing 114B. A configuration of the bracket base 1004 can be the same as the bracket bases 1004 used in the first example of FIG. 37.

In other embodiments, the mounting frame 1006 can be modified according to different arrangements of the protection housings 114 and the coupling device 110 while the same bracket bases 1004 are used with the protection housings 114.

Figure 39B:
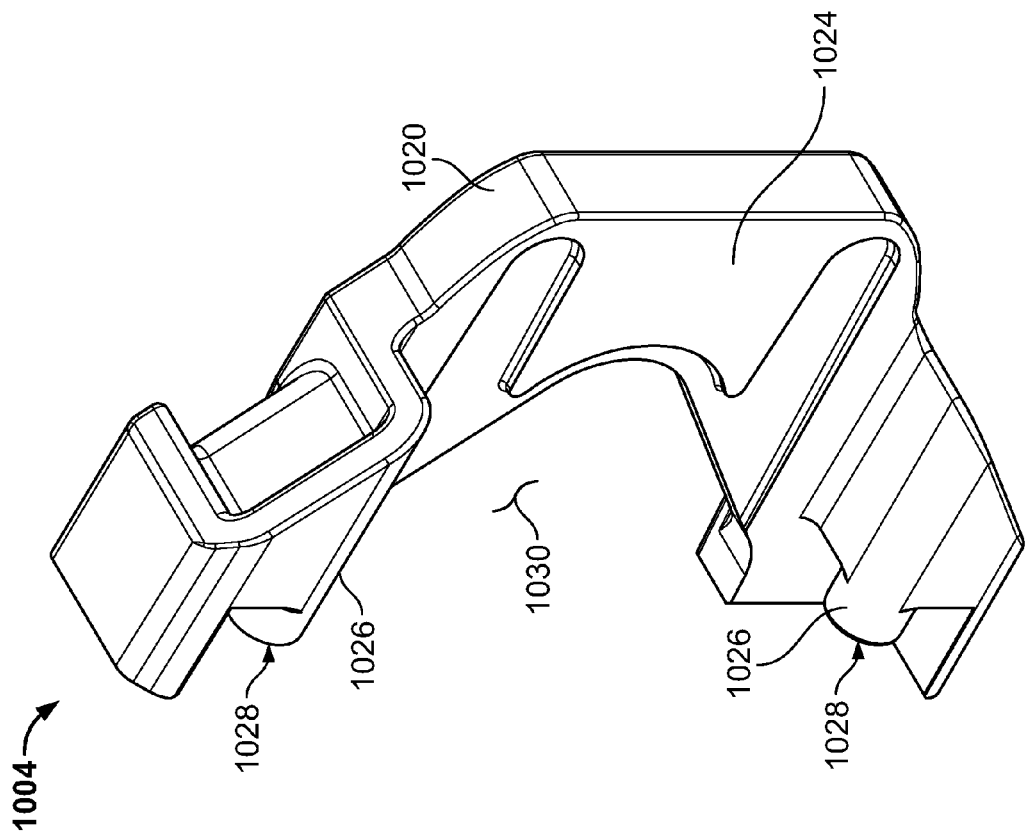
FIG. 39B is a rear perspective view of the bracket base of FIG. 39A.
Figure 39A:
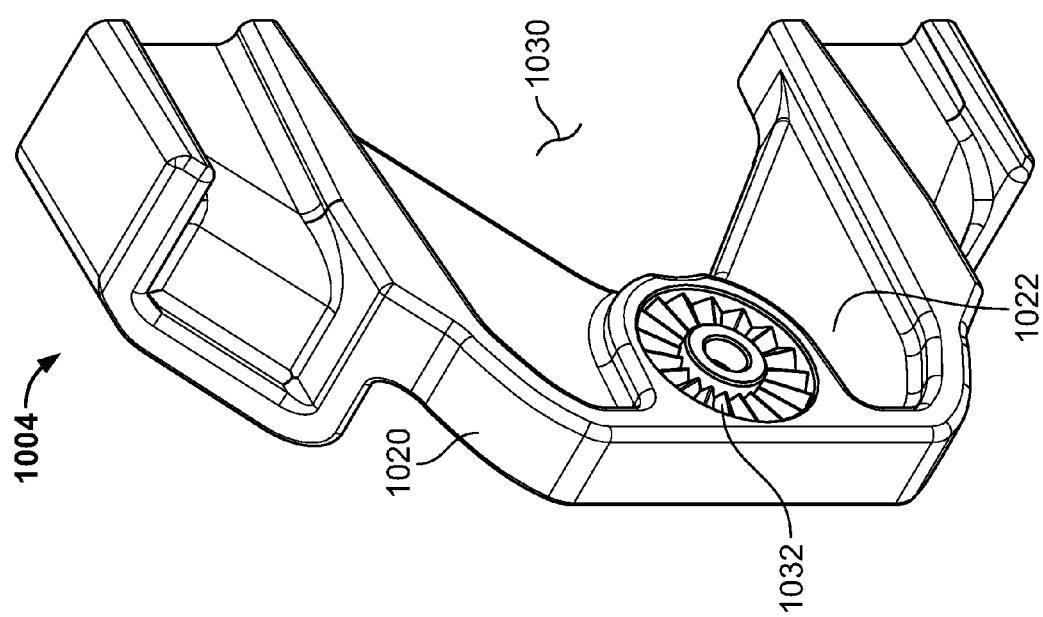
FIG. 39A is a front perspective view of an example bracket base.
Figure 41:
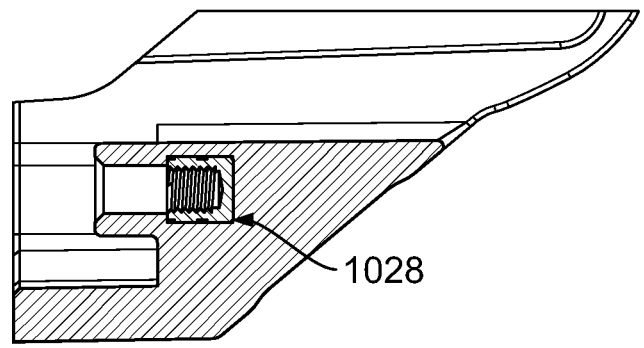
FIG. 41 is a cross-sectional view of an example fastening device of the bracket base.
Figure 42A:
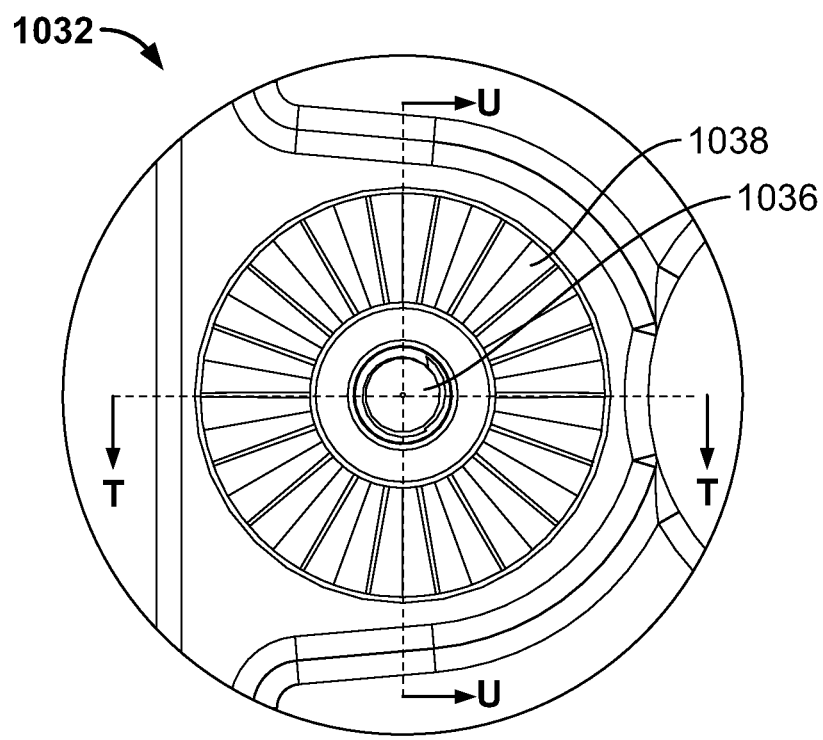
FIG. 42A is a front view of a pivot mount device of the bracket base.
Figure 42B:
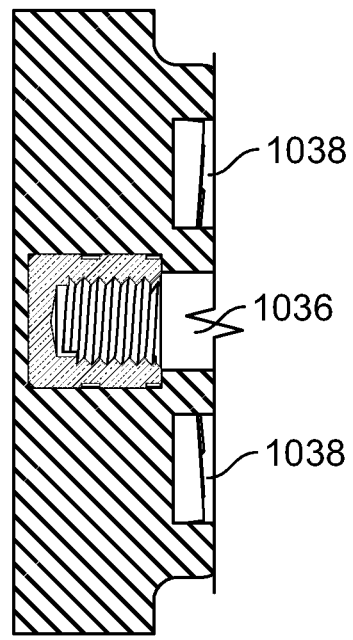
FIG. 42B is a cross-sectional view of the pivot mount device of the bracket base.
Figure 42C:
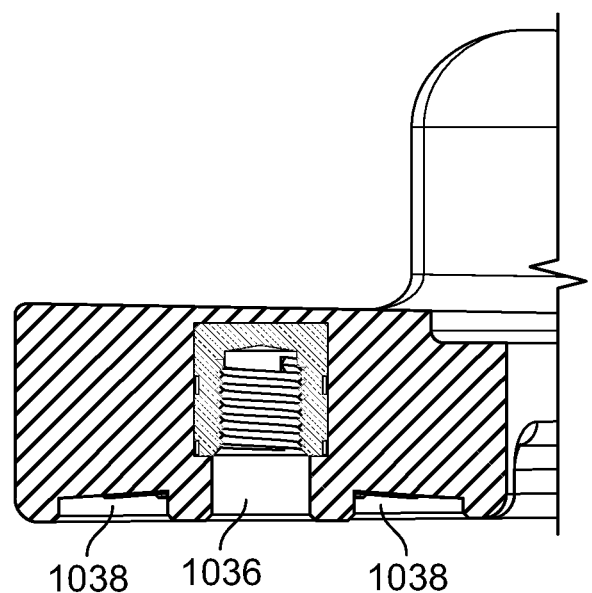
FIG. 42C is another cross-sectional view of the pivot mount device of the bracket base.

Referring to FIGS. 39-41, an example bracket base 1004 is illustrated and described in more detail. In particular, FIGS. 39A and 39B are front and rear perspective views of an example bracket base 1004. FIGS. 40A-40D are rear, top, front, and bottom side views of the bracket base 1004 of FIGS. 39A and 39B. FIG. 41 is a cross-sectional view of an example fastening device of the bracket base 1004. FIG. 42A is a front view of a pivot mount device of the bracket base 1004, and FIGS. 42B and 42C are cross-sectional view of the pivot mount device of the bracket base 1004.

With reference to FIGS. 39A and 39B, the bracket base 1004 includes a base body 1020 having a front face 1022 and a rear face 1024. The rear face 1024 of the base body 1020 is configured to be abutted with one of the side walls 120, 122, 124 and 126 of the protection housing 114. In the illustrated examples, the rear face 1024 of the base body 1020 is configured to be adjacent, or in contact with, either of the side walls 122 and 126 of the protection housing 114, at which the coupling mechanism 130 is arranged.

The bracket base 1004 includes one or more alignment portion 1026, each of which is configured to engage a bracket alignment recess 1034 (FIGS. 3, 4, 7, 8, 11, and 12) of the protection housing 114. The alignment portion 1026 includes a fastening recess 1028. As shown in FIG. 41, the fastening recess 1028 is formed as an internally-threaded recess configured to threadedly secure a fastener received therein.

In the illustrated examples, the bracket alignment recesses 1034 are formed at the corners of the protection housing 114 and arranged with the mounting portion 136 (e.g., fastener openings) of the protection housing 114. The alignment portions 1026 of the bracket base 1004 are received onto the bracket alignment recesses 1034 as the base body 1020 of the bracket base 1004 mounts to one of the side walls 122 and 126 of the protection housing 114. When the alignment portions 1026 seat on the bracket alignment recesses 1034, the fastening recess 1028 of the alignment portion 1026 is aligned with the mounting portion 136 (e.g., the fastener opening) of the protection housing 114. A fastener (e.g., a screw) can be inserted into the fastening recess 1028 through the mounting portion 136 so that the bracket base 1004 is secured to the protection housing 114.

The bracket base 1004 defines a window 1030 configured to expose at least some of the coupling mechanism 130. The window 1030 is also configured to expose the wiring cables 118 and associated components, such as the wiring conduit 144 and the bushing 146, so that the wiring cables 118 extend out of the protection housing 114 past the bracket base 1004 (through the window 1030 thereof) for other electrical and/or mechanical connections.

The bracket base 1004 includes a pivot mount device 1032 configured to pivotally support the mounting frame 1006. In the illustrated examples, the pivot mount device 1032 is configured to pivotally connect a portion of the side member 1008 (either 1008A or 1008B) of the mounting frame 1006 through a fastener 1012. An example pivot mount device 1032 is illustrated and described in more detail with reference to FIGS. 42A-42C.

Referring to FIGS. 42A-42C, the pivot mount device 1032 includes a fastener hole 1036 and a plurality of radial ribs 1038. The fastener hole 1036 is configured to secure a corresponding engaging portion of the side member 1008 of the mounting frame 1006. In some embodiments, the fastener hole 1036 has an internally-threaded portion for thread coupling with the mounting frame 1006. The radial ribs 1038 are configured to engage corresponding radial ribs provided to the side member 1008 to selectively set an angular position of the side member 1008 with respect to the bracket base 1004.

In other embodiments, the mounting assembly 1000 employs different configurations to mount one or more protection housings 114 to a desired location. For example, the mounting bracket 1002 and the bracket base 1004 are modified to install one or more protection housings 114 with a pivoted supporting mechanism, such as a gimbal mount (e.g., 2-axis or 3-axis). In other examples, the mounting bracket 1002 and the bracket base 1004 are modified to mount one or more protection housings 114 with various types of metal framing systems, such as ones available from Unistrut Corporation.

As described herein, the protection housing 114 and the couple device 110 are primarily described to be used for various alarm subsystems, such as the fire alarm subsystem 104, the evacuation alarm subsystem 106, and the hazardous material alarm subsystem 108. With reference to FIGS. 3-6, the protection housing 114 is used to secure a first signaling device 116 (e.g., a first light emission device) including a strobe light. With reference to FIGS. 7-10, the protection housing 114 is used to secure a second signaling device 316 (e.g., a second light emission device) including a LED light. With reference to FIGS. 11-15, the protection housing 114 is used to secure a third signaling device 516 (e.g., an audio signaling device) including an audio driver circuit. In other embodiments, however, the protection housing 114 can also be used for auxiliary devices other than the first, second and third signaling devices 116, 316 and 516. Examples of such auxiliary devices include a LED white area lighting fixture, a camera unit, an infrared LED lighting fixture, a card reader, a call point device, and other suitable devices for various purposes. These auxiliary devices can be used to provide visible and/or audible functions in various situations, such as fire detection, smoke detection, gas leakage detection, weather detection, and telecommunications.

These auxiliary devices can mount to the protection housing 114, and a plurality of such protection housing 114 can be coupled through one or more coupling devices 110, in the same or similar manner as described herein.

In some embodiments, the protection housing 114 can secure an area lighting device in the same or similar manner as described in FIGS. 3-15. For example, the area lighting device can have a device body (similarly to the device body 170, 370, 570) configured to receive a light circuit with one or more white LEDs (WLEDs) and mounted onto the protection housing 114 in a similar manner as illustrated in FIGS. 3-15.

As illustrated in FIGS. 37 and 38, the protection housing 114 can also mount a camera device 1050 thereon in the same or similar manner as described in FIGS. 3-15. For example, the camera device 1050 includes a device body 1070 (similarly to the device body 170, 370, 570) configured to receive a camera unit and mounted onto the protection housing 114 in a similar manner as illustrated in FIGS. 3-15. The camera device 1050 is used to monitor a predetermined area. In some embodiments, the camera device 1050 can also be configured to operate day and night by using infrared technology.

The protection housing 114 can be used to secure a lighting device including one or more infrared LEDs. Such an infrared LED lighting device can be mounted onto the protection housing 114 in the same or similar manner as described in FIGS. 3-15. The infrared LED lighting device can be used to complement lighting of the area being monitored by a camera device (e.g., the camera device 1050) when the area is not sufficiently bright.

Further, the protection housing 114 can mount a card reader device thereon. The card reader device can be mounted on the protection housing 114 in the same or similar manner as described in FIGS. 3-15. The card reader device can be configured as various access control card readers that are used in physical security systems to read a credential that allows access through access control points, such as a locked door. The card reader device can be of various types, such as magnetic stripe readers, bar code readers, proximity readers, smart card readers, and biometric readers.

The protection housing 114 can also be used to secure an indicating device for informing a location of one or more call point devices. The indicating device can be configured to operate visible and/or audible functions in a manner similar to the devices as illustrated in FIGS. 3-15. The indicating device can be mounted on the protection housing 114 in the same or similar manner as described in FIGS. 3-15. The call point device is used to initiate an alarm system or other associated systems. For example, call point devices are used to allow users (e.g., building, site, or facility occupants) to signal that a fire or other emergency exists within the area. The call point device can be connected to a central fire alarm panel which is in turn connected to an alarm system in the building, site or facility, and/or to a local fire department. The call point device can be operated either manually or automatically. For example, a manual call point device provides a button for activating an alarm. In some embodiments, the button is in a depressed condition under normal conditions, and, when a cover of the call point device is broken, the button will be released by a spring action and actuate an alarm at the control panel through its switching contacts. In other embodiments, the call point device has a handle and can be activated by pulling the handle down, which completes a circuit and locks the handle in the activated position, sending an alarm to a fire alarm control panel. Other configurations of call point devices are also possible.

Example configurations of various auxiliary devices that can be used with the protection housing 114 and the coupling device 110 can be listed as follows:

1. Hazard Indicating Devices
       a. Audible alarming devices (e.g., the audio driver assembly 572)
          i. Tone sounders
          ii. Speakers
          iii. Loudspeakers
       b. Visual alarming devices (e.g., the electric light 172 and 372)
          i. Strobe-type
          ii. LED-type
    2. Hazard Initiating Devices
       a. Manual call point devices with a physical button or switch
          i. Manually resettable type upon initiating
          ii. Key resettable type upon initiating iii. Glass cover type (e.g., a glass should be broken down to initiate, and then replaced to reset)
b. Devices for automatically detecting the present of hazardous environment
  i. Configured to detect temperature variance
  ii. Configured to detect pressure variance
  iii. Configured to detect presence of gas
  iv. Configured to detect presence of liquid
  v. Configured to detect shock, impact, and/or vibration
3. Hazard Surveillance and Security Communicative Devices
a. Visual communicative devices
  i. Camera unit for visual surveillance and recording
  ii. White light device for augmenting areas in need of visual surveillance
  iii. Infrared radiation (IR) night vision device for augmenting IR camera surveillance
  iv. Card readers and/or scanners for security access
b. Audible communicative devices (e.g., a device configured to relay a voice message from a point of hazard)

Figure 44A:
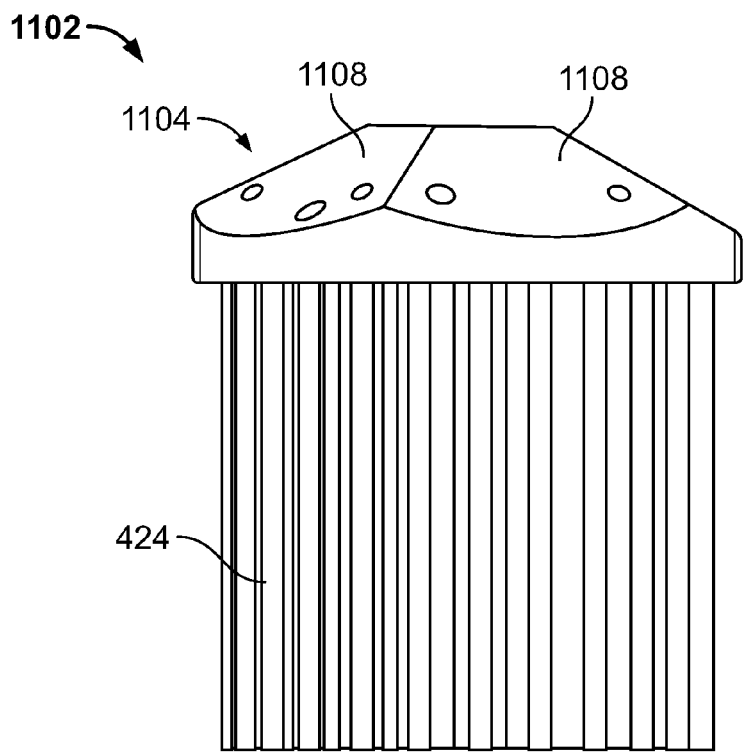
FIG. 44A is a side view of an example heat sink assembly for the LED light of FIG. 43A.
Figure 44B:
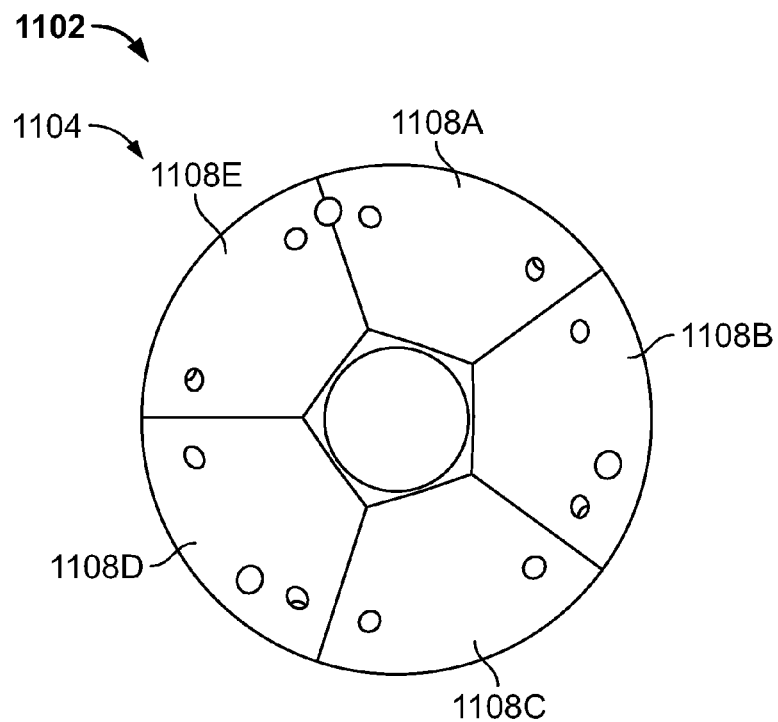
FIG. 44B is a top view of the heat sink assembly of FIG. 44A.
Figure 45A:
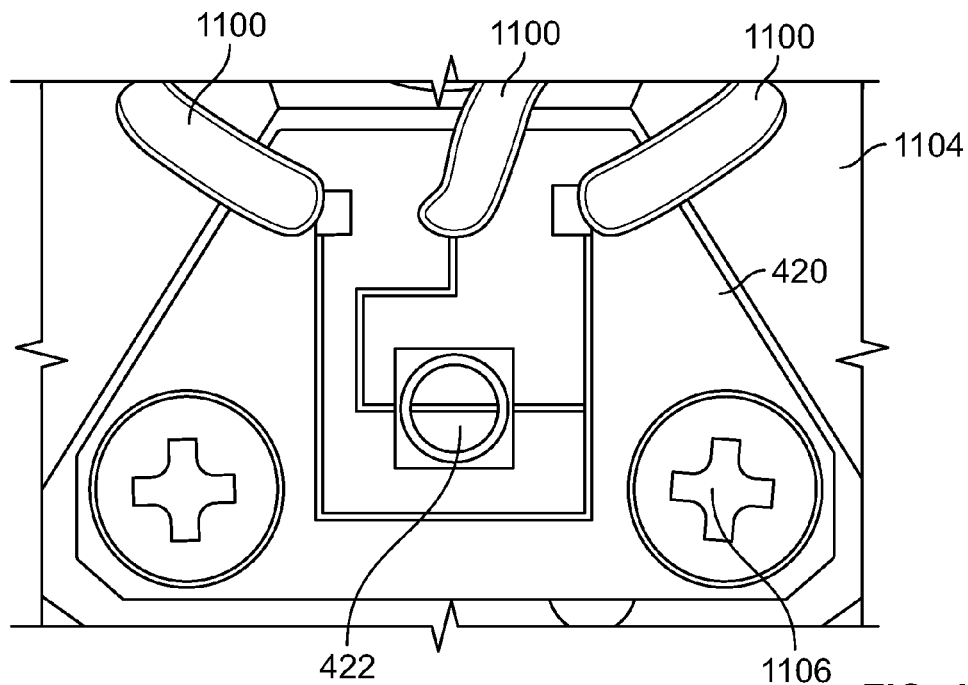
FIG. 45A is an enlarged view of an example sub circuit board in the LED light of FIG. 43A.
Figure 45B:
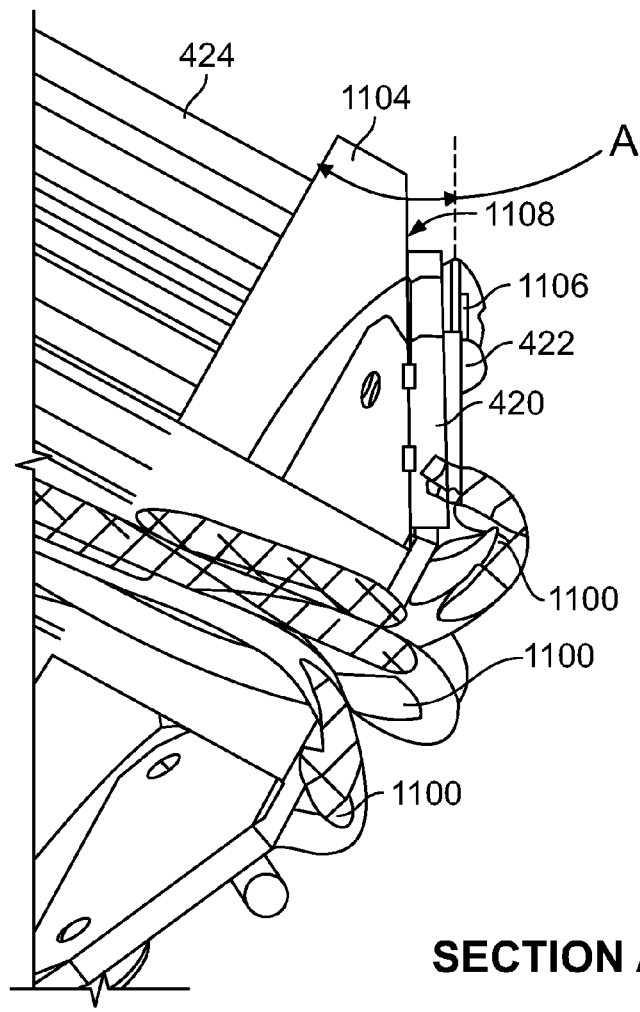
FIG. 45B is a cross sectional view of the LED light of FIG. 43A.

Referring to FIGS. 43-45, the LED light 372 as illustrated in FIG. 10 is described and illustrated in more detail. In this example, the LED light 372 includes five sub circuit boards 420 (such as 420A-420E), each of which includes a LED 422 (such as 422A-422E) and is connected to the light circuit 374 (FIG. 10) through wires 1100. As described in FIG. 10, the sub circuit boards 420 with the LEDs 422 are arranged to increase forward and peripheral visibility. In the illustrated example, the sub circuit boards 420 are arranged in a circular manner around the center axis C of the LED light 372.

The LED light 372 includes a heat sink assembly 1102 configured to provide thermal relief of the sub circuit boards 420, thereby allowing improved optical intensity of the LEDs 422 on the sub circuit boards 420. The heat sink assembly 1102 includes a circuit base 1104 and a plurality of heat sink fins 424 extending from the circuit base 1104. The circuit base 1104 and the heat sink fins 424 can be made of aluminum, aluminum alloys, copper, various composite materials, and other materials with thermal conductivity suitable for heat dissipation. The circuit base 1104 is configured to support the sub circuit boards 420 thereon. The sub circuit boards 420 can be secured on the circuit base 1104 in various manners, such as threaded engagement by fasteners 1106 (FIG. 43C). The heat sink fins 424 can increase surface areas, thereby increasing thermal conductivity between the circuit base 1104 and the internal space.

To increase luminous intensity of the LEDs 422 and maximize vertical coverage (i.e., vertical cross-sectional coverage), each of the sub circuit boards 420A-420E is arranged to be sloped down from the center axis C. In some embodiments, as shown in FIGS. 44A and 44B, the circuit board 1104 of the heat sink assembly 1102 has five pitched surfaces 1108A-1108E (collectively, 1108) configured to secure the five sub circuit boards 420A-420E, respectively. The pitched surfaces 1108 are slanted such that the sub circuit boards 420 that are supported by the pitched surfaces 1108 are sloped down from the center axis C. As shown in FIG. 45A, an angle A of the pitched surfaces 1108 (and thus the sub circuit boards 420) can range between 15 and 45 degree with respect to a plane perpendicular to the center axis C. In other embodiments, the angle A is about 30 degree.

In some embodiments, the angle A of the pitched surfaces 1108, a number N of the pitched surfaces 1108, and other configurations of the LED light 372 are determined with a peak coverage ($I_{PC}$) and/or a fill coverage ($I_{FC}$). The peak coverage ($I_{PC}$) can be calculated as follows:

$$I_{PC} = \left[\theta_A - \left(\frac{\theta_{IM}}{2}\right), \theta_A + \left(\frac{\theta_{IM}}{2}\right)\right]$$

where:
$\theta_A$ is the angle A of the emitter surface (e.g., the pitched surface 1108) relative to a plane perpendicular to the center axis C;
$I_{IM}$ is a minimum relative intensity acceptable to maintain proper on and off-axis visibility; and
$\theta_{IM}$ is a relative intensity angle of the light emitting components of the electric light 372 to achieve forward (parallel to the axis C) intensity and peripheral (perpendicular to axis C) intensity requirements, when the light emitting components illuminate with the minimum relative intensity ($I_{IM}$).

In some embodiments, the fill coverage ($I_{FC}$) is calculated as follows:

$$I_{FC} \geq I_{LS}(\theta_{ES})$$

where:
$I_{FC}$ is a relative minimum intensity in the void space between emitting elements $e_x$ (e.g., LEDs 422) (e.g., a plane ($P_x$) containing an arc subtended by an intersection of two light cones emitting from adjacent light emitting elements);
$I_{LS}$ is a relative intensity of the light source at relative angle $\theta_{ES}$; and
$\theta_{ES}$ is a smallest angle between the perpendicular line $\Lambda_x$ extending from the physical center of the light emitting element $e_x$ of any light-emitting surface of the electric light and plane $P_x$, or twice the angle defined by the intersection of the extension of the perpendicular lines of two adjacent emitting elements.

In some embodiment, $\theta_{ES}$ is calculated by:

$$\theta_{ES} = (360°/x_s)/2$$

where $x_s$ is a number of surfaces on the array.

In some embodiments, the angle ($\theta_A$) is selected to maximize the forward visibility (e.g., light parallel to the center axis C) while simultaneously allowing adequate peripheral illumination (e.g., light perpendicular to the axis C) with respect to the qualities of the light emitting elements of the electric light.

In some embodiments, the number ($x_s$) of surfaces on the array is selected to minimize a perceived light intensity variance from the peak intensity (at $\theta=0$), while observing a point at which adding an additional face endures significant diminishing returns.

By way of example, where it is selected that $x_s=5$ and $\theta_A=30°$ and $I_{IM} \geq 70\%$ and $I_{FC} \geq 80\%$ are requested, and where an example emitting element (e.g., a LED) has $\theta_{ES}=36°$, $I_{LS}=85\%$, $\theta_A=30°$, and $\theta_{IM}=110°$, the peak coverage is:

$$I_{PC} = \left[\theta_A - \left(\frac{\theta_{IM}}{2}\right), \theta_A + \left(\frac{\theta_{IM}}{2}\right)\right] = [-25°, 85°],$$

and the parallel emitter relative intensity that are contributed to by all five ($x_s=5$) emitting surfaces is: $I_P(\theta_{IM}=0)=90\%$.

As such, by a proper design using the various factors as described above, the LED light 372 can primarily provide forward facing light by a majority of light being still directed forwardly, and also provide significant lateral light.

Accordingly, the slanted arrangement of the sub circuit boards 420 allows for a nearly uniform relative intensity distribution over a visible region of the LED light 372. The arrangement of multiple sub circuit boards 420 can allow for overlap of light emitting from the LEDs 422, thereby removing light separation or discontinuation (e.g., "seams") of the LEDs 422 spaced apart around the center axis C.

In some embodiments, the LED light 372 can be used to generate various visual effects, such as a rotating light effect, by alternatingly turning on and off the LEDs 422 in various manners.

Figure 46:
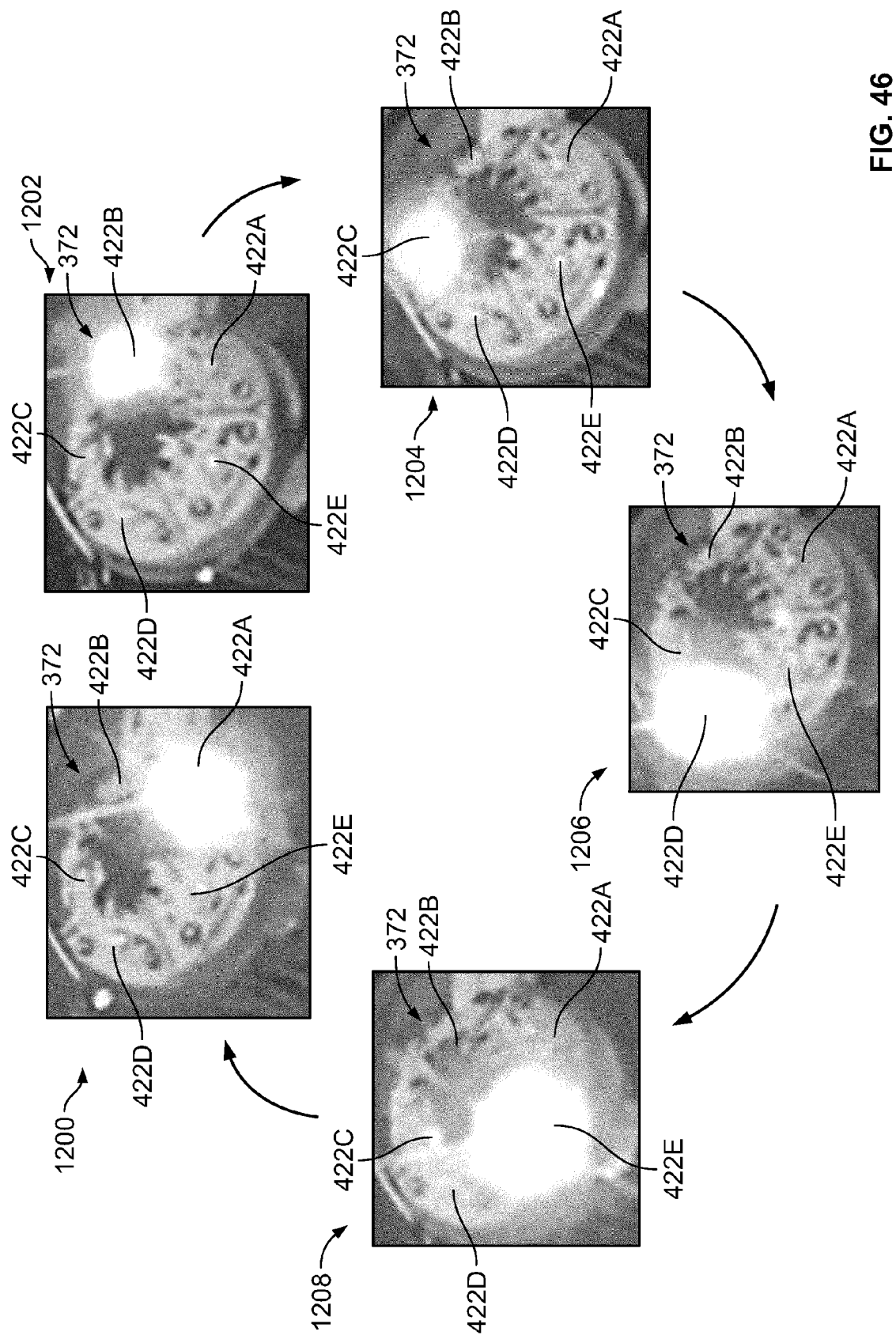
FIG. 46 illustrates an example visual effect using the LED light.

FIG. 46 illustrates an example visual effect using the LED light 372. In this example, each of the five LEDs 422A-422E is turned on to flash in sequence at predetermined intervals to provide an appearance of rotating light. For example, a first LED 422A is first turned on while the other LEDs 422B-422E are turned off for a predetermined period of time, as illustrated in appearance 1200. Then, a second LED 422B adjacent the first LED 422A is turned on while the other LEDs 422A and 422C-422E are turned off for the predetermined period of time, as illustrated in appearance 1202. Then, a third LED 422C adjacent the second LED 422B is turned on while the other LEDs 422A-422B and 422D-422E are turned off for the predetermined period of time, as illustrated in appearance 1204. Then, a fourth LED 422D adjacent the third LED 422C is turned on while the other LEDs 422A-422C and 422E are turned off for the predetermined period of time, as illustrated in appearance 1206. Then, a fifth LED 422E adjacent the fourth LED 422D is turned on while the other LEDs 422A-422D are turned off for the predetermined period of time, as illustrated in appearance 1208. Finally, the first LED 422A is turned on again while the other LEDs 422B-422E are turned off, as illustrated in the appearance 1200. This sequence is repeated to show a visual effect of rotating light. In other embodiments, the sequence, and/or the duration, of turning on and off the LEDs 422A-422E can be modified to generate different visual effects.

Figure 47:
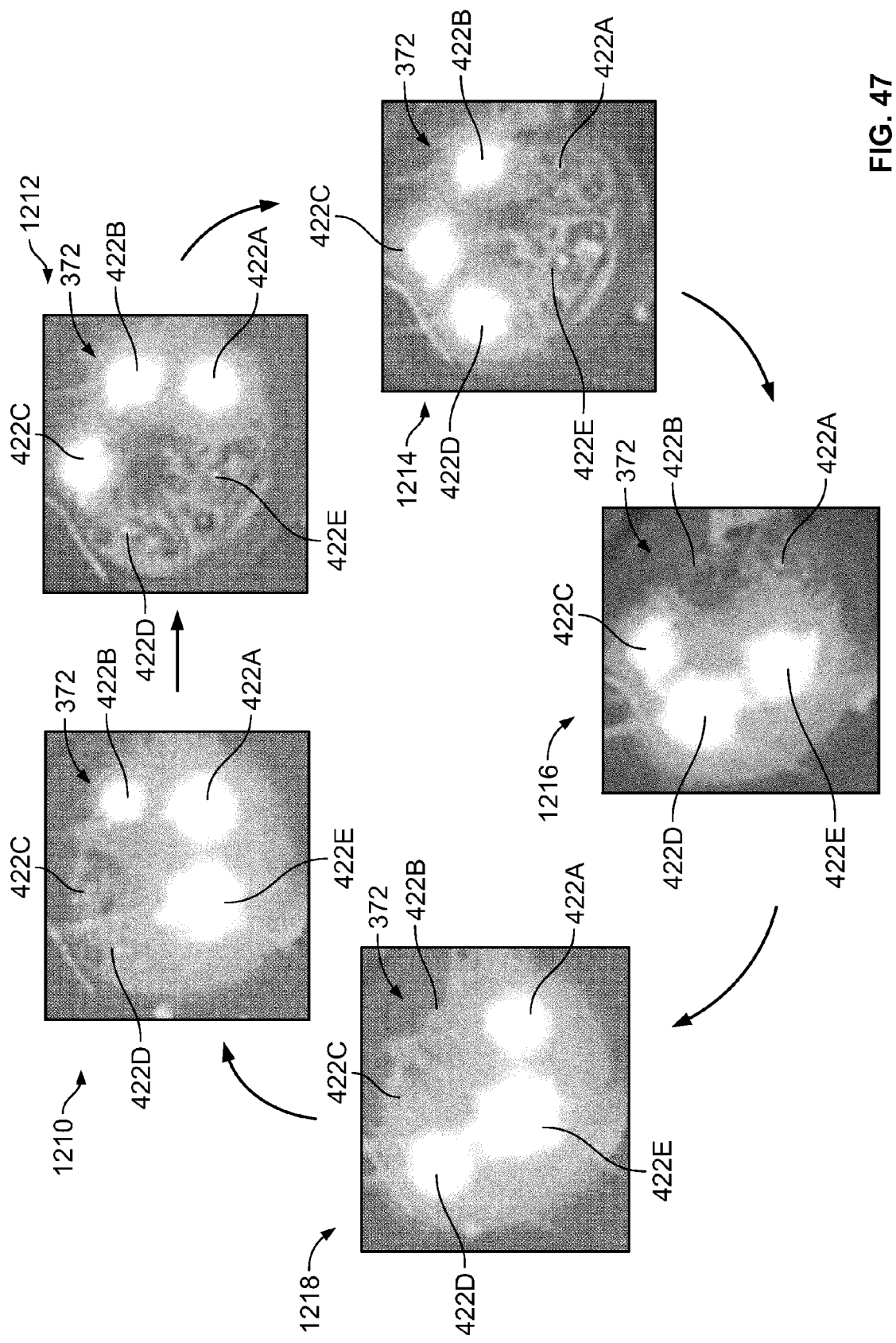
FIG. 47 illustrates another example visual effect using the LED light.

FIG. 47 illustrates another example visual effect using the LED light 372. In this example, two or more of the LEDs 422A-422E are selectively grouped and alternatingly turned on and off to generate a visual effect of blended rotating light. For example, a set of first, second, and third LEDs 422A-422C is first turned on while the other LEDs 422D-422E are turned off for a predetermined period of time, as illustrated in appearance 1210. Then, a set of second, third, and fourth LEDs 422B-422D is turned on while the other LEDs 422A and 422E are turned off for the predetermined period of time, as illustrated in appearance 1212. Then, a set of third, fourth and fifth LEDs 422C-422E is turned on while the other LEDs 422A-422B are turned off for the predetermined period of time, as illustrated in appearance 1214. Then, a set of fourth, fifth and first LEDs 422D-422E and 422A is turned on while the other LEDs 422B-422C are turned off for the predetermined period of time, as illustrated in appearance 1216. Then, a set of fifth, first and second LEDs 422E and 422A-422B is turned on while the other LEDs 422C-422D are turned off for the predetermined period of time, as illustrated in appearance 1218. Finally, the set of first, second, and third LEDs 422A-422C is turned on again while the other LEDs 422D-422E are turned off for the predetermined period of time, as illustrated in appearance 1210. This sequence is repeated to generate a visual effect that a set of multiple lighting sources rotates. In other embodiments, the sequence, and/or the duration, of turning on and off different sets of the LEDs 422A-422E can be modified to generate different visual effects.

In addition to the example visual effects of FIGS. 46A and 46B, other sequences, and/or groupings, of operating the LEDs 422 are also possible to provide different visual effects. In some embodiments, the LEDs 422 can be operated to generate a strobe effect. By way of example, all of the LEDs 422 are turned on for a very short period of time (e.g., 10 ms) and then turned off for another period of time (e.g., 1 sec). This sequence is repeated to generate an example strobe effect. Other types of strobe effects are also possible.

The LED light 372 can be used with various types of lens elements to achieve different light effects when the LEDs 422 are selectively operated to generate various visual effects as described above. In other embodiments, the LED light 372 has a different number of LEDs 422 (other than five LEDs) and/or a different arrangement of such LEDs 422 to provide a variety of visual effects of light.

The various examples and teachings described above are provided by way of illustration only and should not be construed to limit the scope of the present disclosure. Those skilled in the art will readily recognize various modifications and changes that may be made without following the example and applications illustrated and described herein, and without departing from the true spirit and scope of the present disclosure.

What is claimed is:

1. A coupling device for a warning system, the coupling device comprising:
    a wiring chamber configured to electrically connect an alarm subsystem there within;
    a coupler-side coupling mechanism configured to mount the alarm subsystem;
    a coupler interconnection mechanism configured to engage another coupling device by a clamping device, the clamping device being configured to couple two coupling devices;
    a pair of ribs formed on an inner surface thereof;
    one or more fastening holes configured to mount the clamping device onto the coupler interconnection mechanism;
    a coupling body having a top portion, a first lateral wall, a second lateral wall abutting the first lateral wall, a third lateral wall abutting the second lateral wall and opposite to the first lateral wall, and a fourth lateral wall abutting the first and third lateral walls and opposite to the second lateral wall, wherein the wiring chamber is defined by the first, second, third, and fourth lateral walls and open toward the top portion; and a coupling cover configured to mount to the top portion of the coupling body to cover the wiring chamber;
    wherein the coupler interconnection mechanism is formed on the first and third lateral walls.

2. The coupling device of claim 1, wherein the alarm subsystem comprises:
    a signaling device for providing an alarm in an event of a predetermined situation; and
    a modularized protection housing configured to mount the signaling device and contain at least part of the signaling device, the modularized protection housing including a subsystem-side coupling mechanism configured to mount the coupling device, the subsystem-side coupling mechanism comprising:
        a wiring conduit configured to receive one or more wiring cables; and
        a bushing configured to engage the wiring conduit and disposed between the modularized protection housing and the coupling housing, wherein the modularized protection housing is configured to interchangeably mount different types of signaling devices.

3. The coupling device of claim 2, the coupler interconnection mechanism comprising:
   a cable passage defining a channel for receiving one or more wiring cables;
   a groove formed on the cable passage and configured to engage one of the pair of ribs formed on the clamping device; and
   at least one coupler fastening hole configured to align with one or more of the fastening holes of the clamping device to mount the clamping device on the coupling device by at least one fastener, and wherein the coupler-side coupling mechanism of the coupling device is formed on the second and fourth lateral walls, the coupler-side coupling mechanism comprising:
   a cable conduit for receiving one or more wiring cables from the alarm subsystem; and
   at least one coupling hole, each configured to receive a fastener and aligned to an insert socket of the alarm subsystem, the fastener being inserted into the insert socket through the coupling hole.

4. The coupling device of claim 3, further comprising:
   a lateral end gasket disposed between the coupler-side coupling mechanism of the coupling device and the subsystem-side coupling mechanism of the modularized protection housing.

5. The coupling device of claim 1, further comprising:
   an electrical connector mounted on the coupling cover and at least partially received within the wiring chamber of the coupling body when the coupling cover is mounted onto the coupling body.

6. The coupling device of claim 1, further comprising:
   an end cover configured to cover the coupler-side coupling mechanism when the coupler-side coupling mechanism is not in use.

7. The coupling device of claim 3, wherein the groove of the coupler interconnection mechanism is tapered in width such that adjacent coupling devices are pulled together as the clamping device engages the adjacent coupling devices.

* * * * *